United States Patent [19]
Fukui et al.

[11] Patent Number: 5,860,110
[45] Date of Patent: Jan. 12, 1999

[54] CONFERENCE MAINTENANCE METHOD FOR CACHE MEMORIES IN MULTI-PROCESSOR SYSTEM TRIGGERED BY A PREDETERMINED SYNCHRONIZATION POINT AND A PREDETERMINED CONDITION

[75] Inventors: Toshiyuki Fukui, Kawasaki; Kazumasa Hamaguchi; Shuichi Nakamura, both of Yokohama, all of Japan

[73] Assignee: Canon Kabushiki Kaisha, Tokyo, Japan

[21] Appl. No.: 699,105

[22] Filed: Aug. 16, 1996

[30] Foreign Application Priority Data

Aug. 22, 1995 [JP] Japan .................................. 7-213373
Aug. 22, 1995 [JP] Japan .................................. 7-213374
Aug. 22, 1995 [JP] Japan .................................. 7-213375

[51] Int. Cl.⁶ ........................................................ G06F 13/00
[52] U.S. Cl. ........................... 711/141; 711/143; 711/147
[58] Field of Search .................................... 395/468, 469, 395/470, 471, 472, 473

[56] References Cited

U.S. PATENT DOCUMENTS

| | | | |
|---|---|---|---|
| 5,386,546 | 1/1995 | Hamaguchi | 395/425 |
| 5,524,233 | 6/1996 | Milburn et al. | 395/468 |
| 5,524,234 | 6/1996 | Martinez, Jr. et al. | 395/468 |
| 5,577,218 | 11/1996 | Hamaguchi | 395/405 |

OTHER PUBLICATIONS

Microsoft Press, Computer Dictionary, Second Edition, pp. 379–380, 1994.

"Lazy Release Consistency for Software Distributed Shared Memory" by Peter Keleher et al.

"Delayed Consistency and Its Effects on the Miss Rate of Parallel Programs" by Michel Dubois, Jin Chin Wang, Luiz A. Barroso, Kangwoo Lee and Yung–syau Chen, 1991 ACM pp. 197–206.

*Primary Examiner*—Tod R. Swann
*Assistant Examiner*—Esteban A. Rockett
*Attorney, Agent, or Firm*—Fitzpatrick, Cella, Harper & Scinto

[57] ABSTRACT

When a synchronization point is determined to maintain the coherence of data in a multi-processor system, and data write-back operations from caches to a main memory are simultaneously performed at the determined point, the traffic is concentrated, resulting in poor efficiency. In view of this problem, the write-back operations of cache data are arbitrarily performed when a predetermined condition is satisfied. Alternatively, when the number of copies which are updated in the cache and do not match the corresponding data in the main memory exceeds a predetermined value, cache data are written back. With this control, the write-back operations of copies stored in cache can be prevented from being concentrated at the synchronization point.

11 Claims, 40 Drawing Sheets

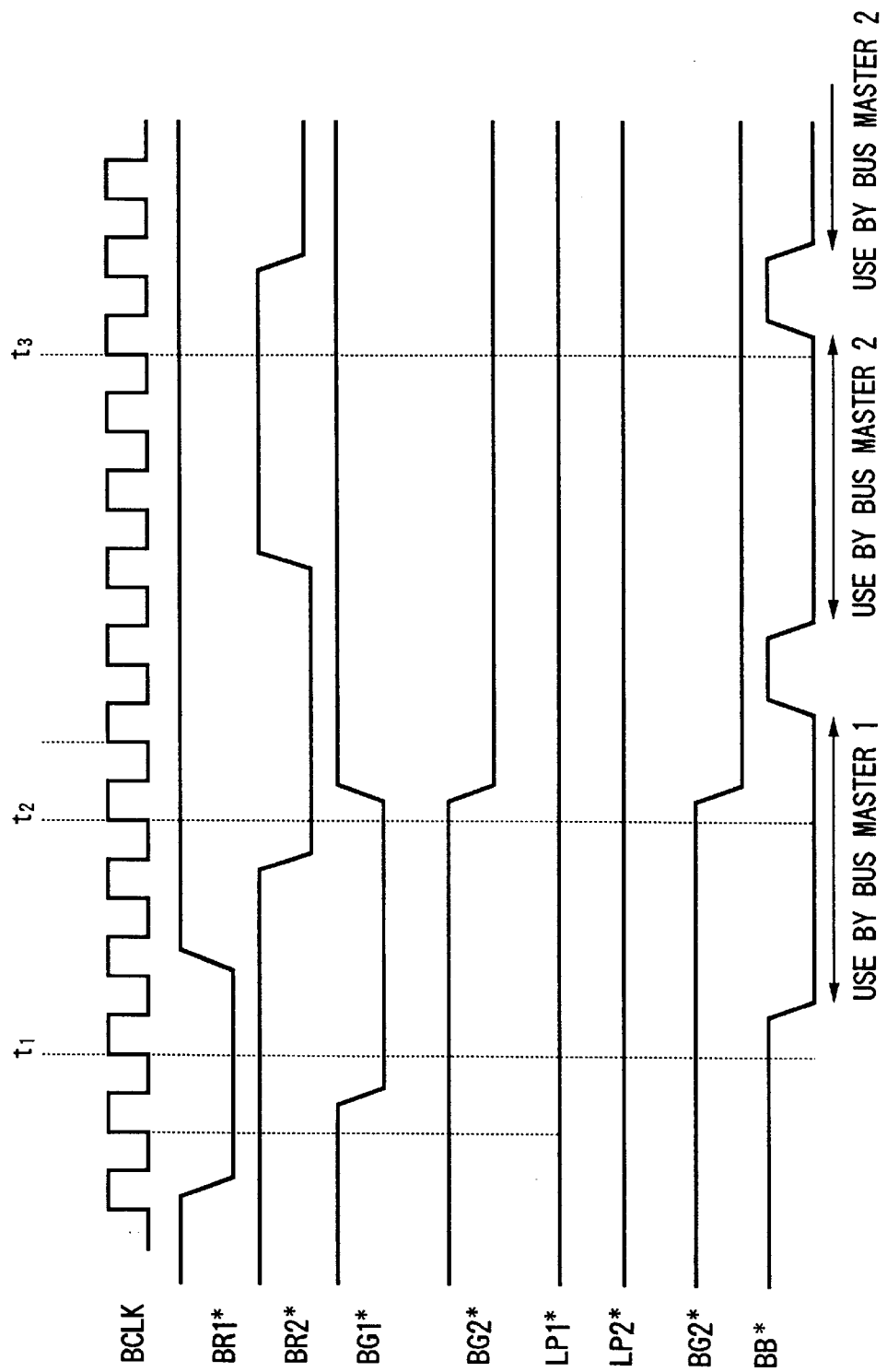

| BR1* · LP1* | H·H | H·L | L·L | L·H |
|---|---|---|---|---|
| H·H | BG1' | BG1' | L | L |
| H·L | BG1' | BG1' | L | L |
| L·L | H | H | RR1 | L |
| L·H | H | H | H | RR1 |

* BG1' = IMMEDIATELY PRECEDING VALUE OF BG1*
* BB* = L

| | BG1' H | L |
|---|---|---|
| H | L | H |
| L | L | DC |

* DC : DO NOT CARE

|  | H·H | H·L | L·L | L·H |
|---|---|---|---|---|
| H·H | BG2' | BG2' | H | H |
| H·L | BG2' | BG2' | H | H |
| L·L | L | L | RR2 | H |
| L·H | L | L | L | RR2 |

BR2* · LP2*

* BG2' = IMMEDIATELY PRECEDING VALUE OF BG2*
* BB* = L

|  | H | L |
|---|---|---|
| H | H | L |
| L | H | DC |

BG1'

* DC : DO NOT CARE

FIG.40

| |
|---|
| DIRECTORY |
| MODULE FOR LOADING DATA INTO CACHE |
| MODULE FOR COUNTING BLOCKS UPDATED IN CACHE |
| MODULE FOR WRITING BACK DATA BLOCKS TO MAIN MEMORY IN ACCORDANCE WITH NUMBER OF COUNTED BLOCKS |
| MODULE FOR SIMULTANEOUSLY WRITING BACK DATA BLOCKS UPDATED IN CACHE |

CONFERENCE MAINTENANCE METHOD FOR CACHE MEMORIES IN MULTI-PROCESSOR SYSTEM TRIGGERED BY A PREDETERMINED SYNCHRONIZATION POINT AND A PREDETERMINED CONDITION

BACKGROUND OF THE INVENTION

The present invention relates to a coherence maintenance method for cache memories in information processing apparatus in which a plurality of processors which are connected by an interconnection network via caches operate parallel to each other.

In a parallel computer system, in order to attain a high-speed response to an access request issued from a processor to a main memory, and to reduce the traffic on the interconnection network, each processor often has a cache memory. Memory access requests issued from each processor are executed via a cache memory that stores copies of data blocks to be subjected to these memory accesses. In the parallel computer system, a plurality of cache memories may often store copies of an identical data block. In order to guarantee the coherence of these copies, various methods have been proposed and realized.

A snoop method is generally used in a parallel computer system which uses a bus or the like that can monitor all the transactions as a connection network for interconnecting between processors, and between processors and a main memory. In the snoop method, the cache memory monitors all the transactions issued on the connection network, and if the memory stores a copy of a data block as a transaction target, the cache memory performs a required coherence maintenance operation.

On the other hand, a directory method is used in a parallel computer system which uses a network that cannot monitor all the transactions as a connection network for interconnecting between processors, and between processors and a main memory. In the directory method, caching information indicating a cache memory that stores a copy of a data block is stored and managed in a storage device called a directory in units of data blocks or an equivalent. When a processor issues a transaction, a cache memory that stores a copy of the data block as a transaction target is informed of the generation of the transaction, on the basis of the caching information obtained from the directory, thus maintaining the coherence among copies.

In order to suppress access latency with respect to a memory, various relaxed memory coherence models have been proposed and realized.

In general, in a relaxed memory coherence model, a synchronization point is set in a processing sequence, and when the processing has reached the synchronization point, memory transactions issued so far must be reflected in a system. This means that memory transaction results need not be reflected in the system before the synchronization point.

When a conventional cache coherence maintenance method is used in a parallel computer system that adopts such relaxed memory coherence model, an unnecessary coherence maintenance operation is executed every transaction, and its overhead inadvertently increases the memory access latency contrary to the purpose of the relaxed memory coherence model.

In order to solve this problem, the assignee of the present applicant has already proposed a system which can reduce the overhead and can improve the performance of the system by delaying execution of the cache coherence maintenance operation to the timing of the synchronization point at which memory transactions need be reflected in the system in the relaxed memory coherence model.

However, in such system which reduces the overhead due to unnecessary cache coherence maintenance operations by delaying the execution of the cache coherence maintenance operation to the timing of the synchronization point at which memory transactions need be reflected in the relaxed memory coherence model, the cache coherence maintenance operations are all performed at the timing of the synchronization point. For this reason, the traffic concentrates on the interconnection network at the timing of the synchronization point, and as a result, the utilization efficiency of the interconnection network falls considerably at the timing of the synchronization point.

SUMMARY OF THE INVENTION

The present invention has been made in consideration of the above situation, and has as its object to provide an information processing apparatus which can reduce overhead due to execution of unnecessary coherence maintenance operations, and can also reduce processing overhead upon execution of synchronization operations by avoiding a decrease in utilization efficiency of an interconnection network due to concentration of traffic on the interconnection network at the timing of a synchronization point, and its control method.

In order to achieve the above object, according to the first aspect of the present invention, there is provided an information processing system which includes a plurality of connection network use subjects each including a plurality of processor units, cache memory units connected to said plurality of processor units, and a main memory unit, and a connection network for interconnecting said plurality of connection network use subjects, and executes coherence maintenance processing for maintenance coherence of contents of a data block stored in the cache memory unit connected to the processor unit when processing of each of said plurality of processor units has reached a predetermined state, wherein even before the processing of the processor unit reaches the predetermined stage, when a state of said information processing system satisfies a predetermined condition, and a copy of data stored in at least one of said cache memory units is updated, the cache memory unit that stores the updated copy executes the coherence maintenance processing for maintaining the coherence of the contents of the data block stored in said cache memory unit.

With the above-mentioned arrangement, since the contents of each cache memory unit are written back to the main memory unit while the bus is not busy, an operation for maintaining the coherence between the data contents of the main memory unit and the cache memory units is performed as needed, and this can reduce the traffic of the system.

The information processing apparatus and its control method according to the present invention provide a cache coherence maintenance operation mechanism for improving the performance of a parallel computer system that adopts a relaxed memory coherence model, and can improve the processing performance of the entire system by reducing processing overhead upon execution of synchronization operations while avoiding a decrease in utilization efficiency of an interconnection network upon concentration of traffic on the interconnection network at the timing of a synchronization point.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 15 is a chart showing an example of a bus arbitration protocol used in the third embodiment of the present invention;

FIGS. 16A and 16B are truth tables for generating output signals of the shared bus arbiter used in the third embodiment of the present invention;

FIGS. 17A and 17B are truth tables for generating output signals of the shared bus arbiter used in the third embodiment of the present invention;

FIG. 40 is a view showing the memory map of a recording medium that stores program modules for realizing the fifth embodiment.

DETAILED DESCRIPTION OF THE PREFERRED EMBODIMENTS

[First Embodiment]

The first preferred embodiment of the present invention will be described in detail hereinafter with reference to the accompanying drawings.

<Arrangement of Multi-processor System>

Figure 1:
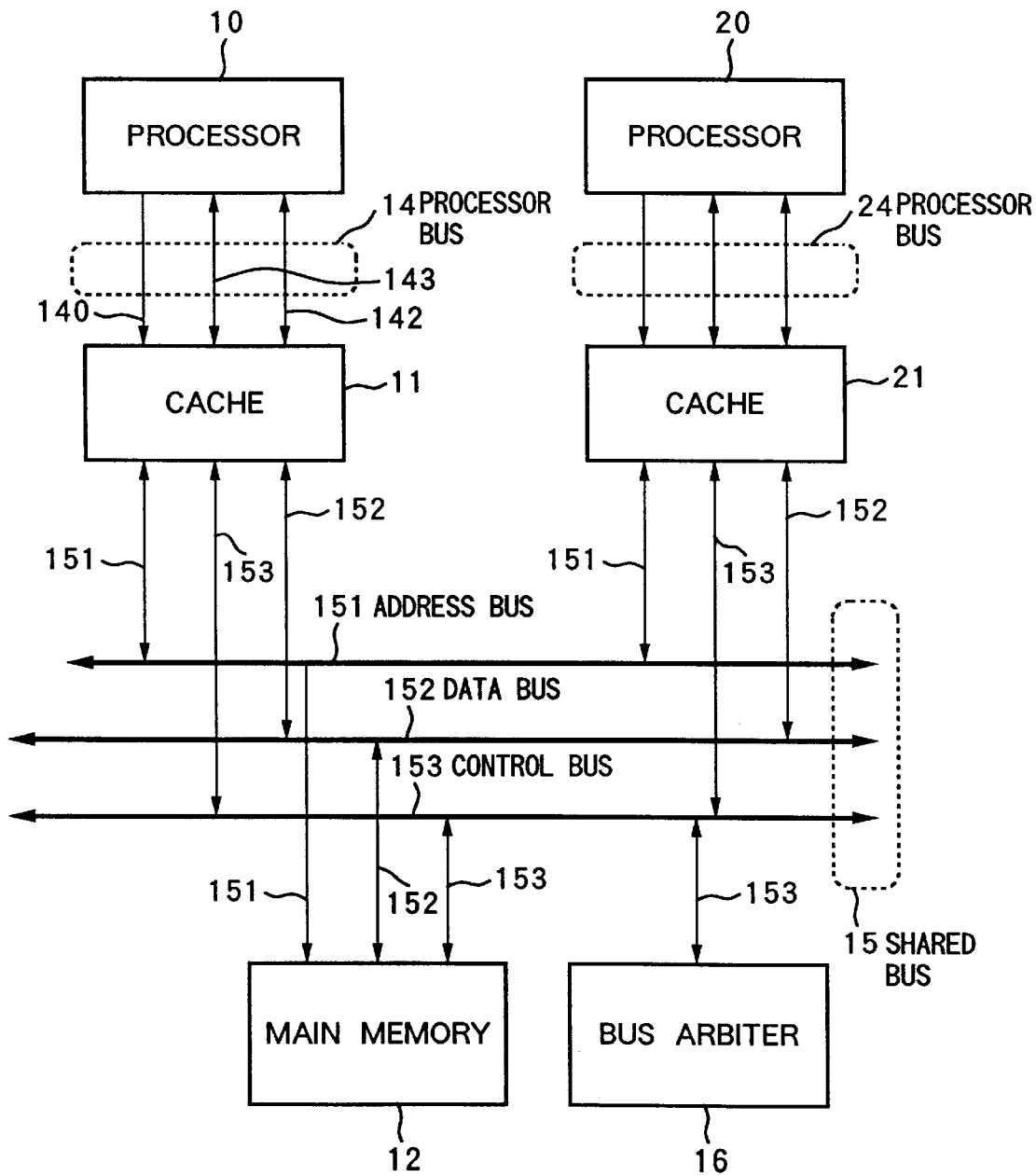
FIG. 1 is a block diagram showing an example of the arrangement of a system that realizes the present invention.

FIG. 1 is a block diagram showing the arrangement of a first multi-processor system for realizing the present invention.

Processors 10 and 20 are respectively connected to caches 11 and 21 via processor buses 14 and 24. The caches 11 and 21 are connected to a main memory 12 and are also connected to each other via a shared bus 15. Each cache updates data stored therein or reflects its contents in the main memory 12 on the basis of a request from the processor, and snoops address information or the like flowing on the bus to execute its maintenance. A bus arbiter 16 arbitrates the right of use of the shared bus 15. The shared bus 15 includes an address bus 151, a data bus 152, and a control bus 153, and the processor bus 14 includes an address bus 141, a data bus 142, and a control bus 143. The same applies to the processor bus 24.

Figure 2:
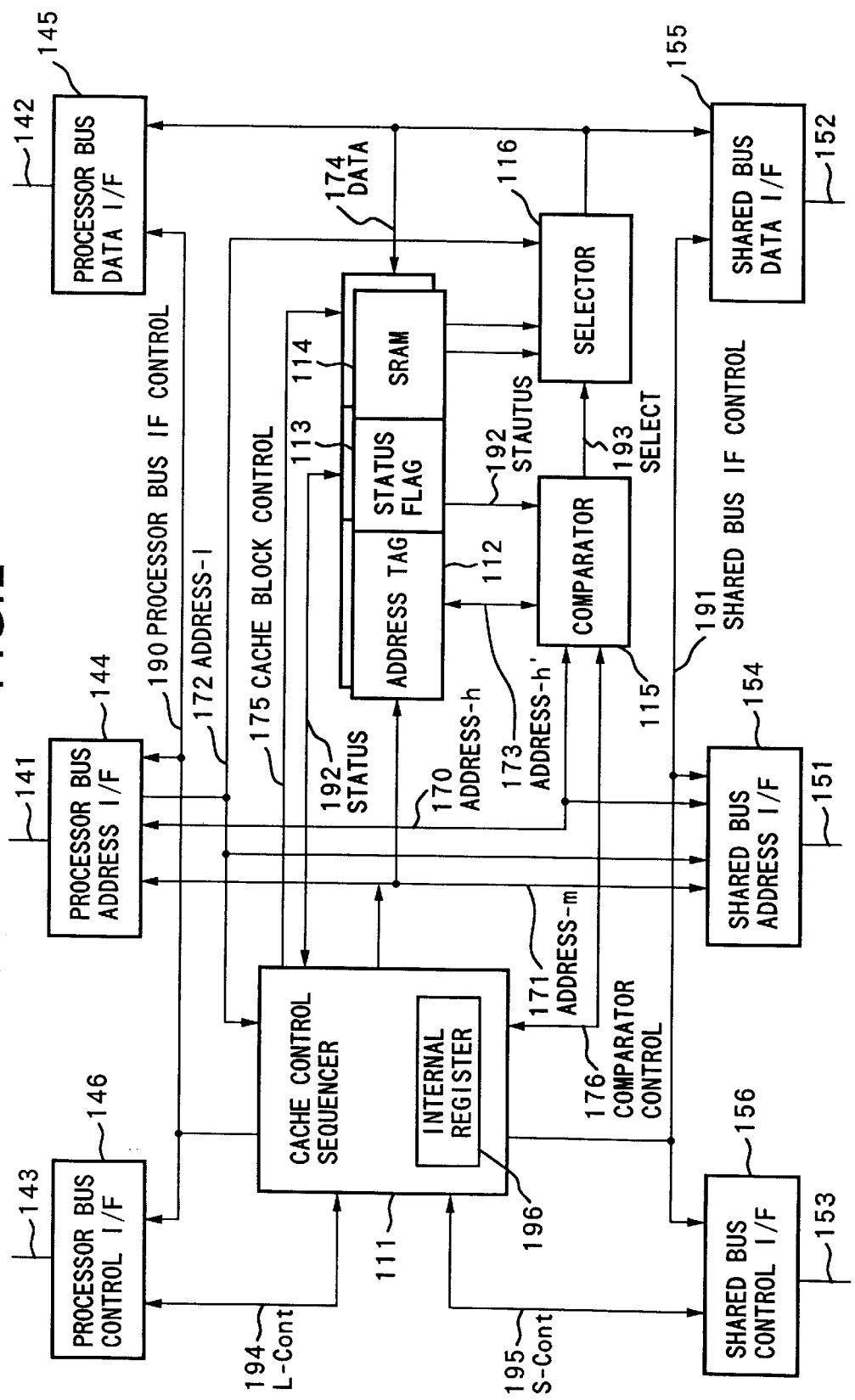
FIG. 2 is a block diagram showing the arrangement of a cache used in the example of the arrangement of the present invention.

FIG. 2 shows the arrangement of the caches 11 and 21 shown in FIG. 1.

The main body of each cache comprises a cache control sequencer 111 for controlling the entire cache, an address tag 112, a status flag 113, an SRAM 114, a comparator 115, a selector 116, interfaces 144 to 146 with the processor bus, and interfaces 154 to 156 with the shared bus. A combination of the address tag 112, the status flag 113, and the SRAM 114 correspond to a group of data.

Note that the SRAM 114 constitutes a data block for holding data. The address tag 112 holds the address of a data block stored in the SRAM 114, and the status flag 113 holds the status data of data on the SRAM 114. The status data will be explained later. The comparator 115 compares the contents of the address tag 112 with an address supplied from the processor bus 14 or the shared bus 15. The selector 116 selects data in the SRAM 114 in accordance with the comparison result of the comparator 115. The address comparison/selection processing by the comparator 115 and the selector 116 can discriminate whether the cache stores target data of some request. If the cache stores the target data, the data can be selected. The cache control sequencer 111 controls the respective modules in the cache.

In this embodiment, the 2-way set associative arrangement is used. However, the present invention is not limited to this specific arrangement. These caches are connected to the processors via the processor bus address interface 144, the processor bus data interface 145, and the processor bus control interface 146, and executes data supply processing or the like in accordance with a request from the processor. These caches are connected to the shared bus 15 via the shared bus address interface 154, the shared bus data interface 155, and the shared bus control interface 156. In accordance with a request supplied from the processor, each cache loads data from the main memory 12 therein when a cache miss has occurred, writes back cache information to the main memory, and changes the status flag 113 therein on the basis of control information supplied from the other cache.

In this embodiment, assume that the system with the arrangement shown in FIGS. 1 and 2 uses a write-back type cache memory invalidating protocol. In the invalidating protocol, after a certain data block is loaded into the cache, if the data block is written back from the other cache to the main memory, the data block is invalidated. An example will be described below wherein the coherence of the cache memories is guaranteed on the basis of the cache memory control method that is compatible with the relaxed memory coherence model under the above-mentioned condition.

More specifically, the multi-processor system according to the present invention uses a protocol for guaranteeing the coherence of the cache memories at the time of issuance of a synchronization instruction (to be referred to as a SYNC instruction hereinafter) from the processor. In order to improve the performance of the system, the system allows the write-back operation of a data block, which will be written back from the cache memory to the main memory at the time of issuance of a SYNC instruction in future, i.e., a data block which is rewritten with the latest value in the cache memory and does not reflect its value in the main memory (to be referred to as a "DIRTY" block hereinafter), while the shared bus is not used by another bus master. The operation sequence and arrangement of the multiprocessor system according to the present invention will be described in detail below. Note that a cache block which has a value matching the value of the corresponding data block in the main memory since it is read out from the main memory or is written back to the main memory will be referred to as a "CLEAN" block hereinafter.

<Basic Operation of Cache System>

The basic operation of this cache system itself will be described below with reference to FIGS. 1 and 2, and the flow charts in FIGS. 3 to 5.

[LOAD Instruction]

Figure 3:
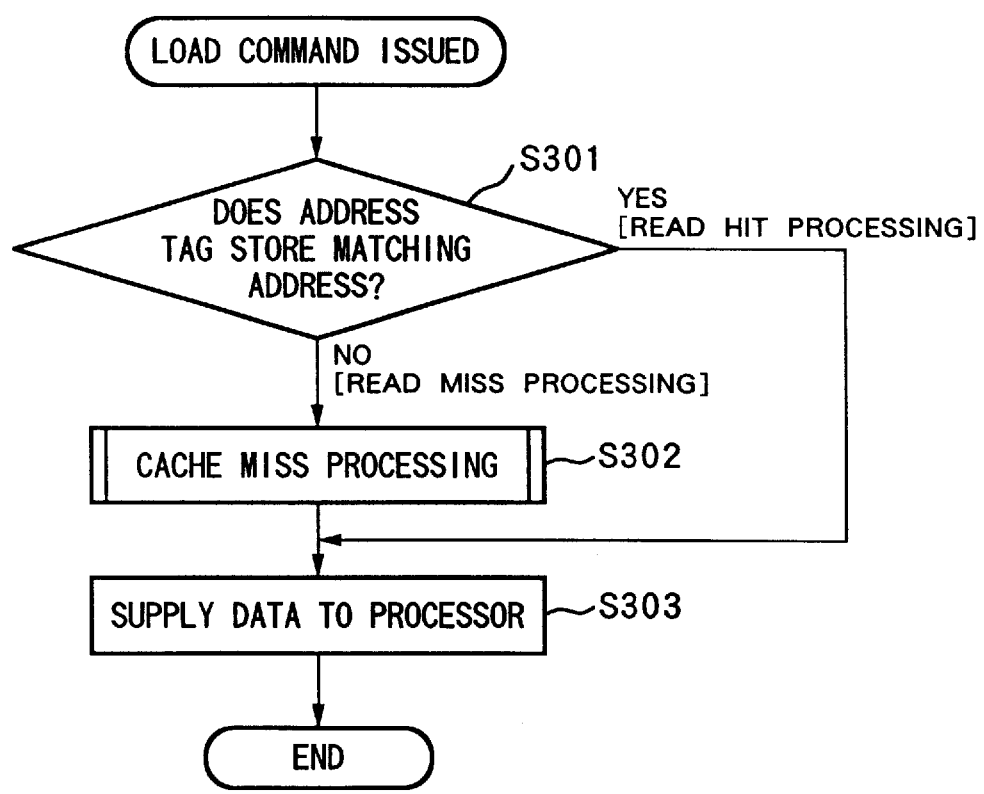
FIG. 3 is a flow chart showing the control sequence or procedure upon execution of a LOAD instruction used in the first embodiment of the present invention.

FIG. 3 shows the control sequence by the cache 11 upon execution of a LOAD instruction for loading a data block from the main memory 12 to the processor 10. In the following description, assume that a LOAD instruction is issued by the processor 10.

Referring to FIG. 3, the comparator 115 compares an address output onto the address bus 141 with the address stored in the address tag 112 (step S301), and if a cache read hit occurs with respect to the LOAD instruction issued by the processor 10, the cache 11 supplies data from the SRAM 114 to the processor 10 (step S303).

On the other hand, if a cache read miss occurs with respect to the LOAD instruction issued by the processor 10, the cache 11 performs cache miss processing. In this processing, the cache 11 loads data from the main memory 12 (step S302), and supplies data from the SRAM 114 to the processor 10 (step S303). In this case, the cache 11 does not supply the corresponding data to the processor 10 until the data that caused the cache read miss is supplied to the cache 11.

Figure 5:
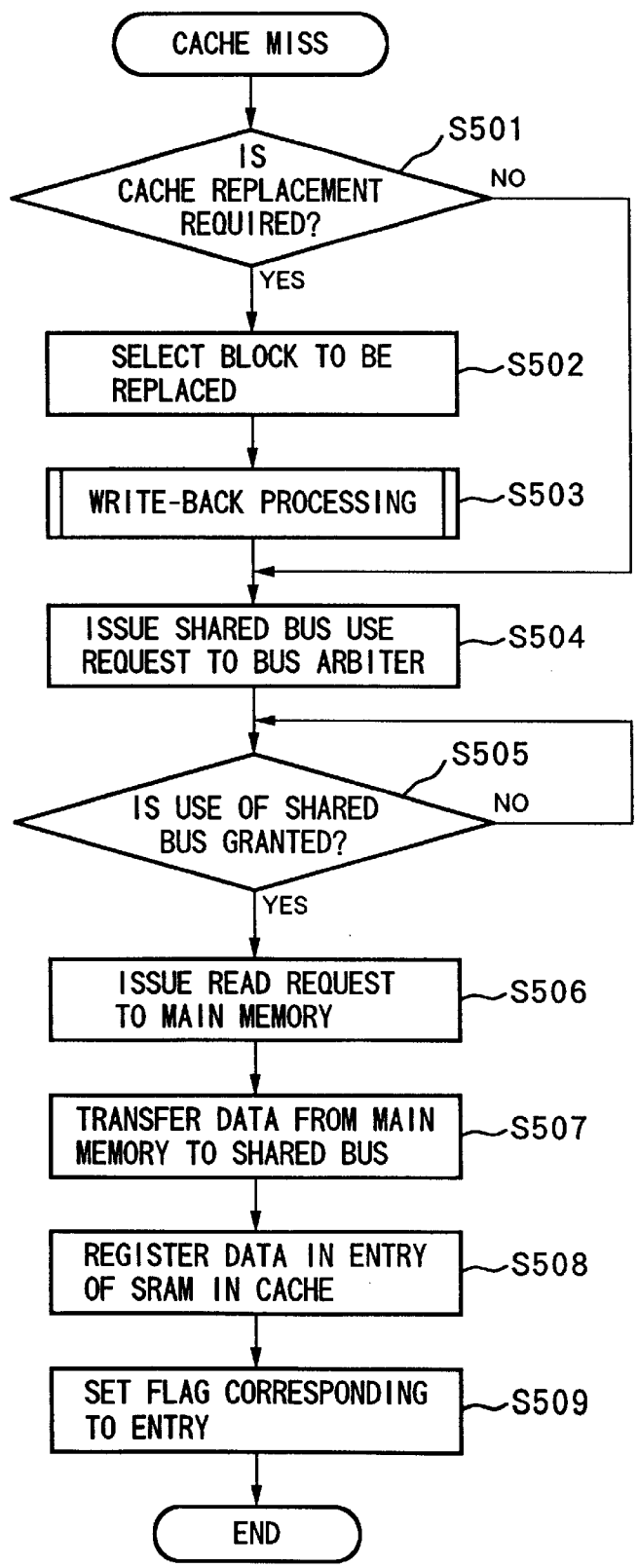
FIG. 5 is a flow chart showing the control sequence of cache miss processing upon execution of the LOAD/STORE instruction used in the first embodiment of the present invention.

The read cache miss processing is performed in the sequence shown in FIG. 5.

It is checked if cache replacement is required (step S501). That is, when all the memory space of the SRAM 114 is used, and no empty area is available, a new block to be loaded replaces a used block. Upon replacement, the block to be replaced is determined by a predetermined method (e.g., the block least recently replaced, a block determined in accordance with a predetermined priority order, or the like) (step S502). The block to be replaced is written back to the main memory 12 (step S503). As a result of the write-back processing, a match between the block to be replaced in the cache 11 and the corresponding data block in the main memory is guaranteed, and the block can be deleted from the cache.

In this state, a use request of the shared bus 15 is issued to the bus arbiter 16 (step S504).

After the use of the shared bus 15 is granted, the cache 11 transfers an address of the read access onto the shared address bus 151, issues a read request onto the shared control bus 153, and waits until data is supplied onto the shared data bus 152 (step S506).

The main memory 12 accepts the read request and the address of the read access, and supplies data onto the shared data bus 152 (step S507).

The cache 11 registers the data supplied onto the shared data bus 152 in the entry of the corresponding data block of its SRAM 114 (step S508).

Thereafter, the cache 11 sets a predetermined value in the status flag 113 (step S509). The value of the status flag 113 will be described later. In this case, if a read miss has occurred, "CLEAN" is set; if a write miss has occurred, "DIRTY" is set.

In this manner, if a cache miss has occurred, the cache can execute the LOAD instruction by reading out a required data block from the main memory 12.

[STORE Instruction]

Figure 4:
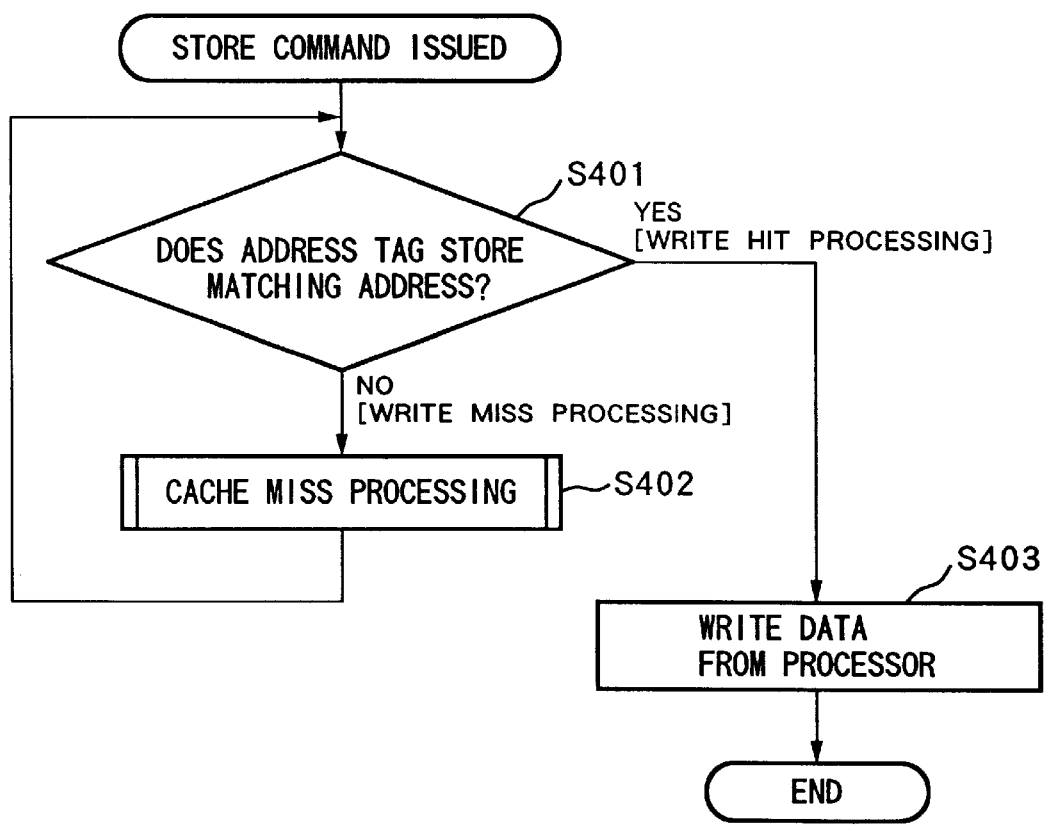
FIG. 4 is a flow chart showing the control sequence upon execution of a STORE instruction used in the first embodiment of the present invention.

FIG. 4 shows the control sequence by the cache 11 upon execution of a STORE instruction for writing data from the processor 10 in the cache 11. In the following description, assume that the STORE instruction is issued by the processor 10.

Referring to FIG. 4, it is checked by comparing an address output onto the address bus 141 with the address stored in the address tag 112 by the comparator 115 if the addresses match, i.e., a cache hit has occurred with respect to the STORE instruction issued by the processor 10 (step S401). If a cache write hit has occurred, the processor 10 supplies data to the cache 11, and the cache stores the supplied data (step S403).

On the other hand, if a cache write miss has occurred with respect to the STORE instruction issued by the processor 10, the cache miss processing shown in FIG. 5 is performed (step S402) to obtain the corresponding entry in the cache. Thereafter, cache write hit processing is performed.

As described above, the LOAD and STORE instructions are processed in the cache.

[SYNC Instruction]

Processing for a SYNC instruction will be described below with reference to FIG. 11. The SYNC instruction is an instruction with which the processor requests to reflect memory transactions issued so far in the system. In this embodiment, the SYNC instruction is an instruction for forcibly writing back a DIRTY block so as to maintain the coherence of the data block in the cache. Upon detection of the SYNC instruction by, e.g., decoding a control signal, the cache control sequencer 111 executes write-back control in write-back processing (to be described below) shown in FIG. 8. Thus, the coherence of the system can be held.

[Write-back Control (Description Using Flow Chart)]

The control sequence until data is written back from the cache to the memory as the characteristic feature of this system will be described below with reference to the flow chart in FIG. 8. This sequence is executed in the "write-back processing" step in FIGS. 5 and 11.

The characteristic feature of this system resides in that the write-back operation of the cache is executed in correspondence with a relaxed memory coherence model.

Figure 11:
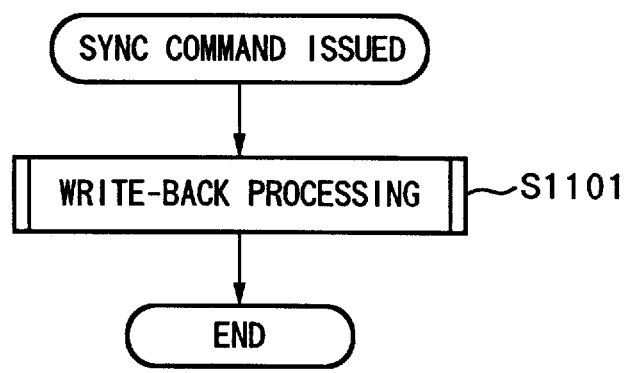
FIG. 11 is a flow chart showing the control sequence upon execution of a SYNC instruction used in the first embodiment of the present invention.

In a conventional system, when a data block of a cache of a given processor are rewritten with the latest value, and thereafter, another processor makes a read access to a data block ("DIRTY" block) whose value is not reflected in the main memory, the write-back operation is executed. However, in this system, this write-back operation is not performed. In the system of this embodiment, the write-back operation is performed:

1: when the processor issues a SYNC instruction (FIG. 11);

In this case, all "DIRTY" blocks in the cache are written back to the main memory.

2: when a cache miss has occurred, and a "DIRTY" block is selected as the block to be replaced (step S503 in FIG. 5);

In this case, only the block to be replaced in the cache is written back to the main memory.

The write-back operation in these cases 1 and 2 will be referred to as a high-priority write-back operation hereinafter since the cache itself acquires the right of use of a bus by issuing a shared bus request and executes the write-back operation.

3: when a "DIRTY" block is present in the cache, and the shared bus is not requested explicitly by any other bus masters;

In this case, when the shared bus is not requested explicitly by any other bus masters, "DIRTY" blocks are sequentially written back to the memory. In this embodiment, whether or not the shared bus is not requested explicitly by any other bus masters is determined by checking if the shared bus is implicitly granted by the shared bus arbiter. No shared bus request is issued to execute this write back operation. The implicit grant for the use of the shared bus will be described in detail later.

The write-back operation in case 3 will be referred to as a low-priority write-back operation hereinafter.

The write-back operation is performed in the abovementioned three cases. The write-back control operations in the respective cases are realized by the sequence shown in FIG. 8.

When write-back processing is started, it is checked if a "DIRTY" block is present in the cache (step S801). If YES in step S801, it is tested if the write-back operation has been started in response to a SYNC instruction issued by the processor (case 1) (step S802). If YES in step S802, the cache control sequencer 111 issues a shared bus request (step S803), and a high-priority write-back operation is repetitively executed until all the "DIRTY" blocks in the cache are written back (steps S804 and S805).

In case 2 (called from FIG. 5), i.e., if a "DIRTY" block that caused a cache miss is to be replaced (YES in step S806), a shared bus request is issued to obtain a grant for the use of the shared bus 15 (step S807), and a high-priority write-back operation of the "DIRTY" block to be replaced to the main memory 12 is then performed (step S808).

In case 3, if the use of the shared bus is implicitly granted (YES in step S809), a low-priority write-back operation of "DIRTY" blocks is performed (step S810).

Figure 6:
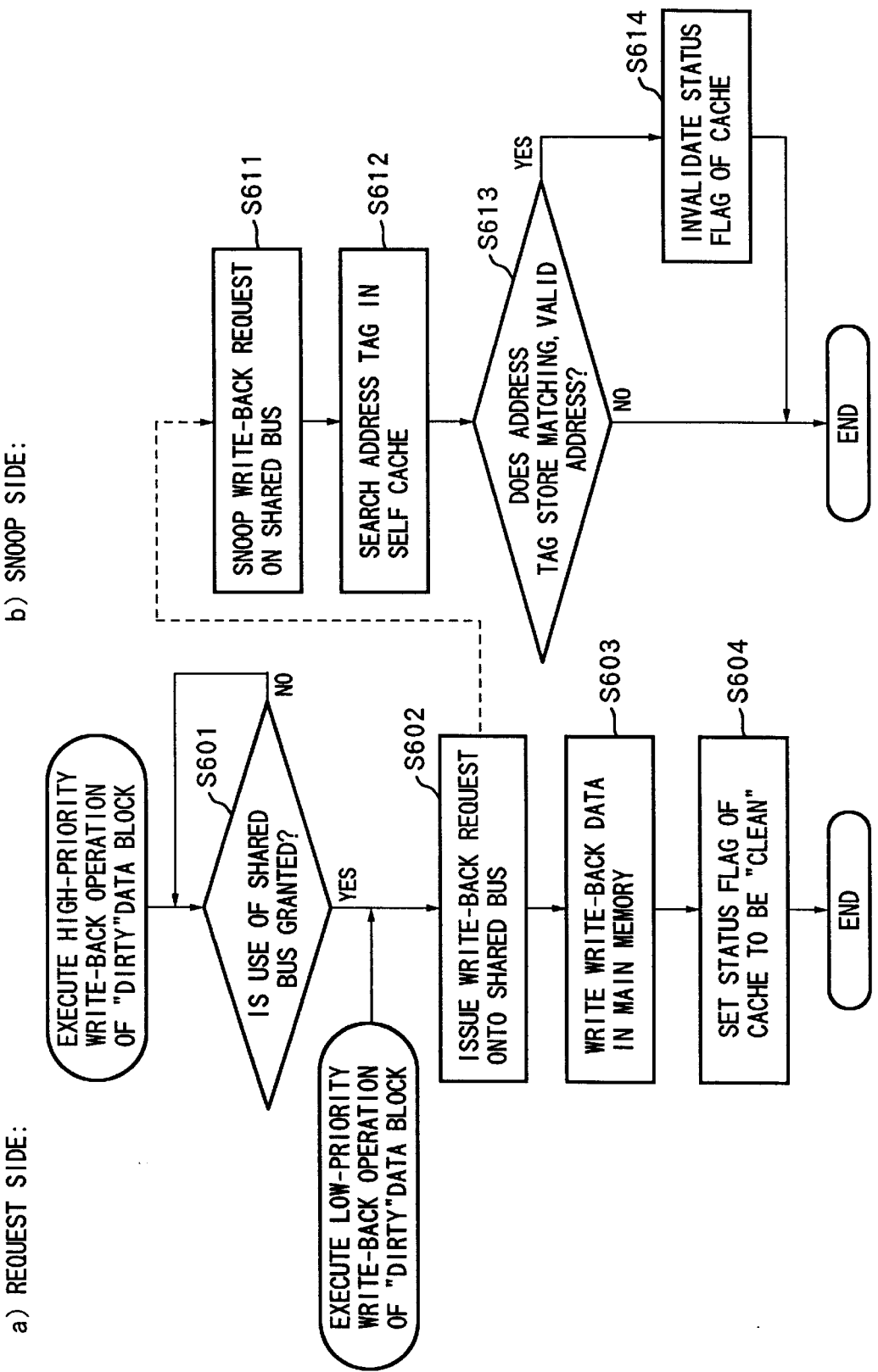
FIG. 6 is a flow chart showing the control sequence of write-back processing of "DIRTY" data of the cache used in the first embodiment of the present invention.
Figure 8:
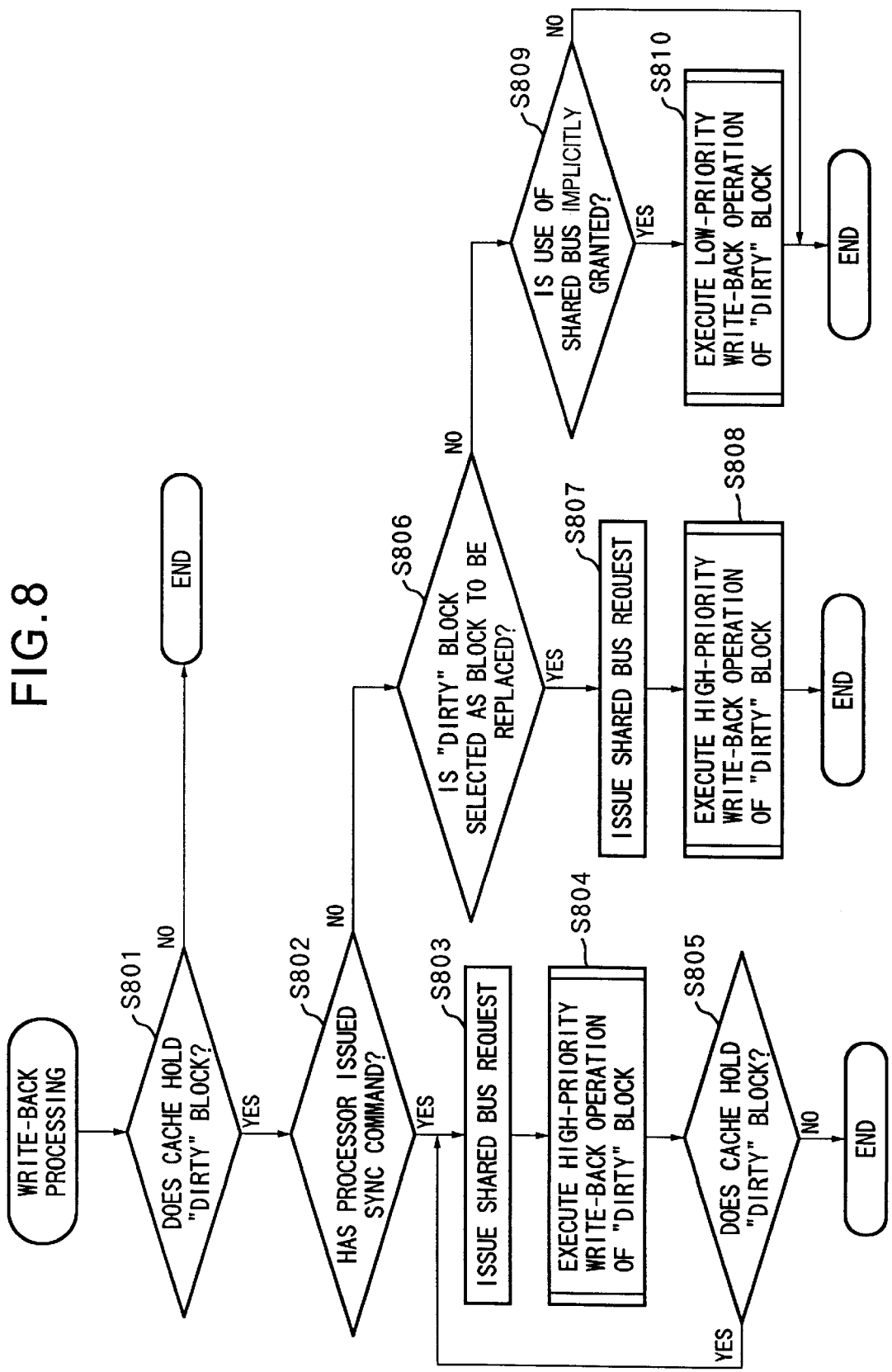
FIG. 8 is a flow chart showing the control sequence upon execution of cache write-back processing used in the first embodiment of the present invention.

FIG. 6 shows the control sequence upon execution of the write-back processing of a "DIRTY" data block to the main memory, i.e., the sequence upon execution of the high-priority write-back operation (steps S804 and S808) and the low-priority write-back operation (step S810) in the write-back sequence shown in FIG. 8. In the following description, the cache 11 performs write-back processing to the main memory 12.

The high-priority write-back processing in FIG. 6 is started immediately after the cache 11 requests the right of use of the shared bus 15. In the high-priority write-back execution sequence in FIG. 6, the cache 11 gains the right of use of the shared bus 15 (YES in step S601), thereafter, transfers write-back request source information onto the shared control bus 153 and an address of the write-back access onto the shared address bus 151, and issues a write-back request onto the shared control bus 153 (step S602). The cache 11 then supplies data to be written back onto the shared data bus 152 to write the data in the main memory 12 (step S603). Thereafter, the cache 11 sets the status flag of the written-back cache block to be "CLEAN" (step S604).

The low-priority write-back execution sequence is started from step S602 since no shared bus request is issued.

On the other hand, when the cache 11 generates a write-back request, a cache other than the cache 11 (e.g., the cache 21) snoops the address transferred on the shared bus 15 (step S611), and searches the address tag therein (step S612). As a result of searching, if the address tag holds a copy of data of the snooped address in an effective state, i.e., "DIRTY" or "CLEAN" (step S613), the status flag corresponding to the data block held in the effective state is invalidated (set to be "INVALID"). This invalidating operation is the coherence maintenance operation in this embodiment.

As described above, when the write-back processing is performed, the copy of the written-back data held in the cache subjected to the write-back processing is validated since it matches data held in the main memory, and copies of the written-back data held in other caches are invalidated, thus maintaining the coherence of the data.

[Status of Cache Block]

Figure 7:
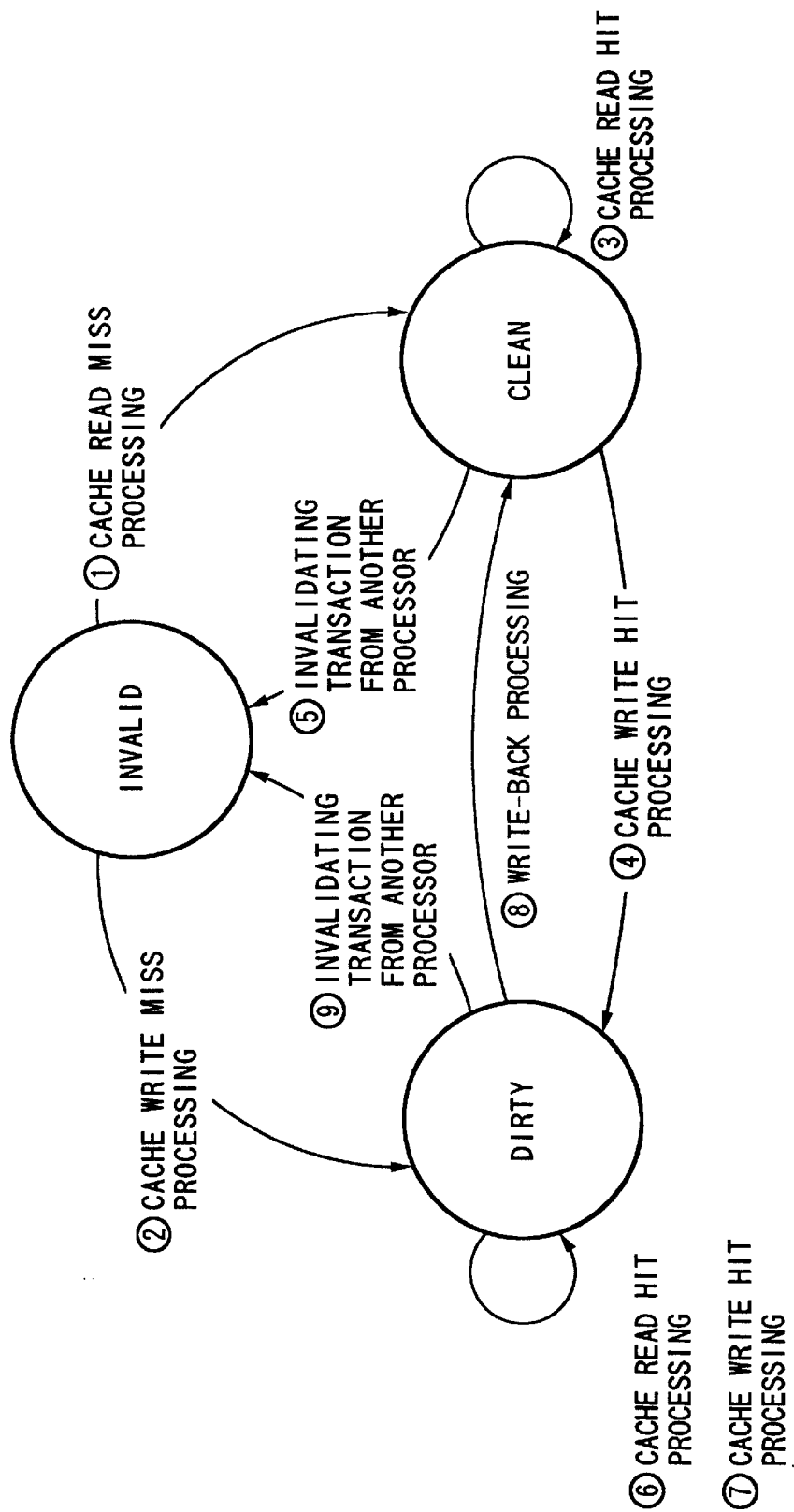
FIG. 7 is a status transition diagram of a cache status flag in the first embodiment of the present invention.

FIG. 7 is a transition diagram of the status flag upon execution of memory transactions, and summarizes the transition state of the status flag as a result of control of the cache control sequencer in accordance with FIGS. 3 to 6, FIG. 8, and FIG. 11. The following explanation will be given while taking the status flag 113 of the cache 11 as an example.

Referring to FIG. 7, status "INVALID" indicates that a data entry managed by the status flag 113 is invalid. Status "CLEAN" indicates that a data entry managed by the status flag 113 matches the corresponding data in the main memory. This data entry stores the same value as that in the main memory, but the data entry of the other cache may store the latest value. Status "DIRTY" indicates that a data entry managed by the status flag 113 is rewritten with the latest value at least once after it is loaded from the main memory, and the rewritten value is not reflected in the main memory. This data entry stores the latest value. Such status transits in correspondence with the processing, as shown in FIG. 7. In the following description, numerals enclosed in circles correspond to those in FIG. 7.

① When a LOAD instruction is issued from the processor 10 with respect to a copy of status "INVALID", cache miss processing is performed, and the status flag transits to status "CLEAN".

② When a STORE instruction is issued from the processor 10 with respect to a copy of status "INVALID", cache miss processing is temporarily executed, and the copy is updated with data read out immediately after the processing. For this reason, the status flag transits to status "DIRTY".

③ When a LOAD instruction is issued from the processor 10 with respect to a copy of status "CLEAN", cache read hit processing is executed, and the status flag transits to status "CLEAN".

④ When a STORE instruction is issued from the processor 10 with respect to a copy of status "CLEAN", cache write hit processing is executed, and the status flag transits to status "DIRTY".

⑤ When a snoop hit has occurred with respect to the write-back processing for data of status "CLEAN" by an external bus master, a coherence maintenance operation (an invalidating transaction from another processor) is executed; and the status flag transits to status "INVALID".

⑥ When a LOAD instruction is issued from the processor 10 with respect to data of status "DIRTY", cache read hit processing is executed, and the status of the status flag remains "DIRTY".

⑦ When a STORE instruction is issued from the processor 10 with respect to data of status "DIRTY", cache write hit processing is executed, and the status of status flag remains "DIRTY".

⑧ When write-back processing to the main memory is executed for data of status "DIRTY", the status flag transits to status "CLEAN".

⑨ When a snoop hit has occurred with respect to write-back processing for data of status "DIRTY" by an external bus master, a coherence maintenance operation (an invalidating transaction from another processor) is executed, and the status flag transits to status "INVALID".

With the above-mentioned status transition, the coherence between the cache blocks and the main memory in the arrangement of FIG. 1 can be held.

<Arrangement & Operation of Bus Arbiter>

In order to realize the low-priority write-back operation as the characteristic feature of the present invention, the arrangement for implicitly granting the use of the shared bus from the bus arbiter to a cache will be described below with reference to FIGS. 9 and 10.

Figure 9:
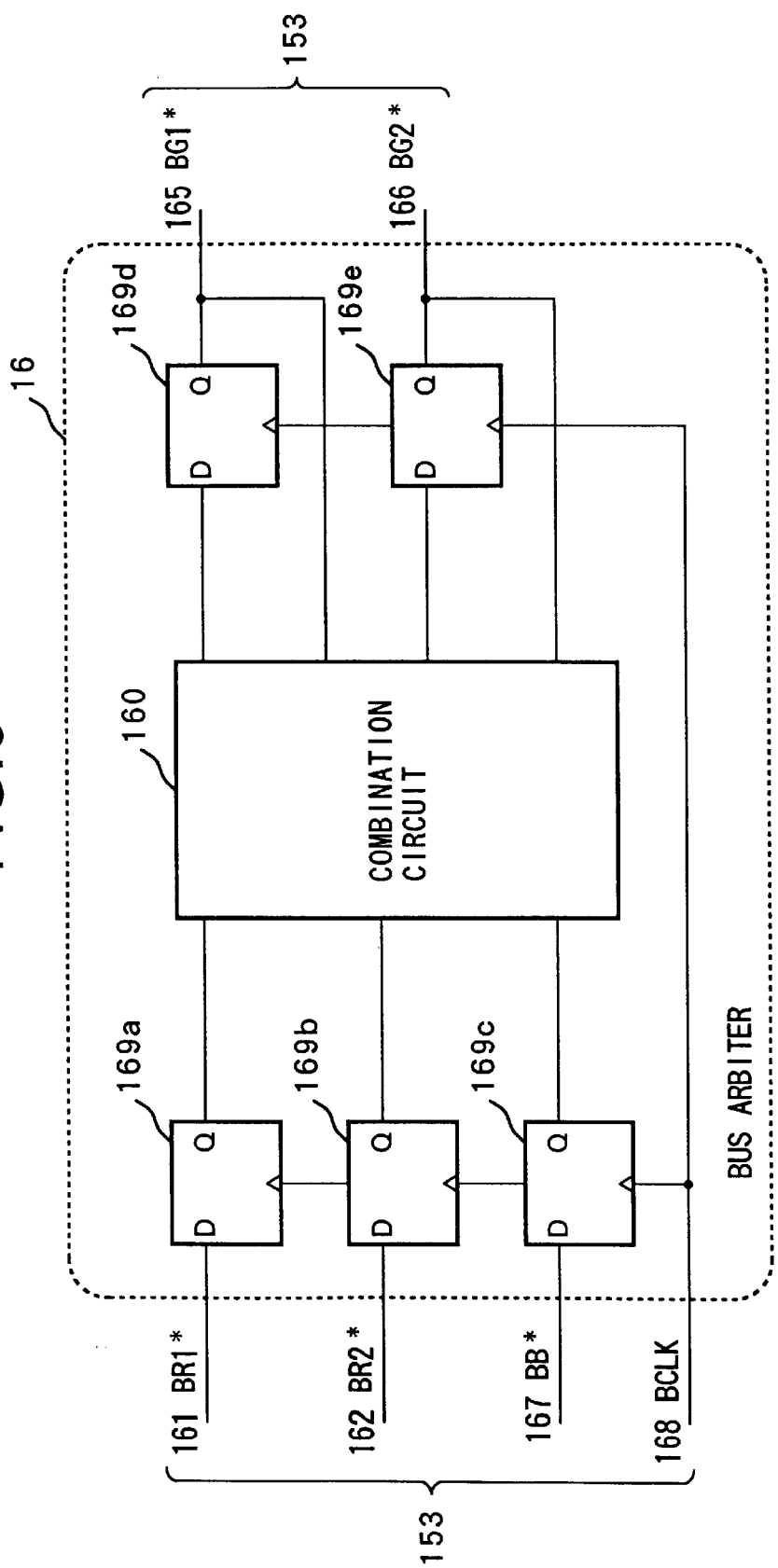
FIG. 9 is a block diagram showing the arrangement of a shared bus arbiter in the first embodiment of the present invention.

FIG. 9 shows the arrangement of the bus arbiter 16.

The bus arbiter 16 receives a shared bus request signal (BR1*) 161 and a shared bus request signal (BR2*) 162 respectively from the caches 11 and 21 as signals included in the control bus 153. The shared bus request signals 161 and 162 are true (presence of request) when they are at L level.

The bus arbiter 16 outputs a shared bus grant signal (BG1*) 165 and a shared bus grant signal (BG2*) 166 respectively to the caches 11 and 21. These signals are also true (request granted) when they are at L level.

Furthermore, the bus arbiter 16 receives a bus busy signal (BB*) 167 indicating whether or not each bus master is using the shared bus. The bus busy signal 167 indicates that the bus master is using the bus when it is at L level. The bus arbiter 16 is a synchronous circuit, and the respective signals are latched by latches 169a to 169e in response to the rising edges of system clocks (BCLK) 168. Depending on the combination of the latched signals, a combination circuit 160 performs status transition.

Figure 10:
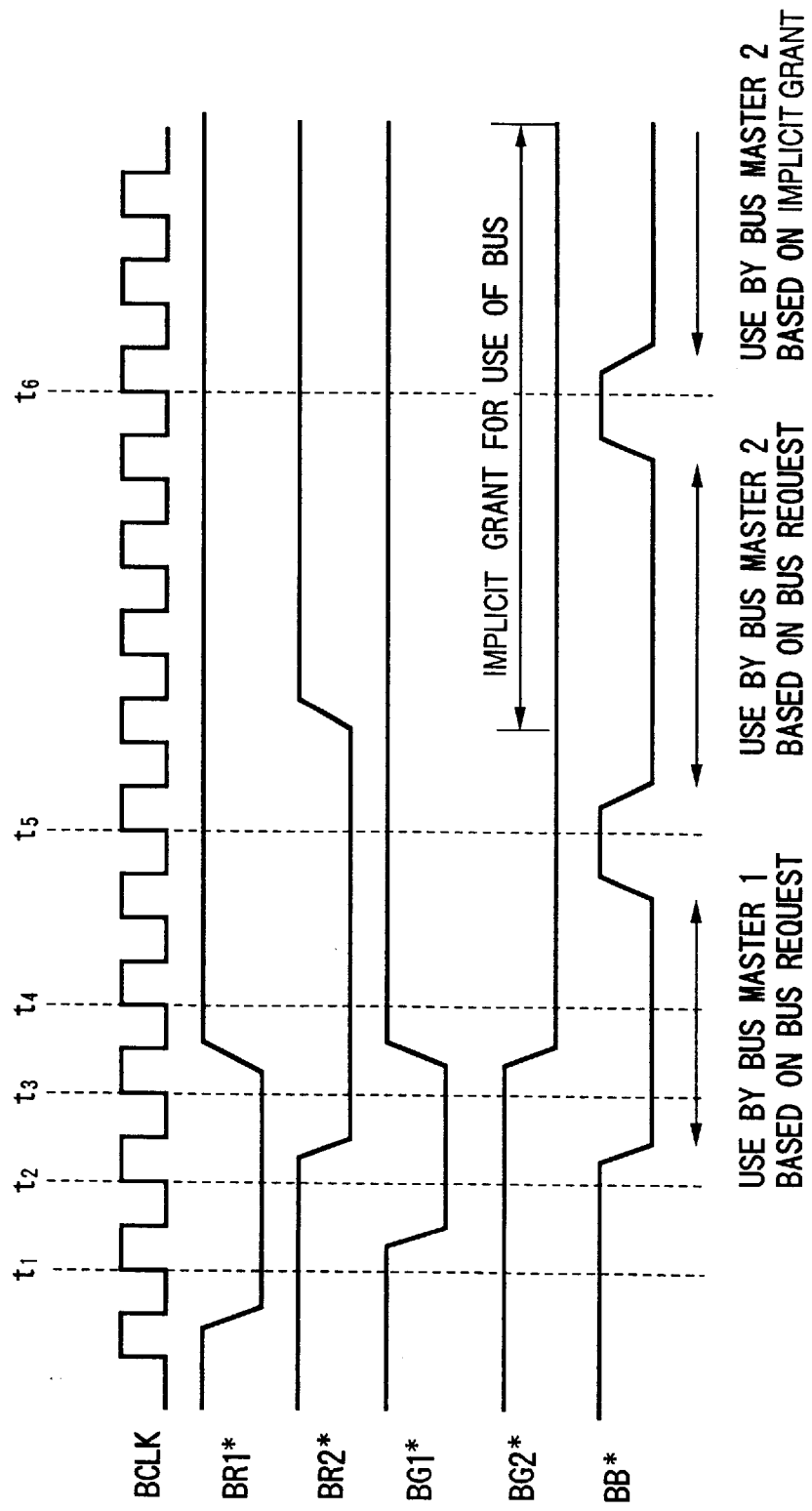
FIG. 10 is a chart showing an example of the bus arbitration protocol used in the first embodiment of the present invention.

FIG. 10 shows an example of the arbitration timing of the shared bus. In this embodiment, the bus masters output bus use requests, as shown in FIG. 10. That is, the shared bus arbitration is performed in such a manner that the bus master, which recognizes that it is granted the use of the bus (BG*=L) at the timing of the rising edge of the bus clock (BCLK) which satisfies the signal BB*=H, asserts the signal BB* to L in the next bus cycle to declare the use of the shared bus, and keeps asserting the signal BB* while it is using the shared bus.

The basic of this arbitration algorithm is that after a change in signal BB* from H to L is detected, i.e., after a certain bus master begins to use the bus, arbitration for the right of use of the bus is started, and a bus master with the highest priority is granted the use of the bus at the time of the end of the arbitration.

The priority order at the beginning of arbitration is as follows.

The bus masters are classified into the following two groups on the basis of the presence/absence of a bus use request.

Priority A: a bus master that issues a bus request

Priority B: a bus master that does not issue any bus request but currently has the right of use of the bus Note that priority A>priority B.

The order of bus masters in the group of priority A is determined by the round robin method.

If there are N bus masters (in this embodiment, N=2) and a bus master with bus master number i (0≦i≦N −1) is currently using the bus, the order in the group of priority A is defined by:

(i+1)mod N>(i+2)mod N >. . . >(i+N−2)mod N >(i+N−1)mod N>i

The right of use of the bus is assigned to bus masters that issue bus requests in this order.

Only when none of bus masters issue bus requests, the bus master which currently has the right of use of the bus continues to be granted the use of the bus. Such grant for the use which is given without any use request is called an implicit grant for the use.

The arbitration is completed when the next bus master is determined in accordance with the priority (when BG* is asserted). In this case, if the next bus master is determined by the arbitration on the basis of the implicit grant for the use of the bus, and another bus master issues a bus use request before the bus master which is implicitly granted the use recognizes its own right of use of the bus at BB*=H, re-arbitration is performed.

Referring to FIG. 10, the cache 11 (bus master 1) issues a shared bus request BR1*. Upon detection of the request at the timing t1, the bus arbiter 16 outputs a grant signal BG1* for the request before the next clock timing t2. The cache 11 outputs a bus busy signal BB* to occupy the bus. During this interval, when the cache 21 (bus master 2) issues a bus request BR2*, the bus arbiter 16 detects the request at the timing t3, and outputs a grant signal BG2* in accordance with priority. The cache 21 waits while the cache 11 is using the bus, and recognizes at the timing t5 that the shared bus 15 is not used. Then, the cache 21 outputs a bus busy signal BB* to use the bus.

When the cache 21 quits the bus request, i.e., sets the signal BR* at H, the bus arbiter 16 keeps granting the use of the bus to the cache 21 as the current bus master since none of bus masters issue shared bus requests. This grant is the implicit grant for the use with respect to the cache 21. Although the cache 21 temporarily releases the bus, it restarts the use of the bus since the cache 21 detects at the timing t6 that it is continuously granted the use of the bus.

In this embodiment, the cache write-back processing is performed at this timing, i.e., the timing (b) in FIG. 10 on the basis of the implicit grant for the use, and corresponds to steps S809 and S810 in FIG. 8.

In this manner, in FIG. 10, the signal BG2* is kept supplied to the cache 21 after the signal BR2* has changed to H ((a) in FIG. 10). This portion corresponds to the implicit grant for the use of the bus, and the cache 21 re-uses the bus without asserting the signal BR2* ((b) in FIG. 10).

With this control, when the shared bus is not used, the bus arbiter 16 can implicitly grant the use of the bus to the bus master that has used the bus immediately therebefore.

<Write-back Control (Description Based on Signals)>

How to execute the low-priority write-back operation when the use of the bus is implicitly granted will be explained below with reference to FIG. 2. The following description corresponds to a detailed one of steps S809 and S810 in FIG. 8.

Referring to FIG. 2, when no access is made from outside the cache, the cache control sequencer issues the value of an internal register 196 on an address-m signal line 171, and checks the status of the status flag 113 obtained in response to the issued value via a status signal line 192. As a result, if it is determined that the status of the block of interest is "DIRTY", the cache control sequencer controls the shared bus control interface 156 via an S-Cont signal line 195 to perform a low-priority write-back operation of the "DIRTY" block upon reception of an implicit shared bus use grant signal.

Upon recognizing that the signal BG1* 165 is at L level at the leading edge of the bus clock BCLK 168 that satisfies BB*=H although the signal BR1* is not to be asserted (i.e., the implicit grant for the use of the bus), the shared bus control interface 156 drives the signal BB* to L level to declare the use of the shared bus. Since the acquired right of use of the bus is an implicit one, the operation of another bus master is not disturbed.

Upon recognizing acquisition of the right of use of the shared bus 15, the cache control sequencer 111 generates an address of data to be written back on the basis of an address on the address-m signal line 171, a host address on an address-h' signal line 173 obtained based on the address on the line 171, and the like, and supplies the generated address to the shared bus address interface 154 to output it onto the shared bus 15. At the same time, data to be selected at that time on the SRAM 114 is selected by a select signal 193 for the selector 116, which signal is obtained by passing a comparator control signal 176 through the comparator 115, and the selected data is output onto a Data signal line 174. The output data is output onto the shared bus via the shared bus data interface 155, thus executing a write-back operation to the main memory 12.

At the same time, the cache 21 snoops the bus. When the above-mentioned write-back operation is executed, the cache 21 checks data held therein, and invalidates the status flag 113 upon detection of a corresponding entry.

With this mechanism, in a system which uses a protocol that guarantees the coherence of cache memories at the time of issuance of a SYNC instruction for synchronization from a processor, a data block, which will be written back from the cache memory to the main memory at the time of issuance of a SYNC instruction in future, can be written back while the shared bus is not used by another bus master. For this reason, the write-back operations can be prevented from being concentrated at a given time point, and high system performance can be realized.

[Second Embodiment]

In the first embodiment, even when a low-priority write-back request is present in the cache, the cache control sequencer 111 cannot write back corresponding data to the main memory 12 unless the bus arbiter 16 implicitly grants the use of the bus. In this method, when a bus master having no write-back request is implicitly granted the use of the bus, and does not use the bus, if another bus master has a low-priority write-back request, the use efficiency of the bus lowers.

In view of this problem, in the system of the second embodiment, even when a certain bus master is implicitly granted the use of the bus, if the bus master does not use the bus and another bus master has a low-priority write-back request, the implicit grant for the use of the bus is canceled, and the bus master having the low-priority write-back request is granted the use of the bus, thereby improving the use efficiency of the bus.

The arrangement of the entire system, the arrangement of the cache system, and the flows of the respective processing operations are the same as those shown in FIGS. 1 to 7 in the first embodiment.

Figure 12:
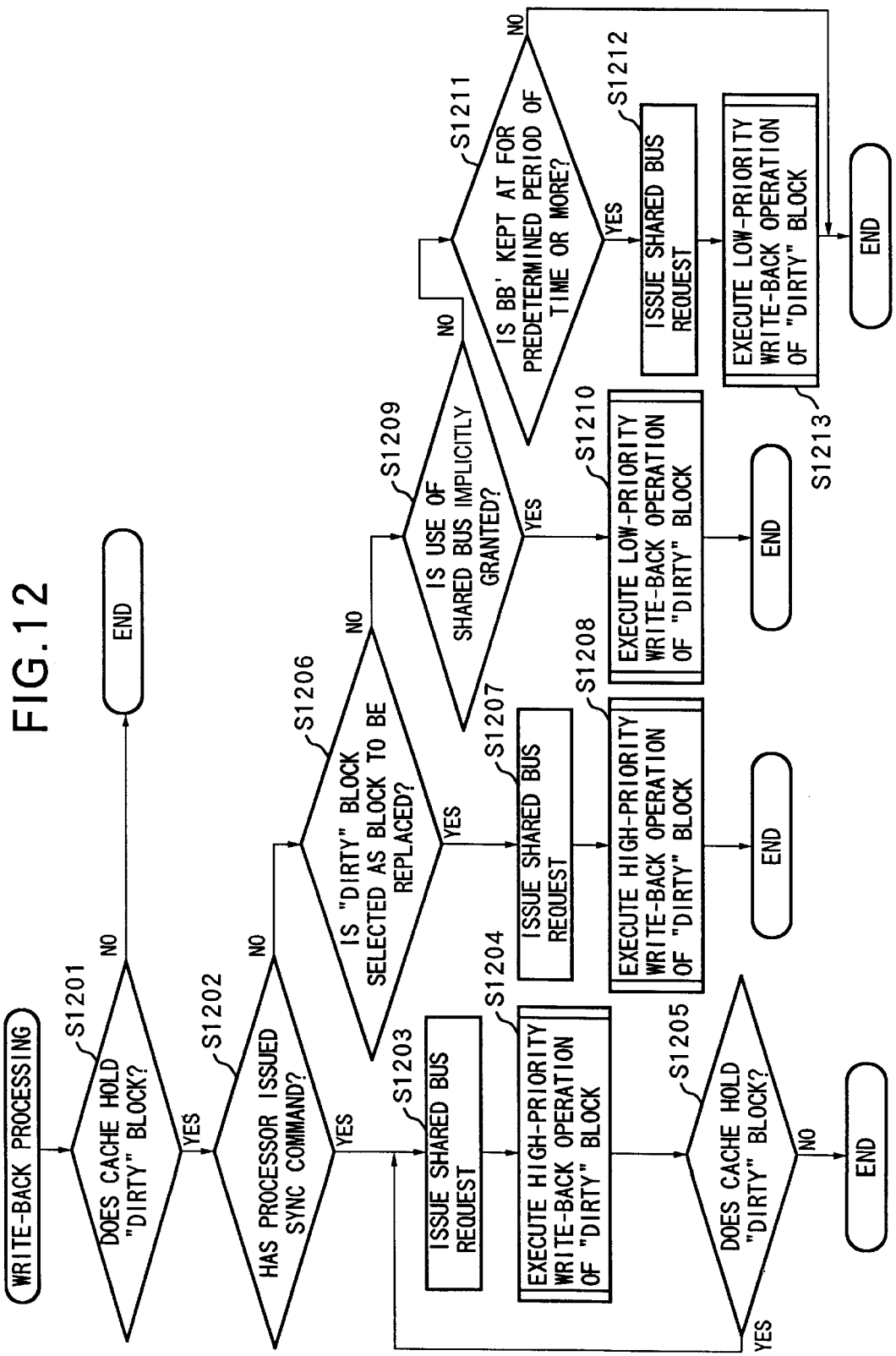
FIG. 12 is a flow chart showing the control sequence up to execution of cache write-back processing used in the second embodiment of the present invention.

FIG. 12 shows the control sequence upon execution of write-back processing of the cache in the second embodiment. The difference from FIG. 8 in the first embodiment is that a new path is added as the execution method of the low-priority write-back operation. That is, in this embodiment, the write-back operation is performed in the following four cases (i.e., case 4 in addition to cases 1 to 3 of the first embodiment):

1: when the processor issues a SYNC instruction,
2: when a cache miss has occurred, and a "DIRTY" block is selected as the block to be replaced,
3: when a "DIRTY" block is present in the cache and the shared bus is not busy, and
4: when a "DIRTY" block is present in the cache, and another bus master does not use the bus although the cache is not granted the use of the shared bus (including a case wherein another bus master is implicitly granted the use of the bus).

Cases 1 to 3 have been described in the above embodiment, and a detailed description thereof will be omitted. In case 4, a bus master which is to perform the write-back operation can determine this case, since none of the other bus masters use the bus, although it is not assigned the right of use of the shared bus. The write-back operation in case 4 is also called the low-priority write-back operation.

In FIG. 12, steps S1201 to S1210 are substantially the same as steps S801 to S810, except that if it is determined in step S1209 that a certain cache is not granted the use of the shared bus, and if a bus busy signal BB* is kept at H level for a predetermined period of time, i.e., the bus is not used for a predetermined period of time (YES in step S1211), a shared bus request is issued (step S1212), and a write-back operation of DIRTY data is executed (step S1213). Note that the write-back operation in step S1213 is called from step S601 of confirming the grant for the use with respect to the bus request as in the high-priority write-back operation since a shared bus request is to be issued, although it is the low-priority write-back operation.

The apparatus and sequence for realizing case 4 above will be described in detail below.

Referring to FIGS. 2 and 9, when no access outside the cache is made, the cache control sequencer 111 issues the value of the internal register 196 on the address-m signal line 171, and checks the status of the status flag 113 obtained in response to the issued value via the status signal line 192. As a result, if it is determined that the status of the block of interest is "DIRTY", the cache control sequencer controls the shared bus control interface 156 via the S-Cont signal line 195 to perform a low-priority write-back operation of the "DIRTY" block upon reception of an implicit shared bus use grant signal.

Upon reception of the low-priority write-back request, the shared bus interface 156 waits for the implicit grant for the use of the bus. At the same time, the interface 156 monitors the state of the shared bus to check if another bus master is implicitly granted the use of the bus but does not use the bus in practice (shared bus inactive state).

In this embodiment, the shared bus inactive state is recognized as a state wherein the bus master of interest is not granted the use of the bus, and the signal BB* 167 is kept at H for a predetermined time period T or longer.

The predetermined time period T is a value determined as the protocol of the shared bus, and T=2 when the protocol shown in FIG. 10 in the first embodiment is used.

The shared bus control interface 156 that recognized the shared bus inactive state by detecting T ≧2 drives a bus request signal BR1* to L so as to seek the right of use of the bus. Upon reception of the grant for the use of the bus in the form of a grant signal BG1*=L, the shared bus control interface 156 drives the signal BB* 167 to L to execute a low-priority write-back operation.

Upon recognizing acquisition of the right of use of the shared bus, the cache control sequencer 111 generates an address of data to be written back on the basis of an address on the address-m signal line 171, a host address on the address-h' signal line 173 obtained based on the address on the line 171, and the like, and supplies the generated address to the shared bus address interface 154 to output it onto the shared bus 15. At the same time, data to be selected at that time on the SRAM 114 is selected by a select signal 193 for the selector 116, which signal is obtained by passing a comparator control signal 176 through the comparator 115, and the selected data is output onto the Data signal line 174. The output data is output onto the shared bus via the shared bus data interface 155, thus executing a write-back operation to the main memory 12.

Once granted the use of the bus, the shared bus control interface 156 deasserts the signal BR1* at that time, and executes the subsequent low-priority write-back operation on the basis of the implicit grant for the use of the bus.

At the same time, the cache 21 snoops the bus. When the above-mentioned write-back operation is executed, the cache 21 checks data held therein, and invalidates the status flag 113 upon detection of a corresponding entry.

With this mechanism, in a system which uses a protocol that guarantees the coherence of cache memories at the time of issuance of a SYNC instruction for synchronization from a processor, a data block, which will be written back from the cache memory to the main memory at the time of issuance of a SYNC instruction in future, can be written back while the shared bus is not used by another bus master, thus improving the system performance.

Furthermore, in addition to the effect of the first embodiment, in this embodiment, when the shared bus is not used, the cache can perform a write-back operation by acquiring the right of use of the bus even through it is not assigned the right of use of the bus. Therefore, a bus master other than that which used the bus latest can perform the write-back operation by seeking a grant for the use by issuing a bus request, and an implicit grant for the use of the bus given thereafter. For this reason, the write-back operation can be frequently performed, and write-back transactions can be prevented from being concentrated.

[Third Embodiment]

The arrangement and some control operations of a multi-processor system according to the third embodiment are the same as those of the system in the first embodiment shown in FIGS. 1 to 7 and FIG. 11. However, write-back control (step S503 in FIG. 5) and the arrangement of the bus arbiter 16 are different from those in the first embodiment. The characteristic feature of this embodiment will be mainly described below.

[Write-back Control]

The control sequence until data is written back from the cache to the memory as the characteristic feature of this system will be described below with reference to the flow chart in FIG. 13.

The characteristic feature of this system lies in that the write-back operation of the cache is executed in correspondence with a relaxed memory coherence model. In a conventional system, a write-back operation is executed when another processor makes a read access to a "DIRTY" block which has been rewritten with the latest value in the its own cache. However, the system of this embodiment does not perform the write-back operation at this timing. The write-back operation is performed in the following cases:

1: when the processor issues a SYNC instruction;
   In this case, all "DIRTY" blocks in the cache are written back to the main memory.

2: when a cache miss has occurred, and a "DIRTY" block is selected as the block to be replaced;

In this case, only the block to be replaced in the cache is written back to the main memory.

3: when a "DIRTY" block is present in the cache, and the shared bus is not busy;

In this case, when the shared bus is not busy, "DIRTY" blocks are sequentially written back to the memory. When a transaction of higher priority is generated (e.g., a processor generates a SYNC instruction) during execution of this write-back operation, the shared bus request is switched to a high-priority mode.

In case 1, upon detection of issuance of the SYNC instruction from the processor by, e.g., decoding a control signal, the cache control sequencer 111 repetitively executes write-back operations for all "DIRTY" blocks in the cache.

Case 2 corresponds to a case wherein a cache miss has occurred, and the write-back operation is performed after the cache control sequencer 111 detects the block to be replaced by a replacement algorithm such as LRU when a cache block is to be replaced.

Since case 3 concerns the characteristic feature of this embodiment, the apparatus and sequence for realizing case 3 will be described in detail below with reference to the sequence shown in FIG. 13. FIG. 13 shows the control sequence of the cache control sequencer upon execution of the write-back operation.

When write-back processing is started, it is checked if a "DIRTY" block is present in the cache (step S1301). If YES in step S1301, i.e., if case 1 above is determined (called from FIG. 11), it is detected if the write-back operation has been started in response to a SYNC instruction issued by the processor (step S1302), and the cache control sequencer 111 issues a high-priority shared bus request (step S1303), thereby repetitively executing write-back operations until all the "DIRTY" blocks in the cache are written back (steps S1304 and S1305).

If case 2 above is determined, i.e., if a "DIRTY" cache block is to be replaced upon occurrence of a cache miss (YES in step S1306), the cache control sequencer 111 issues a high-priority shared bus request to obtain a grant for the use of the shared bus 15 (step S1307). Thereafter, the sequencer 111 writes back a cache block to be replaced to the main memory 12 (step S1308).

If case 3 is determined, the cache control sequencer 111 issues a low-priority shared bus request (step S1309), and it is checked if a high-priority bus request is issued before it receives the grant for the use (signal BG*) (step S1310). If such request is not issued (NO in step S1310), the sequencer 111 writes back "DIRTY" blocks (step S1311).

The control sequence upon execution of the write-back processing of a "DIRTY" data block to the main memory (steps S1304, S1308, and S1310) is the same as the high-priority write-back processing of the "DIRTY" block in FIG. 6, and a detailed description thereof will be omitted. Also, the status flag transits as shown in FIG. 7.

<Write-back Control (Description Based on Signals)>

The write-back control has been described in terms of its sequence. In the following description, the write-back control including issuance of a low-priority shared bus request as the characteristic feature of this embodiment will be explained in view of signal control.

[Cache]

In FIG. 2, when no access outside the cache is made, the cache control sequencer issues the value of the internal register 196 on the address-m signal line 171, and checks the status of the status flag 113 obtained in response to the issued value via the status signal line 192. As a result, if it is determined that the status of the block of interest is "DIRTY", the cache control sequencer controls the shared bus control interface 156 via the S-Cont signal line 195 to drive a low-priority shared bus request signal. With this control, the shared bus control interface 156 drives a shared bus request signal (BR1*) 161 and a bus request priority signal indicating low priority to L with respect to the bus arbiter 16. The bus request priority signal is a signal LP1* 163 in FIG. 14, and is included in the control bus 153.

[Bus Arbiter]

Figure 14:
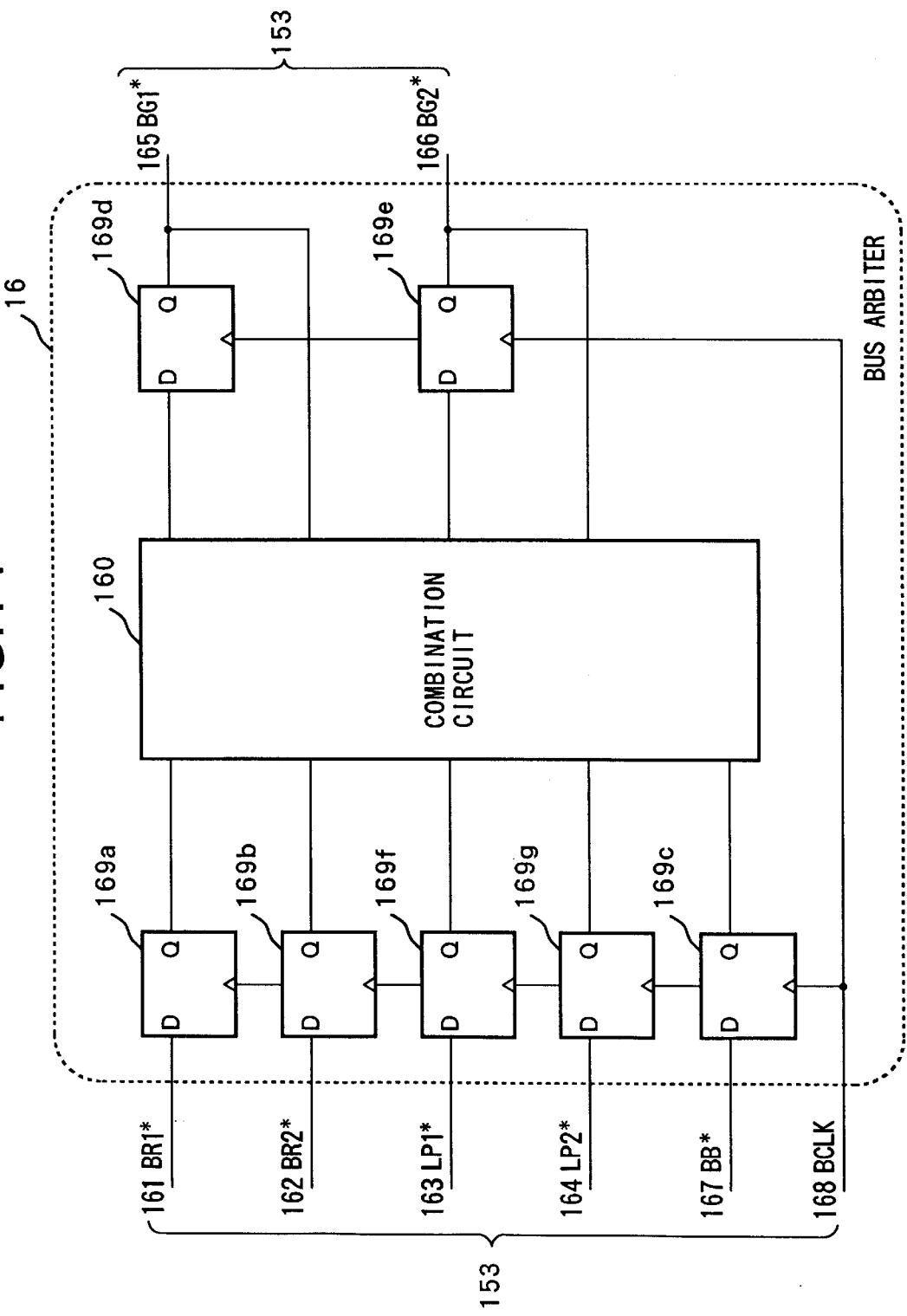
FIG. 14 is a block diagram showing the arrangement of a shared bus arbiter in the third embodiment of the present invention.

The bus arbiter 16 that received the abovementioned signals operates as follows. FIG. 14 shows the arrangement of the bus arbiter 16.

The bus arbiter 16 receives a shared bus request signal (BR1*) 161 and a bus request priority signal (LP1*) 163 of the cache 11, and a shared bus request signal (BR2*) 162 and a bus request priority signal (LP2*) 164 of the cache 21, respectively from the caches 11 and 21 as signals included in the control bus 153. The shared bus request signals 161 and 162 are true when they are at L level. The bus request priority signals 163 and 164 indicate low priority when they are asserted to L level.

The bus arbiter 16 outputs a shared bus grant signal (BG1*) 165 and a shared bus grant signal (BG2*) 166 respectively to the caches 11 and 21. These signals are also true when they are at L level.

Furthermore, the bus arbiter 16 receives a bus busy signal (BB*) 167 indicating whether or not each bus master is using the shared bus (when BB*=L, it indicates that a certain bus master is using the bus). The bus arbiter 16 is a synchronous circuit, and the respective signals are latched in response to the rising edges of system clocks (BCLK) 168. Depending on the combination of the latched signals, a combination circuit 160 makes status transitions.

FIG. 15 shows an example of the arbitration timing of the shared bus. In this embodiment, bus arbitration is performed as follows. The shared bus masters output bus use request signals BR*, as shown in FIG. 15. Upon recognizing that it is granted the use of the bus (BG*=L) at the timing of the rising edge of the bus clock (BCLK) upon detection of BB*=H (bus master 1 is in this state at the timing t1 in FIG. 15), the bus master asserts the signal BB* to L in the next bus cycle to declare the use of the shared bus, and keeps asserting the signal BB* while it is using the shared bus.

The basic rule of this arbitration algorithm is that after a change in signal BB* from H to L is detected (after a certain bus master begins to use the bus), arbitration for the right of use of the bus is started, and a bus master with the highest priority is granted the use of the bus at the time of the end of the arbitration.

The priority order at the beginning of arbitration is as follows. The bus masters are classified into the following three groups on the basis of the presence/absence of a bus request.

Priority A: a bus master that issues a high-priority bus request

Priority B: a bus master that issues a low-priority bus request

Priority C: a bus master that does not issue any bus request but currently has the right of use of the bus Note that priority A>priority B>priority C.

The order of bus masters in each priority group is determined by the round robin method. That is, if there are N bus masters (in this embodiment, N=2) and a bus master with bus master number i ($0 \leq i \leq N-1$) is currently using the bus, the order is defined by:

$(i+1) \bmod N > (i+2) \bmod N > \ldots > (i+N-2) \bmod N > (i+N-1) \bmod N > i$ The right of use of the bus is assigned to bus masters that issue bus requests in this order. If the right of use of the bus is not assigned to any bus masters immediately before the beginning of the arbitration (at the beginning of the operation of the system), the right of use of the bus is assigned to a bus master with smallest bus master number i.

The arbitration is completed when the next bus master is determined in accordance with the priority (when BG* is asserted). In this case, if a bus request included in a higher-priority group is generated before the bus master determined by the arbitration recognizes its own right of use of the bus based at BB*=H, re-arbitration is performed. Once the bus master is determined, if a request with higher priority based on the round robin method is issued in the identical priority group, no re-arbitration is performed.

With this control, the bus arbiter 16 can grant permission to write back a "DIRTY" block to the memory to each cache only when the shared bus is not actually busy.

FIGS. 16A to 17B show the truth tables showing the logic for performing the above-mentioned arbitration by the bus arbiter 16. FIGS. 16A and 16B show the truth table for the signal BG1* and FIGS. 17A and 17B show the truth table for the signal BG2*. In FIG. 16A, bus master 1 is unconditionally granted the use of the bus in the following two cases. In the first case, the signal BR1* =L and the signal BR2* =H irrespective of the value of the priority signal, i.e., only bus master 1 is seeking the use of the bus. In the second case, BR1*=L, LP1*=H, BR2* =L, and LP2*=L, i.e., bus master 1 issues a high-priority bus request, and bus master 2 issues a low-priority bus request.

RR1 indicates a case wherein arbitration must be performed in an identical priority group, and FIG. 16B shows its contents. More specifically, in this case, since the priority order is determined in accordance with the above-mentioned round robin method, a bus master having a number next to that of the bus master granted the use immediately before the arbitration is granted the use. In this embodiment, since two bus masters are used, if the immediately preceding BG2* (=BG2') is L, BG1* is set to be L.

The same applies to the signal BG2*. In this case, as shown in FIGS. 17A and 17B, signal number 2 replaces 1 in FIGS. 16A and 16B.

A case will be described below while taking FIG. 15 as an example. At the timing t2, the signal BR1* is H, the signal BR2* is L, and these signals have equal priority. For this reason, as a result of arbitration, the signal BG2* is set to be L, and bus master 2 is granted the use of the bus.

At the timing t3, since none of bus masters issue bus request signals, a bus master that has the right of use of the bus at that time is granted the use. For this reason, bus master 2 temporarily releases the bus at the next clock timing, but immediately restarts the use of the bus since it is granted the use.

The method of outputting a bus use grant signal from the bus arbiter has been described. The caches as bus masters operate as follows in correspondence with the arbitration result of the bus arbiter.

Referring to FIG. 2, the cache control sequencer 111 recognizes that the signal BG1* is at L at the rising edge of the bus clock BCLK 168 that satisfies BB =H with respect to the signals BR1* 161 and Lp1* 163. The cache control sequencer 111 generates an address of data, for which the bus request is issued, on the basis of an address on the address-m signal line 171, a host address on the address-h' signal line 173 obtained based on the address on the line 171, and the like, and supplies the generated address to the shared bus address interface 154 to output it onto the shared bus. At the same time, data to be selected at that time on the SRAM 114 is selected by a select signal 193 for the selector 116, which signal is obtained by passing a comparator control signal 176 through the comparator 115, and the selected data is output onto the Data signal line 174. The output data is output onto the shared bus via the shared bus data interface 155, thus executing a write-back operation to the main memory 12.

At the same time, the cache 21 snoops the bus. When the above-mentioned write-back operation is executed, the cache 21 checks data held therein, and invalidates the status flag 113 upon detection of a corresponding entry.

With this mechanism, in a system which uses a protocol that guarantees the coherence of cache memories at the time of issuance of an instruction for synchronization (to be referred to as a SYNC instruction hereinafter) from a processor, a data block, which will be written back from the cache memory to the main memory at the time of issuance of a SYNC instruction in future, is written back in advance when the shared bus is not used by another bus master, thus improving the system performance.

[Fourth Embodiment]

In the above embodiments, the method of snooping the bus is used in the coherence maintenance operation of the cache memories. However, in a parallel computer system that uses a connection network for interconnecting between processors and between processors and a main memory, which network can hardly monitor all the transactions, a directory method is used. Such case will be described below as the fourth multiprocessor system according to the present invention. Common drawings and reference numerals described in the third embodiment will be quoted in this embodiment.

<System Arrangement>

Figure 18:
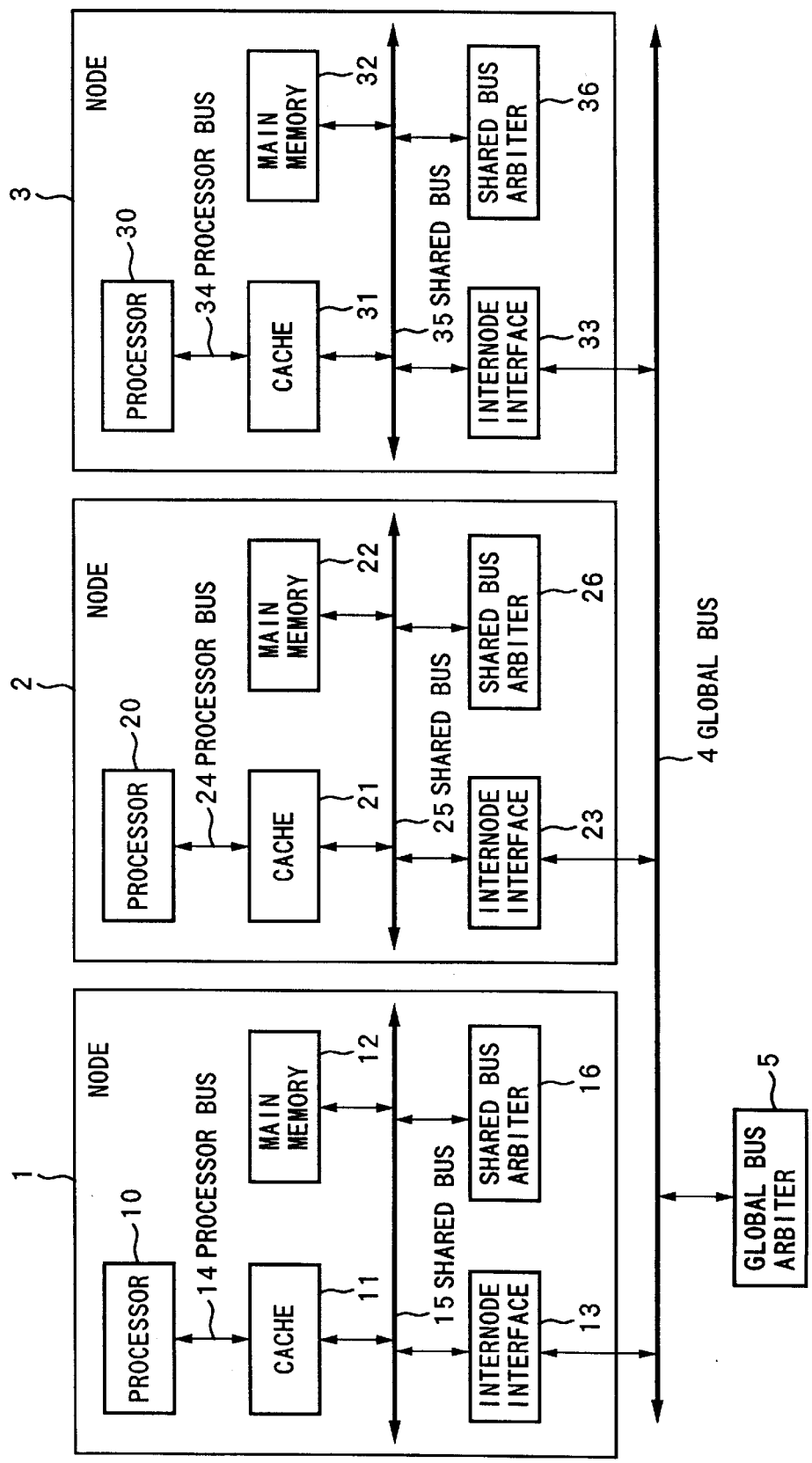
FIG. 18 is a block diagram showing the arrangement of a system that realizes the fourth embodiment of the present invention.

FIG. 18 is a block diagram showing the arrangement of the fourth multi-processor system according to the present invention.

Referring to FIG. 18, reference numerals 1, 2, and 3 denote computer nodes. Processors 10, 20, and 30 are respectively connected to caches 11, 21, and 31 via processor buses 14, 24, and 34. The caches 11, 21, and 31 are respectively connected to main memories 12, 22, and 32, and internode interfaces 13, 23, and 33 via shared buses 15, 25, and 35. A global bus 4 connects the internode interfaces 13, 23, and 33. The right of use of the global bus 4 is arbitrated by a global bus arbiter 5.

In FIG. 18, the number of computer nodes connected is 3. However, the present invention is not limited to three nodes. Also, each node includes a pair of processor and cache. However, the number of pairs of processors and caches is not limited to one pair.

The system of this embodiment is an information processing system which has the arrangement as shown in FIG. 18 and performs coherence control adopting a relaxed memory coherence model that guarantees the coherence of data at the time of issuance of a SYNC instruction from a processor. When each cache holds a data block ("DIRTY" block), which is rewritten with the latest value but does not reflect its value in the main memory thereafter, and the global bus and the shared bus in each node are not used by another bus master, the cache performs a write-back processing of the "DIRTY" block to the corresponding main memory. On the other hand, when a copy of data in the data block of interest is held in another cache, the cache that holds the copy executes a coherence maintenance transaction with respect to the held cache data block. In this manner, the system of this embodiment can distribute the traffic of coherence maintenance transactions peaked at the time of issuance of a SYNC instruction.

Figure 19:
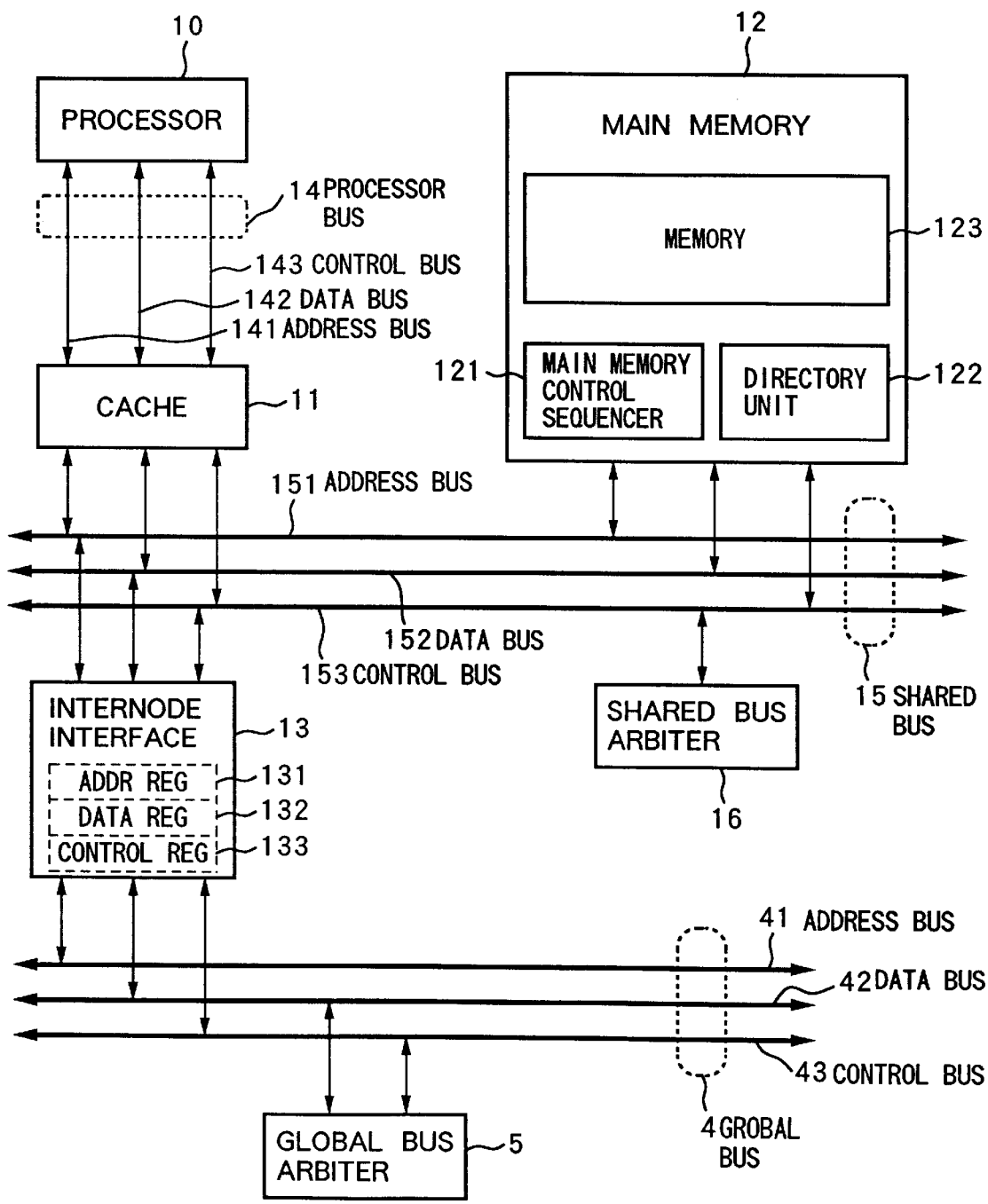
FIG. 19 is a block diagram showing the arrangement of a computer node according to the fourth embodiment of the present invention.

FIG. 19 shows the internal arrangement of the computer node as a portion of this embodiment. FIG. 19 shows the arrangement of the computer node 1 as an example, and the computer nodes 2 and 3 also have the same arrangement as that of the computer node 1.

Referring to FIG. 19, the processor 10 can issue multiple memory accesses, and has a special instruction (SYNC instruction) for completing the multiple-issued memory accesses while warranting the coherence of the relaxed memory coherence model.

Referring to FIG. 19, the main memory 12 includes a main memory control sequencer 121, a memory 123, and a directory unit 122. The processor bus 14 consists of three sets of signal lines, i.e., an address bus 141, a data bus 142, and a control bus 143, that connect the processor 10 and the cache 11. Intranode shared buses 151, 152, and 153 are respectively an address bus, a data bus, and a control bus for connecting the cache 11, the internode interface 13, and the main memory 12. The global bus 4 for connecting the nodes 1, 2, and 3 includes an address bus 41, a data bus 42, and a control bus 43, that connect the internode interfaces 13, 23, and 33. The global bus arbiter 5 arbitrates the right of use of the global bus 4.

Since the arrangement of the caches 11 to 31 is the same as that in the above-mentioned embodiment, the arrangement shown in FIG. 2 will be quoted. FIG. 2 exemplifies the arrangement of the cache 11, and the caches 21 and 31 have the same arrangement as that of the cache 11. Also, the protocol of the cache is a write-back invalidating type protocol, and the status transition of the flag of the cache is the same as that shown in FIG. 7. Since they have already been described in detail in the first embodiment, a detailed description thereof will be omitted.

The operation of the cache system of this embodiment will be briefly described below with reference to FIGS. 18, 19, 20, 21, and 22.

Figure 20:
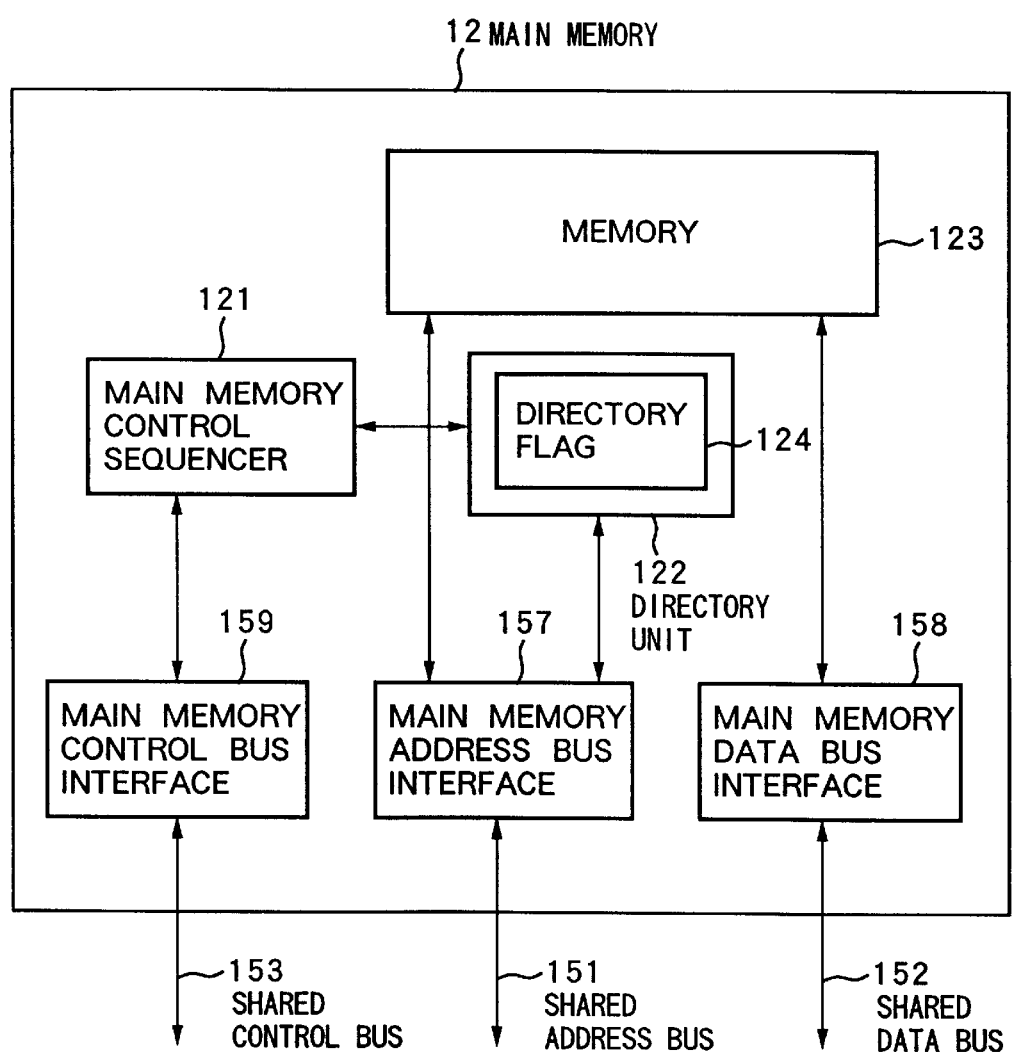
FIG. 20 is a block diagram showing the arrangement of a main memory and a directory in the fourth embodiment of the present invention.

FIG. 20 shows in more detail the arrangement of the main memory 12 as a portion of the system of this embodiment. The directory unit 122 has a directory flag 124, and the main memory control sequencer 121 controls the entire main memory 12.

<Control of LOAD Instruction>

Figure 21:
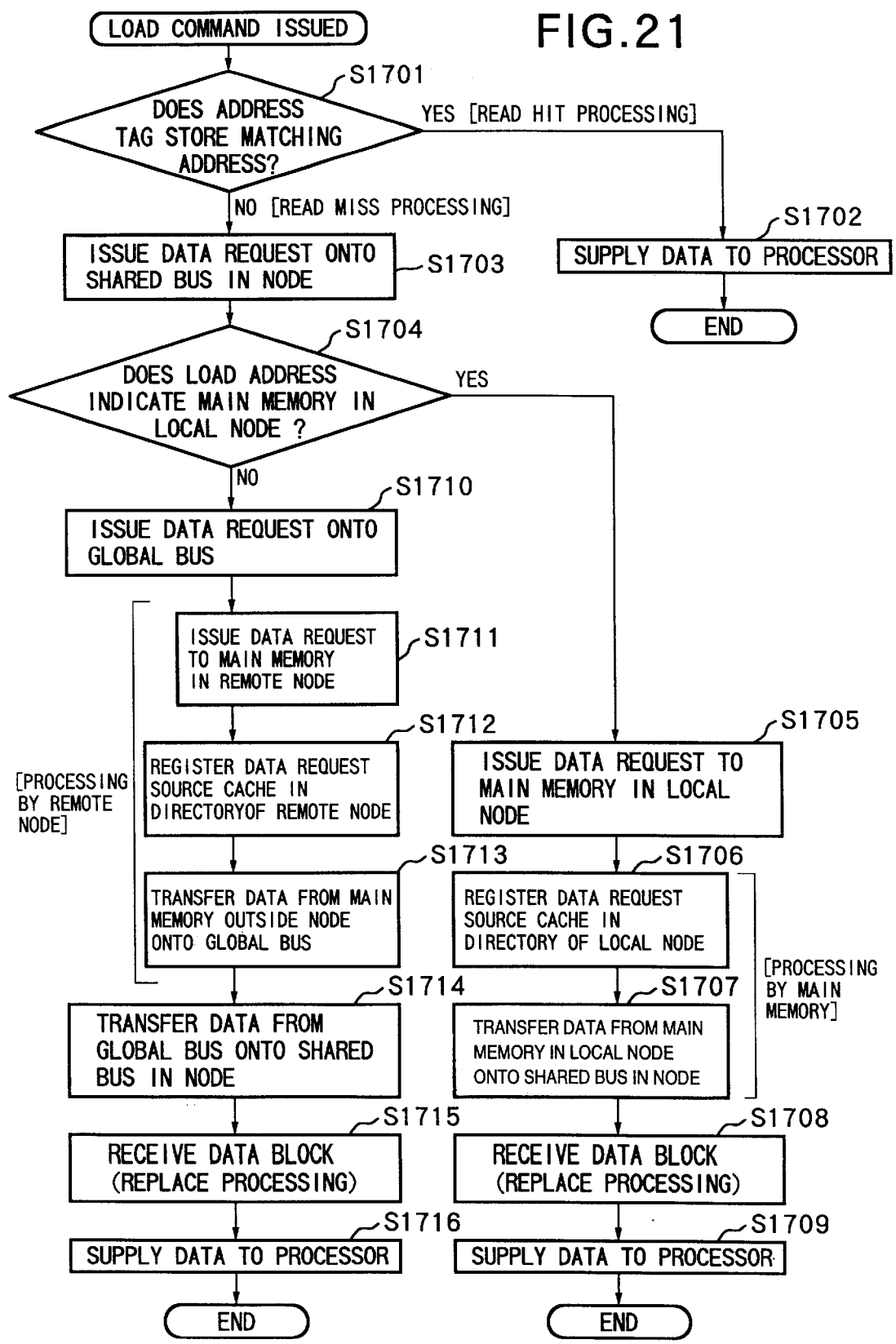
FIG. 21 is a flow chart showing the control sequence upon execution of a LOAD instruction used in the fourth embodiment of the present invention.

FIG. 21 shows the control sequence in the cache 11, the main memory 12, and a remote node upon execution of a LOAD instruction by the processor 10 in the system of this embodiment. Note that a node which is executing an instruction such as a LOAD instruction will be referred to as a local node hereinafter, and other nodes will be referred to as remote nodes hereinafter.

Referring to FIG. 21, when a cache read hit has occurred with respect to the LOAD instruction issued by the processor 10, i.e., an address tag of the cache 11 stores an address matching that of the data block to be loaded (YES in step S1701), the cache 11 supplies data to the processor 10 (step S1702).

On the other hand, when a cache read miss has occurred with respect to the LOAD instruction issued by the processor 10, the cache 11 issues an access request onto the shared bus 15 (step S1703). In this case, the cache 11 does not supply any data to the processor 10 until it receives data that caused the cache read miss.

When a cache read miss has occurred and the memory access is made with respect to the main memory 12 in the computer node 1 (local node) (YES in step S1704), the cache 11 requests data to the main memory 12 (step S1705).

The subsequent steps S1706 and S1707 are to be executed by the main memory control sequencer 121 in the main memory 12, and the control sequencer 111 of the cache 11 restarts control upon reception of the processing result in these two steps. The main memory control sequencer 121 registers the directory flag 124 corresponding to the cache 11 in the directory unit 122 in the main memory 12 (step S1706). Then, the main memory control sequencer 121 transfers the data requested by the cache 11 to the cache 11 via the shared bus 15 (step S1707).

The cache 11 receives the data via the shared data bus 152 and reads the corresponding entry in the SRAM 144 (step S1708). Thereafter, the cache 11 supplies data to the processor 10 (step S1709).

On the other hand, when a cache read miss has occurred and the memory access is made with respect to the main memory (e.g., the main memory 22) in the node (remote node) other than the computer node 1 (NO in step S1704), the internode interface 13 of the node 1 issues a data request to the internode interface 23 in the node 2 via the global bus 4 (step S1710).

The subsequent steps S1711 to S1713 are processed by the main memory control sequencer in the node 2.

Upon reception of the data request, the internode interface 23 issues a data request to the main memory 22 together with data request source information (step S1711), and the main memory 22 registers the directory flag corresponding to the cache as the data request source in its directory unit (step S1712). The main memory 22 supplies data to the internode interface 23, and the internode interface 23 transfers the data onto the global bus 4 (step S1713).

When the data is output onto the global bus 4 in this manner, the internode interface 13 of the node 1 reads the data on the global bus 4, and transfers it onto the shared bus 15 (step S1714). The cache 11 receives this data and replaces a data block therein by the received data (step S1715). After the desired data is loaded into the cache 11, the cache 11 supplies the data to the processor 10 (step S1716).

As described above, either a local or remote node can load data to be loaded into its cache, and a processor can access the data in the cache.

The buses in the local node are managed by the shared bus arbiter in the same sequence as that described in the above embodiment. In this case, there are two bus masters, i.e., the cache and the internode interface. Also, the global bus 4 is managed by the global bus arbiter 5. The arbiter 5 manages the bus in the same manner as in the above embodiment to have the internode interfaces of the respective nodes as bus masters.

Note that the control sequence upon issuing a STORE instruction is the same as that shown in FIG. 4 in the first embodiment, and a detailed description thereof will be omitted. In this embodiment, however, the cache miss processing in step S402 in FIG. 4 is replaced by processing after the read miss processing executed when NO is determined in step S1701 in FIG. 21.

<Write-back Processing>

Figure 13:
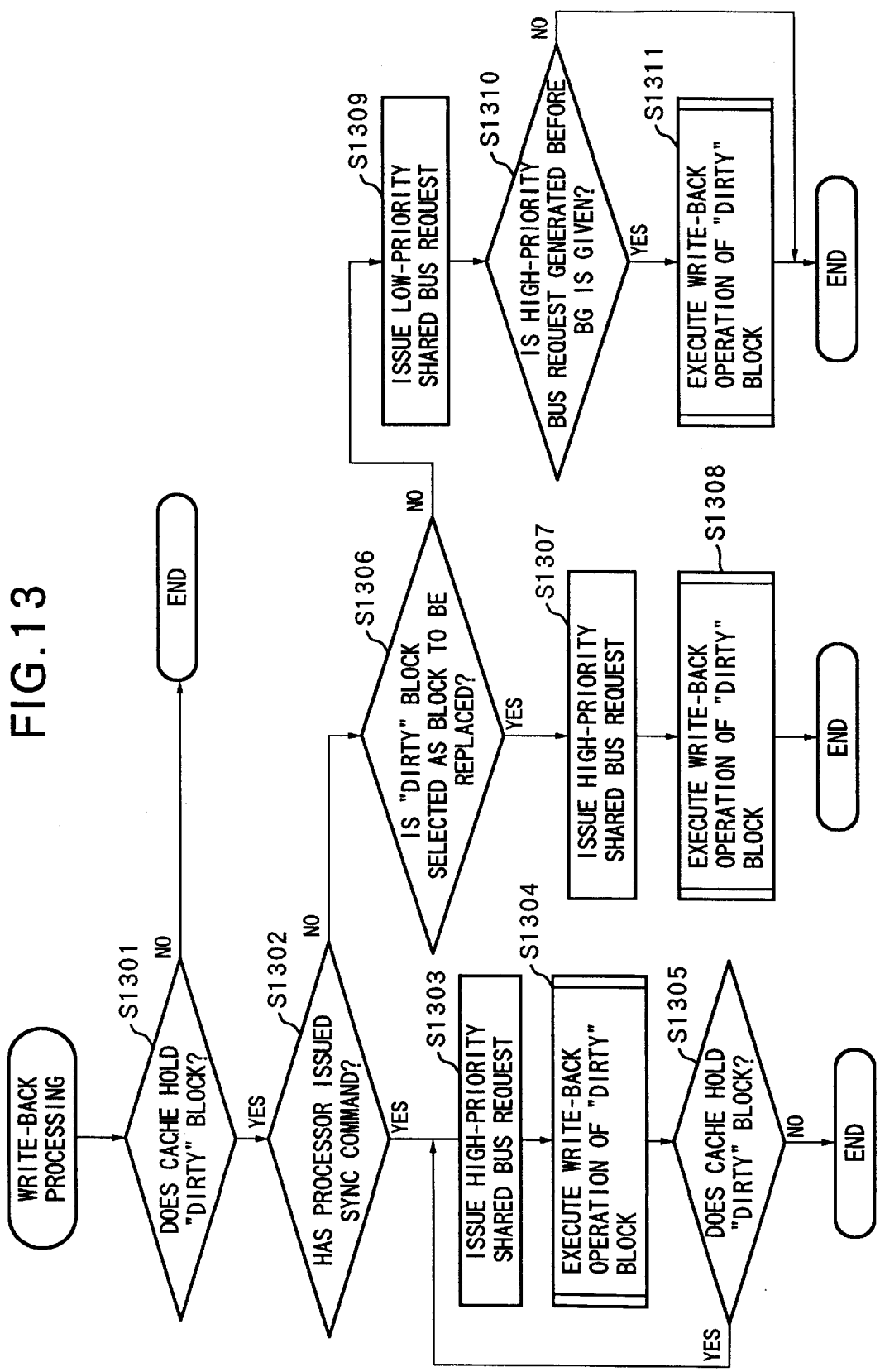
FIG. 13 is a flow chart showing the control sequence upon execution of cache write-back processing used in the third embodiment of the present invention.

The write-back control in this system is the same as that shown in FIG. 13 in the third embodiment, but the bus request sequence is rather complicated due to the presence of the local bus (shared bus) and the global bus. Also, the write-back control is executed when a STORE instruction or SYNC instruction is issued, or when a cache miss has occurred as in the sequence of the third embodiment shown in FIG. 13.

Referring to FIG. 13, the first occasion of the write-back operation of a "DIRTY" block is the issuance of a SYNC instruction from the processor 10.

That is, when the cache 11 stores at least one "DIRTY" block, and the processor 10 issues a SYNC instruction, write-back processing of such "DIRTY" blocks to the main memory is executed. When a SYNC instruction is issued, write-back processing of "DIRTY" blocks to the main memory is repetitively executed until all "DIRTY" blocks are written back.

As for the use requests of the bus in the node and the bus for connecting the nodes, this processing is executed in response to a high-priority bus request as in a normal bus access. Upon execution of write-back processing of "DIRTY" blocks to the main memory, the main memory control sequencer 121 updates the contents of the main memory, and searches the directory flag of the directory corresponding to a data block to be updated. When a cache other than the cache which is subjected to the write-back operation of "DIRTY" blocks holds a copy of the data as shared data, a coherence maintenance transaction is executed for the cache data block held as shared data.

In this embodiment, the coherence maintenance transaction is an invalidating type transaction, but the present invention is not limited to this.

The second occasion is a case wherein a "DIRTY" block is selected as the block to be replaced in the cache. In this case, substantially the same processing as that executed upon issuing a SYNC instruction is executed, except that write-back processing of "DIRTY" blocks to the main memory is performed in correspondence with the number of cache blocks to be replaced.

The third occasion is a case wherein the cache control sequencer undertakes writing back "DIRTY" blocks without disturbing the operations of other bus masters when the interconnection network is not busy. This operation is the characteristic feature of the present invention.

Figure 22:
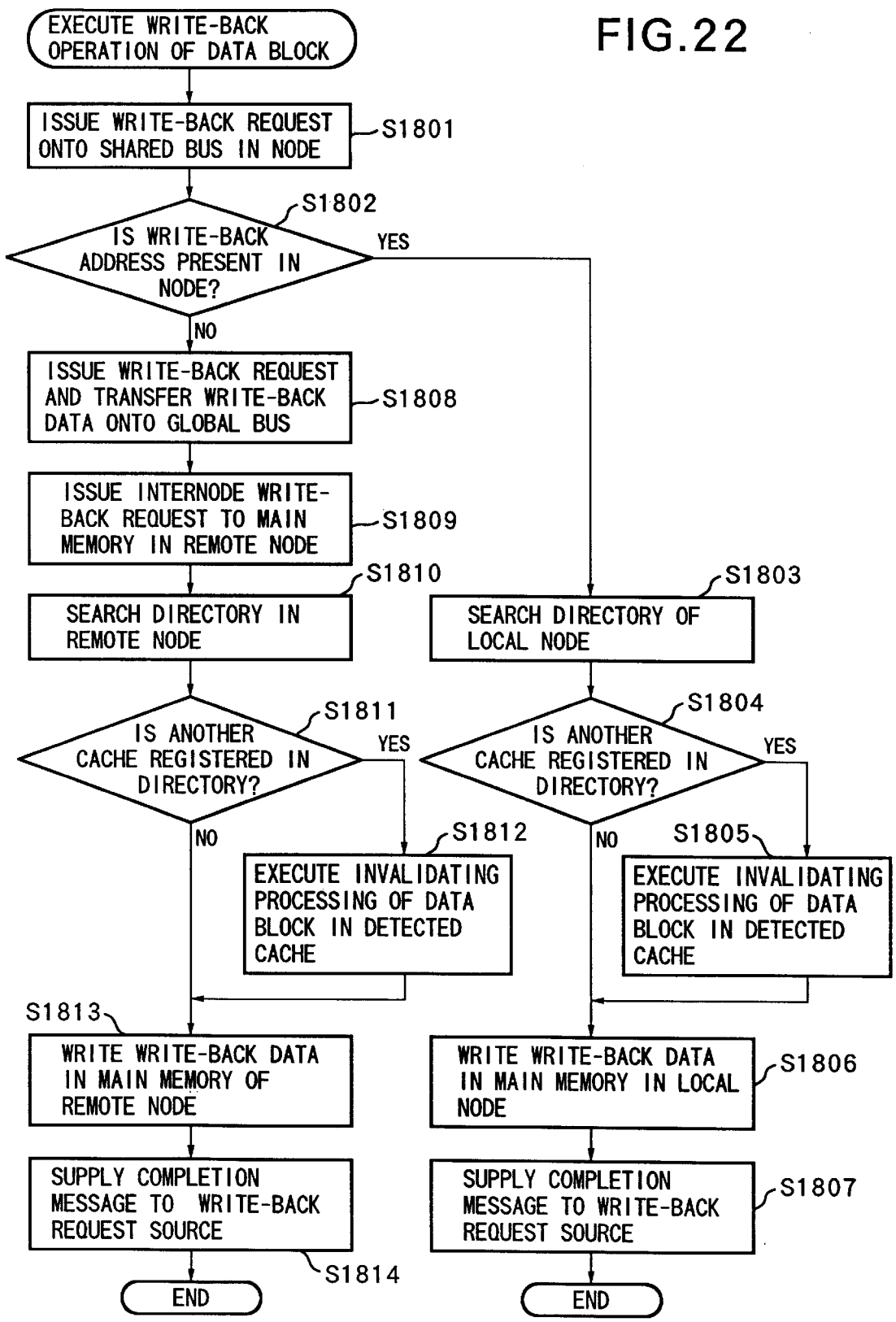
FIG. 22 is a flow chart showing the control sequence of write-back processing of "DIRTY" data of a cache used in the fourth embodiment of the present invention.

FIG. 22 shows in detail the write-back processing of "DIRTY" blocks in FIG. 13 in this embodiment. In the following description, assume that the cache 11 executes the write-back processing to the main memory. Note that a description about the arbitration control for the right of use of the bus will be ignored herein.

The sequence shown in FIG. 22 is started after a high- or low-priority shared bus request is issued, and the grant for the use of the bus is acquired from the bus arbiter 16.

Referring to FIG. 22, the cache 11 transfers write-back request source information onto the shared control bus 153 and the address of the write-back access onto the shared address bus 151, and issues a write-back request onto the shared bus 15 (step S1801). The cache 11 supplies data to be written back onto the shared data bus 152, and waits until the written-back data is supplied to the entry of the corresponding main memory, the required coherence maintenance operation is completed, and the write-back processing to the main memory is completed. Steps S1803 to S1807 are executed by the main memory in the local node that received the write-back request, and steps S1809 to S1814 are executed by the remote node. In this manner, the processing branches into two paths depending on whether or not the write-back address is the local node.

(1) When the address of the write-back processing is present in the main memory 12 in the computer node 1 (YES in step S1802):

The main memory control sequencer 121 receives the write request, the address of the write-back access, and the data supplied onto the shared data bus 152, and searches the directory unit 122 in the main memory 12 to check if a directory flag for a cache other than the cache 11 as the write-back request source is registered (step S1803). When a cache other than the cache 11 holds a copy of the data in a valid state (YES in step S1804), the main memory control sequencer 121 executes a coherence maintenance operation for the cache that holds the copy. That is, the main memory control sequencer 121 issues an invalidating processing instruction for invalidating the corresponding data block to the node which has a copy of the data block registered in the directory (step S1805). Upon reception of this instruction, the destination node sets the status flag of the corresponding data block in the cache to be "INVALID". In this case, although the shared bus and the global bus are used, since a high-priority bus request is issued, the data coherence maintenance operation can be performed quickly.

Then, the entry of the corresponding data in the memory 123 is updated with the data sent together with the write-back request (step S1806). Upon completion of this processing, the cache 11 is notified of completion of the write-back operation to the main memory (step S1807).

In this embodiment, the coherence maintenance operation is an invalidating type transaction, but this embodiment is not limited to this specific transaction.

(2) When the address to be subjected to the write-back processing to the main memory is present in the main memory (e.g., 22) outside the computer node 1 (NO in step S1802):

The internode interface 13 receives the write-back request, the address of the write-back access, and the data supplied onto the shared data bus 152, and issues a global bus request to the global bus arbiter 5. After the interface 13 is granted the use of the bus, it outputs write-back request source information onto the global control bus 43, and outputs the address of the write-back access onto the global address bus 41. Also, the interface 13 transfers the data of the write-back access onto the global data bus 42, and issues a write-back request to the internode interface 23 (step S1808).

Upon reception of the write-back request and the address of the write-back access, the internode interface 23 outputs the write-back request source information onto a shared control bus 253 of the node 2. Also, the interface 23 outputs the address of the write-back access onto a shared address bus 251. Furthermore, the interface 23 transfers the data of the write-back access onto a shared data bus 252, and issues a write-back request onto the shared control bus 253 (step S1809). The bus request in this case is a high-priority global bus request in the case of a write-back access for a SYNC instruction and cache replacement; otherwise, it is a low-priority global bus request.

Upon reception of the write-back request, the address of the write-back access, and the data supplied onto the shared data bus 252, the main memory 22 searches a directory unit 222 therein to check if a directory flag for a cache other than the cache 11 as the write-back request source is registered (step S1810). When a cache other than the cache 11 holds a copy of the data in a valid state (YES in step S1811), a coherence maintenance operation is executed for the cache that holds the copy (step S1812). This processing is the same as that in step S1805 above.

Thereafter, a main memory control sequencer 221 updates the corresponding data in a memory 223 with the data to be written back, which is received together with the write-back request (step S1813).

Upon completion of the write-back processing, the internode interface 23 notifies the internode interface 13 of completion of the write-back processing to the main memory. The internode interface 13 notifies the cache 11 of completion of the write-back processing (step S1814).

<Low-priority Write-back>

The control sequence for writing back "DIRTY blocks to remote memory while the cache is not accessed as the characteristic feature of the present invention will be described in more detail below with reference to FIGS. 2, 14, and 19.

Referring to FIG. 2, when no access is made from outside the cache, the cache control sequencer issues the value of the internal register 196 on the address-m signal line 171, and checks the status of the status flag 113 obtained in response to the issued value via the status signal line 192. As a result, if it is determined that the status of the block of interest is "DIRTY", the cache control sequencer controls the shared bus control interface 156 via the S-Cont signal line 195 to drive a low-priority shared bus request signal. With this control, the shared bus control interface 156 sets a shared bus request signal (BR1*) 161 and a bus request priority signal (LP1*) indicating the low-priority request at L level with respect to the bus arbiter 16.

Upon reception of this request, the shared bus arbiter 16 gives the right of use of the shared bus 15 in the node 1 to the cache 11 according to the rule shown in FIGS. 16A and 16B when it does not receive any high-priority bus request from another bus master in the node 1. Since this process has already been described in the third embodiment, a detailed description thereof will be omitted.

The cache control sequencer 111 that acquired the right of use of the shared bus 15 issues, to the internode interface 13, a request for performing an internode low-priority write-back operation to the main memory 22 in the node 2 via the global bus 4. More specifically, the sequencer 111 writes the address, data, and the like to be written back in low-priority write-back internal registers 131 (address), 132 (data), and 133 (control) in the internode interface 13.

Upon reception of the internode low-priority write-back request, the internode interface 13 issues a low-priority request of the global bus 4 to the global bus arbiter 5 that performs arbitration control of the global bus. Upon reception of this request, the global bus arbiter 5 gives a grant for the use of the global bus 4 to this internode low-priority write-back request only when it does not receive any use request from another internode interface, as in arbitration of the shared bus in the node. Upon reception of the grant for the use of the global bus, the internode interface 13 communicates with the internode interface 23 in the node 2 to transmit an internode low-priority write-back request to the main memory 20 to it.

Upon reception of the internode low-priority write-back request from the cache 11, the internode interface 23 issues a low-priority bus request to the intranode shared bus 25 on the basis of the received information. In the node 2 as well, the right of use of the shared bus 25 is similarly arbitrated, and the internode interface 23 is granted the use of the shared bus 25 in accordance with the predetermined rule only when no other bus masters in the node 2 issue any high-priority bus request. The internode interface 23 granted the use of the shared bus 25 executes a write-back operation to the main memory 22. The main memory control sequencer 221 subjected to the write-back operation reflects the contents of the write-back operation in the memory 223, and searches for a directory flag 224 of the directory corresponding to the data block to be written back to the main memory 22. When a copy of data is held in a cache other than the cache 11 in the node 1, which executed the write-back operation of a "DIRTY" block, a coherence maintenance transaction is executed for the cache data block that holds the copy.

Upon execution of this coherence maintenance operation a high-priority bus request is generated as in the normal processing in consideration of nature of the cache transaction. When the coherence maintenance operation (for invalidating the corresponding entry in this case) is completed, the main memory control sequencer 221 in the node 2 notifies the cache control sequencer Ill of a message indicating this as a high-priority message. Upon reception of the message, the cache control sequencer 111 changes the status flag 113 of the entry subjected to the write-back processing from "DIRTY" to "CLEAN" (a state wherein the data values on the cache 11 and the main memory 22 match each other). In this manner, a series of write-back operations end.

In these operations, low-priority requests are queued when another bus master issues a bus use request. More specifically, when each internode interface receives a low-priority write-back request and also receives a high-priority processing request before it processes the former request, the high-priority processing request is preferentially processed. In this case, only when the contents of the high-priority processing request are issued by the same bus master as that which previously issued the low-priority write-back request, and the later processing request is a high-priority write-back request, the queued low-priority write-back request is processed as a high-priority one prior to the processing of the later request.

As described above, in the multi-processor system constituted by connecting a plurality of computer nodes via the global bus, cache write-back processing can be arbitrarily performed as long as no high-priority bus request is generated, and write-back transactions can be prevented from being concentrated at one timing.

[Fifth Embodiment]

Figure 23:
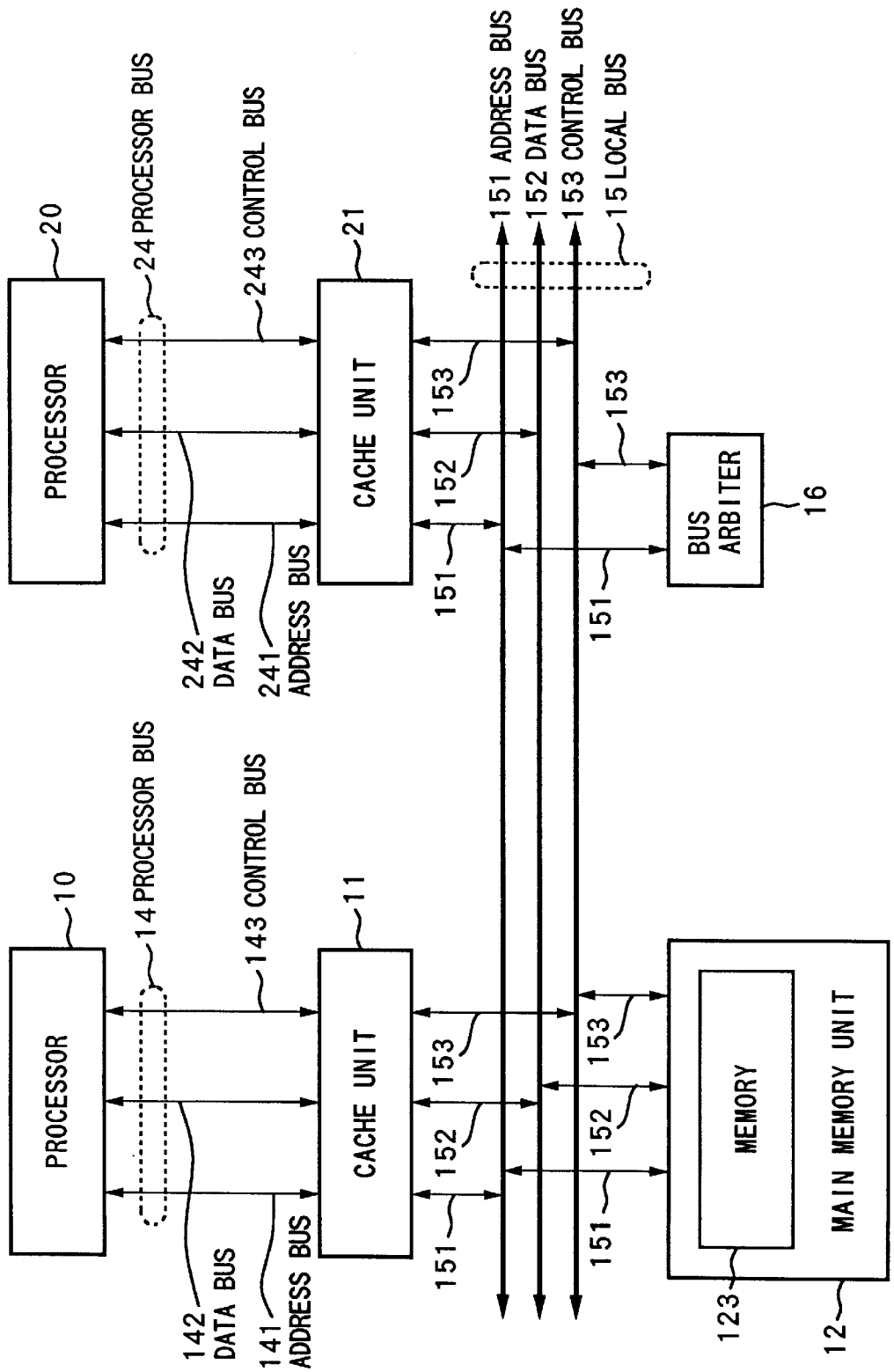
FIG. 23 is a block diagram showing the arrangement of an information processing system according to the fifth embodiment of the present invention.

FIG. 23 is a block diagram showing the arrangement of the fifth embodiment of a system for realizing the present invention.

Referring to FIG. 23, processors 10 and 20 are respectively connected to cache units 11 and 21 via processor buses 14 and 24.

Figure 24:
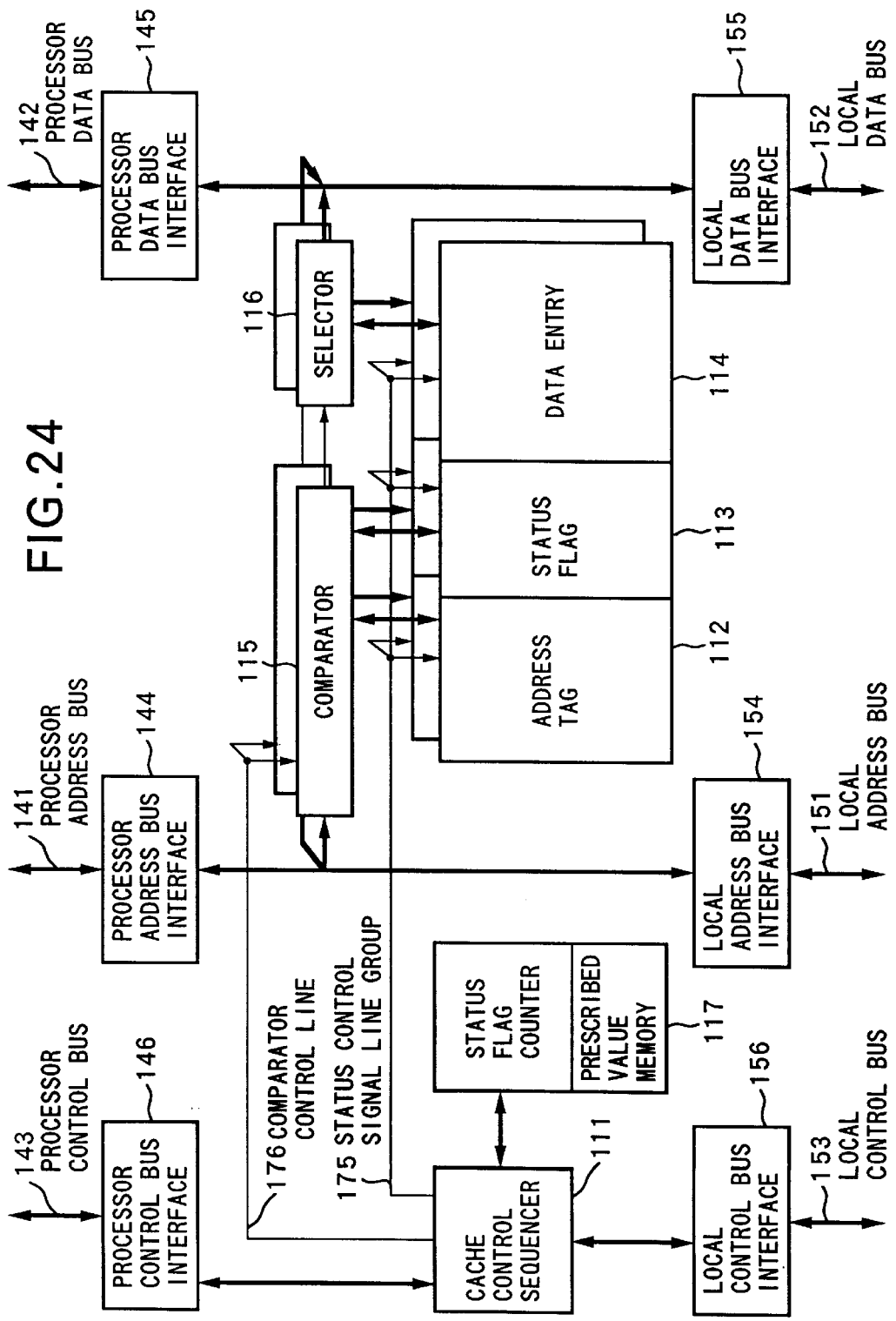
FIG. 24 is a block diagram showing the arrangement of a cache unit in the fifth and sixth embodiments.

Referring to FIG. 24, the processor 10 can issue multiple memory accesses, and has a special instruction (SYNC instruction) for completing the multiple-issued memory accesses under the coherence guarantee of a relaxed coherence model.

The cache units 11 and 21 are connected to a main memory unit 12 and a bus arbiter 16 via a local bus 15. The cache units 11 and 21 update the data entries of data block therein and reflect them in the main memory unit 12 on the basis of requests from the processors. Also, the cache units 11 and 21 execute cache maintenance by snooping address information or the like on the local bus 15.

The bus arbiter 16 arbitrates the right of use of the local bus 15.

The system of this embodiment performs coherence control adopting a relaxed memory coherence model that guarantees data coherence at the time of issuance of a SYNC instruction which is explicitly supplied from the processor. In this system, a cache control sequencer for controlling the coherence maintenance operation of the cache performs write-back processing of data blocks in the DIRTY state in the cache to the main memory unit when the number of data blocks (DIRTY blocks) whose values are not reflected in the main memory unit becomes equal to or larger than a prescribed value, and executes a coherence maintenance operation if necessary, in addition to the time of issuance of the SYNC instruction. In this manner, the write-back processing traffic to the main memory and the coherence maintenance operation traffic, which concentrate at the time of issuance of the SYNC instruction, can be distributed.

FIG. 24 shows the arrangement of the cache unit as a portion of this embodiment. FIG. 24 shows the arrangement of the cache unit 11, and the cache unit 21 has the same arrangement.

Referring to FIG. 24, reference numeral 144 denotes a processor address bus interface for connecting a processor address bus 141; 145, a processor data bus interface for connecting a processor data bus 142; and 146, a processor control bus interface for connecting a processor control bus 143.

Reference numeral 154 denotes a local address bus interface for connecting a local address bus 151; 155, a local data bus interface for connecting a local data bus 152; and 156, a local control bus interface for connecting a local control bus 153.

Reference numeral 114 denotes a data entry for holding data; 112, an address tag for holding the address of the data entry 114; and 113, a status flag for holding the status of the data entry 114. These portions comprise a set of memory elements such as an SRAM, but the present invention is not limited to this specific arrangement.

Reference numeral 115 denotes a comparator for comparing the contents of the address tag 112 with addresses on the processor address bus 141 and the local address bus 151. Reference numeral 116 denotes a selector for selecting data in the data entry in accordance with the comparison result of the comparator 115.

Reference numeral 111 denotes a cache control sequencer for controlling the respective modules in the cache unit.

In this embodiment, the cache unit adopts a 2-way set associative arrangement. However, the present invention is not limited to this specific arrangement.

<Processing Sequence of LOAD Instruction>

Figure 25:
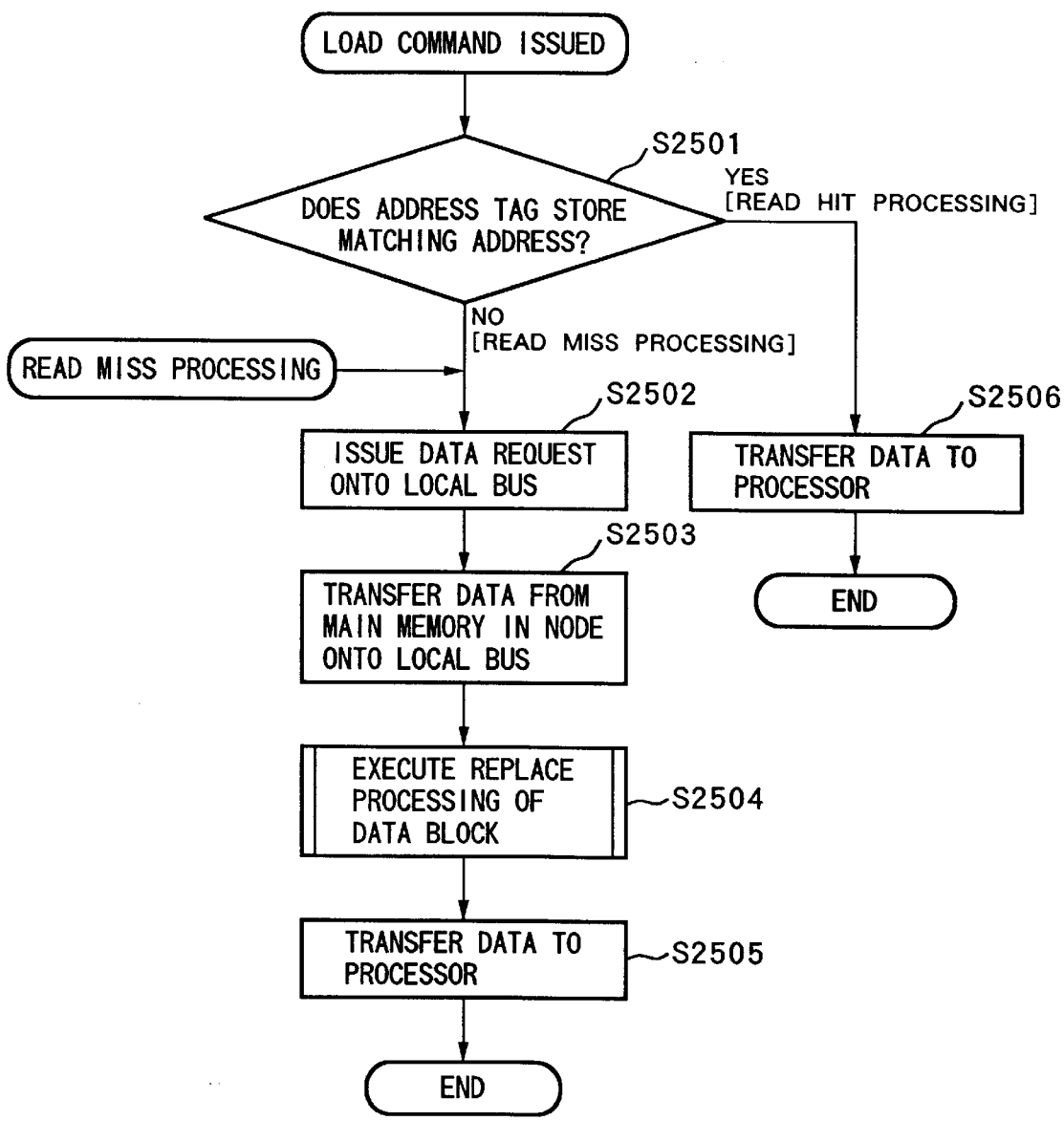
FIG. 25 is a flow chart showing the processing executed by the cache unit upon execution of a LOAD instruction in the fifth embodiment.

FIG. 25 shows the control sequence upon execution of a LOAD instruction for loading data into the processor in the cache unit with the above-mentioned arrangement. In the following description, assume that the LOAD instruction is issued by the processor 10.

Referring to FIG. 25, when a cache read hit has occurred with respect to the LOAD instruction issued by the processor 10 (YES in step S2501), the cache unit 11 supplies a data block to the processor 10 (step S2506).

When a cache read miss has occurred with respect to the LOAD instruction issued by the processor 10 (NO in step S2501), the cache unit 11 issues a read request onto the local bus 15 (step S2502). In this case, the cache unit 11 does not supply the corresponding data block to the processor 10 until it receives the data block that caused the cache read miss.

The cache unit 11 transfers the address of the read access onto the local address bus 151, issues a read request onto the local control bus 153, and waits execution until the data block is supplied onto the local data bus 152. However, the present invention is not limited to this specific sequence in this embodiment.

Upon reception of the read request and the address of the read access, the main memory unit 12 supplies the data block onto the local data bus 152, and the cache unit 11 receives the supplied data (step S2503).

The cache unit 11 replaces the data block supplied onto the local data bus 152 in the entry of the corresponding data block therein (step S2504). This processing will be described in detail later with reference to FIG. 29.

The cache unit 11 supplies the data block to the processor 10 (step S2505).

In this manner, the cache unit 11 supplies data to the processor in response to the LOAD instruction.

<Control Sequence of STORE Instruction>

Figure 26:
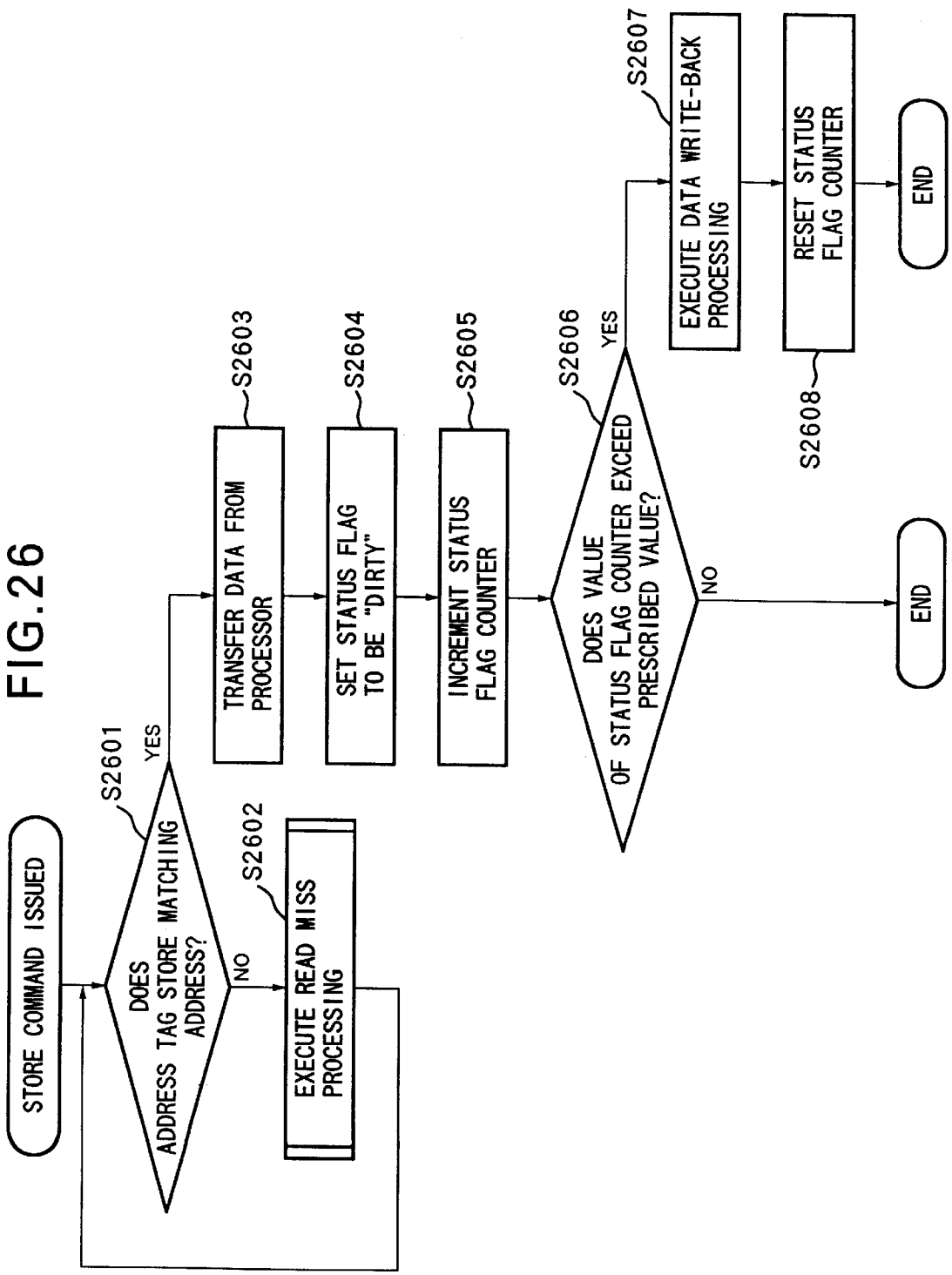
FIG. 26 is a flow chart showing the processing executed by the cache unit upon execution of a STORE instruction in the fifth and sixth embodiments.

FIG. 26 shows the control sequence by the cache unit upon execution of a STORE instruction for storing data from the processor. In the following description, assume that the processor 10 issues a STORE instruction.

Referring to FIG. 26, when a cache write hit has occurred with respect to the STORE instruction issued by the processor 10, data to be stored is received from the processor (step S2603), and the status flag corresponding to the data is set to be "DIRTY" (step S2604). At the same time, the value of a status flag counter 117 is incremented by 1 (step S2605).

When the number of DIRTY blocks in the cache unit 11 has become equal to or larger than a prescribed value set in the status flag counter 117, write-back processing of DIRTY blocks to the main memory unit is executed (step s2607). After the write-back operation, the status flag counter is reset (step S2608). In this embodiment, assume that the prescribed value of the number of DIRTY blocks in the cache, which value is used for determining whether or not write-back processing of DIRTY blocks to the main memory is to be executed, is pre-set in a prescribed value memory in the status flag counter 117. However, the storage position of the prescribed value is not limited to the status flag counter.

Figure 28:
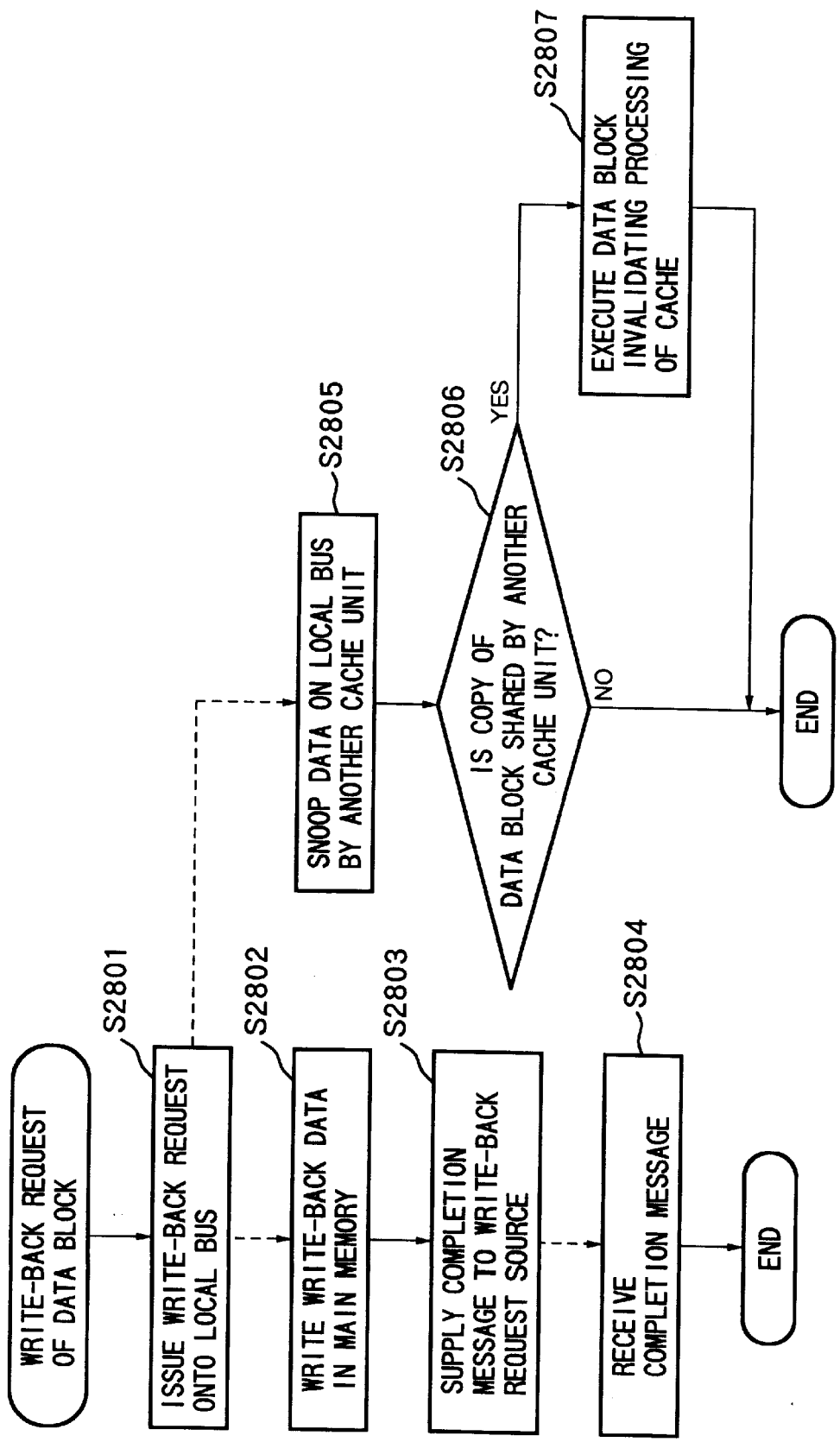
FIG. 28 is a flow chart upon execution of write-back processing to a main memory in the fifth embodiment.

Note that the write-back processing is attained by selecting a DIRTY block, and executing the processing shown in FIG. 28 for the selected block.

When a cache write miss has occurred with respect to the STORE instruction issued by the processor 10, i.e., if the address tag in the cache unit does not store any corresponding address, cache read miss processing, i.e., the processing in step S2502 and the subsequent steps in FIG. 25 is performed (step S2602). Thereafter, the cache write hit processing is performed.

In this manner, in the STORE processing of data, when the number of blocks which are changed to the DIRTY state by the STORE processing exceeds the predetermined value, the data blocks in the cache are written back to the main memory unit.

<Sequence of SYNC instruction processing>

Figure 27:
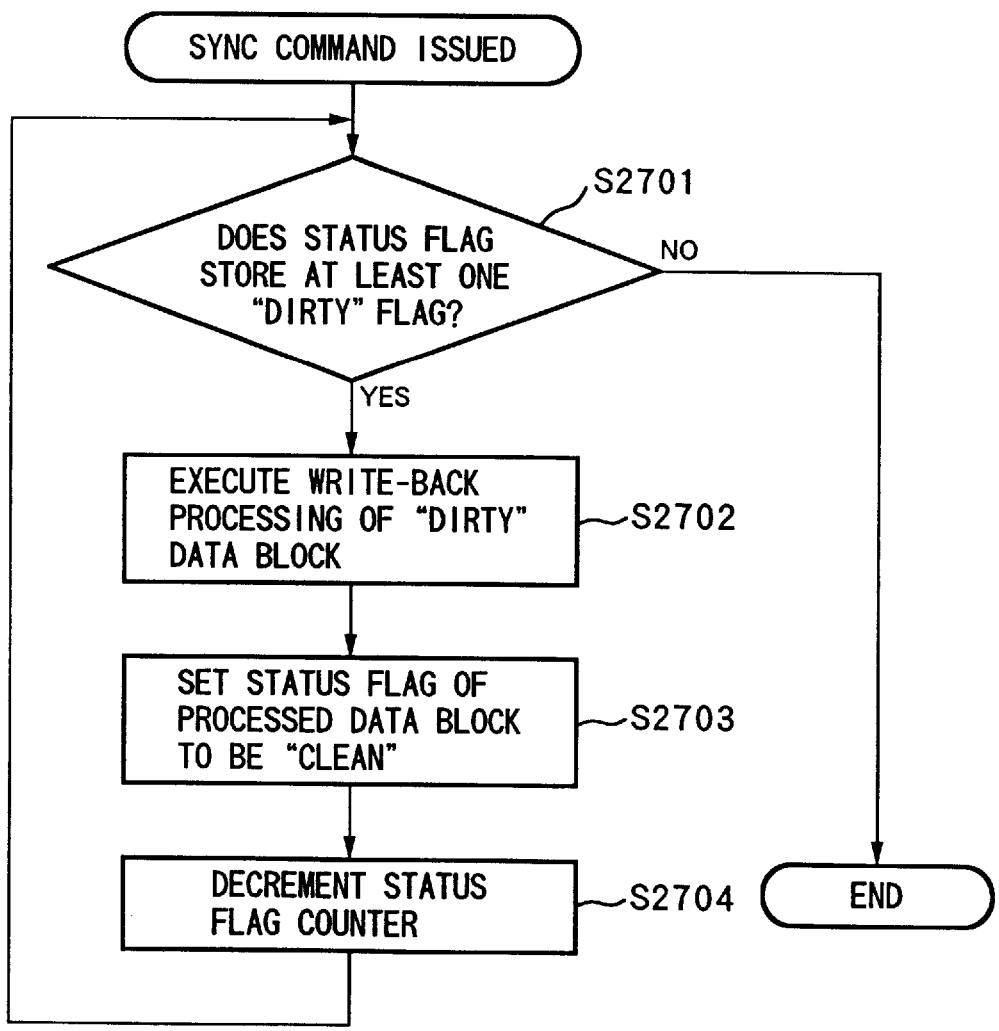
FIG. 27 is a flow chart showing the processing executed by the cache unit upon execution of a synchronization instruction in the fifth and sixth embodiments.

FIG. 27 shows the control sequence upon execution of a SYNC instruction for writing back the contents of a data block which may be accessed by a plurality of processors to the main memory to match the contents of the main memory with those of the cache. In the following description, assume that the processor 10 issues a SYNC instruction.

Referring to FIG. 27, when the processor 10 issues a SYNC instruction, if at least one DIRTY block is present in the cache unit 11 (YES in step S2701), write-back processing of the DIRTY block to the main memory is executed (step S2702). In this embodiment, the write-back processing of the DIRTY block to the main memory is repetitively executed until all DIRTY blocks are written back. However, the present invention is not limited to this sequence.

After the DIRTY block is written back, the status flag of the data block subjected to the write-back processing is set to be "CLEAN" (step S2703), and the value of the status flag counter is decremented (step S2704).

In this manner, all blocks in the DIRTY state can be written back to the main memory, and can be restored to the CLEAN state.

<Sequence of Write-back Processing>

FIG. 28 shows the control sequence upon execution of the write-back processing to the main memory. In the following description, assume that the cache unit 11 issues a request of write-back processing to the main memory. Note that the broken arrow in FIG. 28 indicates a shift in the subject of control.

Referring to FIG. 28, the cache unit 11 issues write-back request source information onto the local control bus 153, and outputs an address of this write-back access onto the local address bus 151. Also, the cache unit 11 issues a write-back request onto the local control bus 153, and supplies a data block to be written back onto the local data bus 152. The cache unit 11 waits execution until the written-back data is supplied to the entry of the corresponding main memory, the required coherence maintenance operation is completed, and the write-back processing to the main memory is completed (step S2801). Upon reception of a completion message (step S2804), the write-back processing ends.

Upon reception of a read request, the address of the write-back access, and the data block supplied onto the local data bus 152, the main memory unit 12 writes the received data in the entry of the corresponding data block (step S2802). Thereafter, the main memory unit supplies a completion message to the request source (step S2803).

At the same time, a cache unit other than the cache unit 11 snoops the address transferred on the local bus 15 (step S2805). If a copy of the data is held in a valid state (CLEAN or DIRTY state), the cache unit executes a coherence maintenance operation with respect to the data block held in the valid state (step S2807). In this embodiment, the coherence maintenance operation is an invalidating transaction for invalidating copies, other than the written-back copy, of an identical data block stored in a plurality of caches. However, the present invention is not limited to this transaction. The invalidating operation is attained by setting the status flag 113 to be "INVALID".

<Sequence of Replace Processing>

Figure 29:
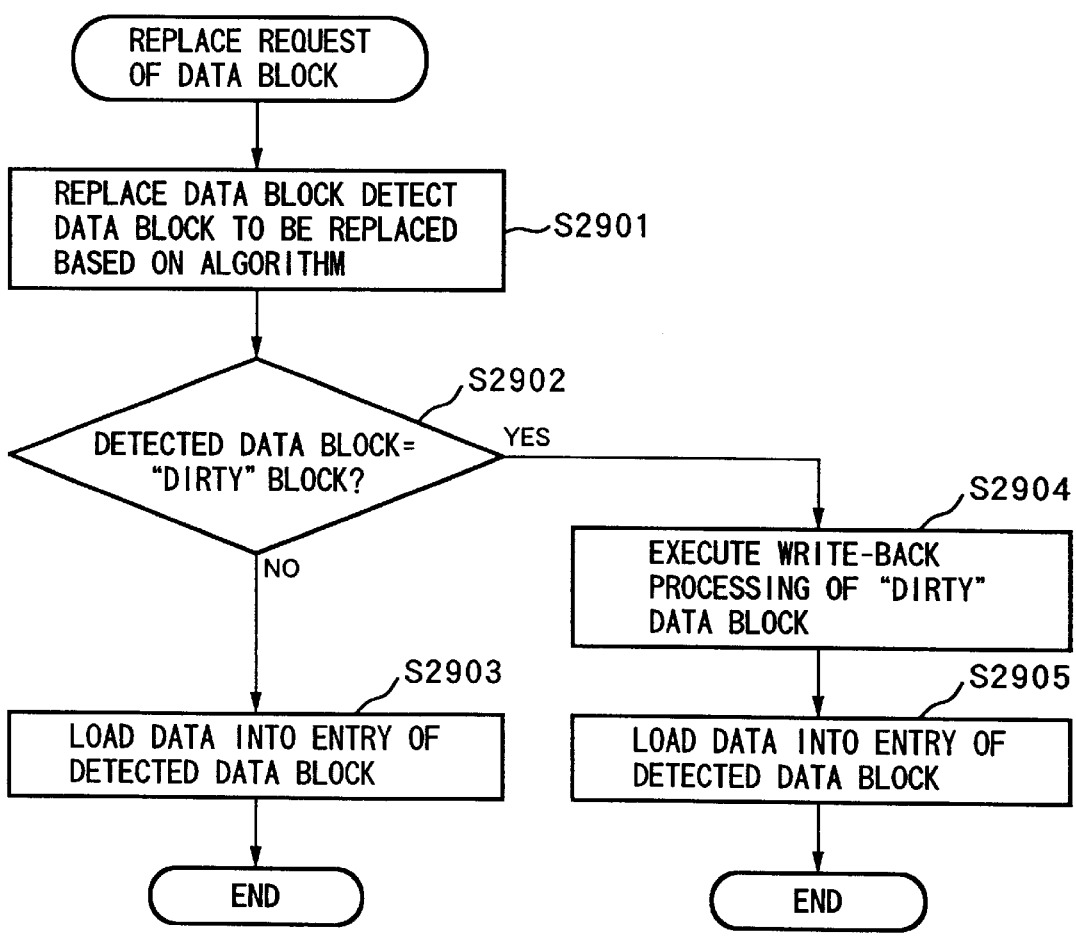
FIG. 29 is a flow chart showing the processing executed upon replacing data blocks in the fifth embodiment.

FIG. 29 shows the control sequence upon execution of the replace processing of a data block. In the following description, assume that the cache unit 11 executes replace processing of a data block.

Referring to FIG. 29, when a data block replace request is issued, the cache unit 11 detects the data block to be replaced in accordance with a data block replacement algorithm such as an LRU (step S2901).

When the detected data block to be replaced is in the DIRTY state, the cache unit 11 executes write-back processing of the DIRTY block to the main memory (step S2904).

When the data block to be replaced is in a state other than the DIRTY state, or when the write-back processing of the data block in the DIRTY state to the main memory has been completed, the cache unit 11 loads the data block to the data entry of the corresponding data block (step S2903 or S2905).

When a data block is loaded into the cache, available cache entry is allocated by executing this replace processing, and a new data block is loaded into allocated entry.

<Status transition of Data Block>

Figure 30:
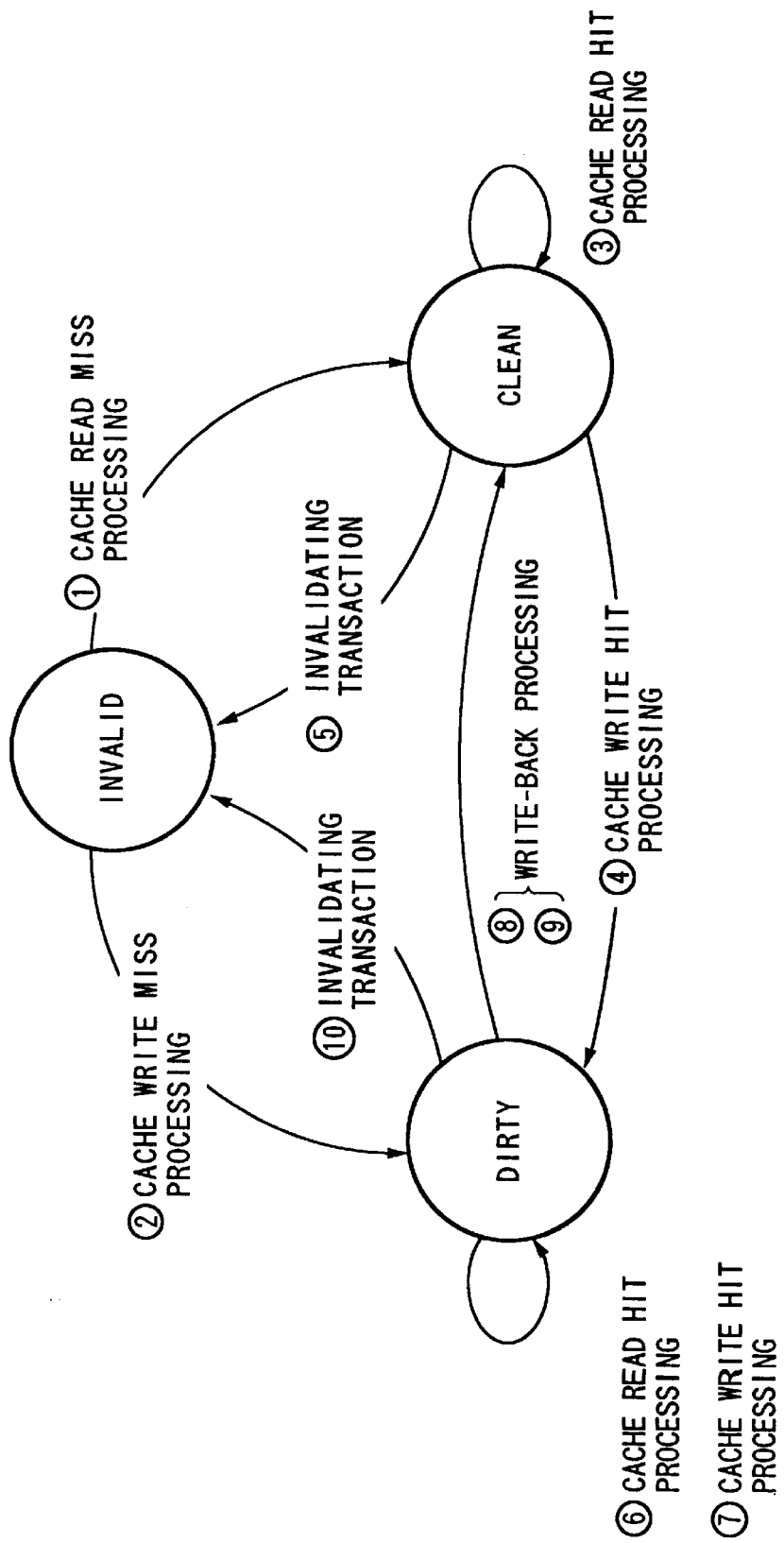
FIG. 30 is a status transition chart of a status flag in the fifth and sixth embodiments.

FIG. 30 is a state diagram of the status flag upon execution of memory transactions. The status flag of the cache unit 11 will be exemplified below.

Referring to FIG. 30, status "INVALID" indicates that a data entry managed by the status flag 113 is invalid. Status "CLEAN" indicates that a data entry managed by the status flag is not rewritten after it is loaded from the main memory unit. The data entry stores the same value as that in the main memory unit, but the data entry in another cache unit may store the latest value. Status "DIRTY" indicates that a data entry managed by the status flag 113 is rewritten with the latest value at least once after it is loaded from the main memory, and the rewritten value is not reflected in the main memory. This data entry stores the latest value.

The status of the status flag transits as follows.

① When the processor 10 issues a LOAD instruction with respect to a data block in an INVALID state, the status flag transits to CLEAN.

② When the processor 10 issues a STORE instruction with respect to a data block in an INVALID state, cache read miss processing is temporarily executed, and the status flag transits to CLEAN. Thereafter, cache write hit processing is executed, and the status flag transits to DIRTY.

③ When the processor 10 issues a LOAD instruction with respect to a data block in the CLEAN state, the status flag transits to CLEAN.

④ When the processor 10 issues a STORE instruction with respect to a data block in the CLEAN state, the status flag transits to DIRTY.

⑤ When a coherence maintenance operation is executed with respect to a data block in the CLEAN state, the status flag transits to INVALID.

⑥ When the processor 10 issues a LOAD instruction with respect to a data block in the DIRTY state, the status flag transits to DIRTY.

⑦ When the processor 10 issues a STORE instruction with respect to a data block in the DIRTY state, the status flag transits to DIRTY.

⑧ When the processor 10 issues a SYNC instruction with respect to a data block in the DIRTY state, the status flag transits to CLEAN.

⑨ When write-back processing to the main memory is executed with respect to a data block in the DIRTY state, the status flag transits to CLEAN.

⑩ When a coherence maintenance operation is executed for a data block in the DIRTY state, the status flag transits to INVALID.

To help understand the coherence maintenance operation according to the present invention, a case wherein the coherence maintenance operation is postponed until the issue timing of a SYNC instruction as the characteristic feature of this system, and a case wherein the coherence maintenance operation is postponed until the number of DIRTY blocks becomes equal to or larger than a prescribed value, will be explained in turn below.

More specifically, for example, the processors 10 and 20 issue LOAD instructions with respect to address f8000000. After the processing operations of these LOAD instructions are completed, the processor 10 issues a STORE instruction with respect to address f8000000. In this case, the coherence maintenance operation is not executed for the cache unit 21 at the time of issuance of the STORE instruction, but is executed when the processor 10 issues a SYNC instruction. How to realize this processing will be explained below with reference to FIG. 31.

Similarly, the processors 10 and 20 issue LOAD instructions with respect to address f8000000, and thereafter, the processor 10 issues a STORE instruction with respect to address f8000000. In this case, an internode interface 13 does not execute a coherence maintenance operation for the cache unit 21 at the time of issuance of the STORE instruction, but executes a coherence maintenance operation when the number of DIRTY blocks becomes equal to or larger than a prescribed value (2 in this embodiment). How to realize this operation by the mechanisms of the cache units 11 and 21 will be explained below with reference to FIG. 32.

<Coherence maintenance (Based on SYNC Instruction)>

Figure 31:
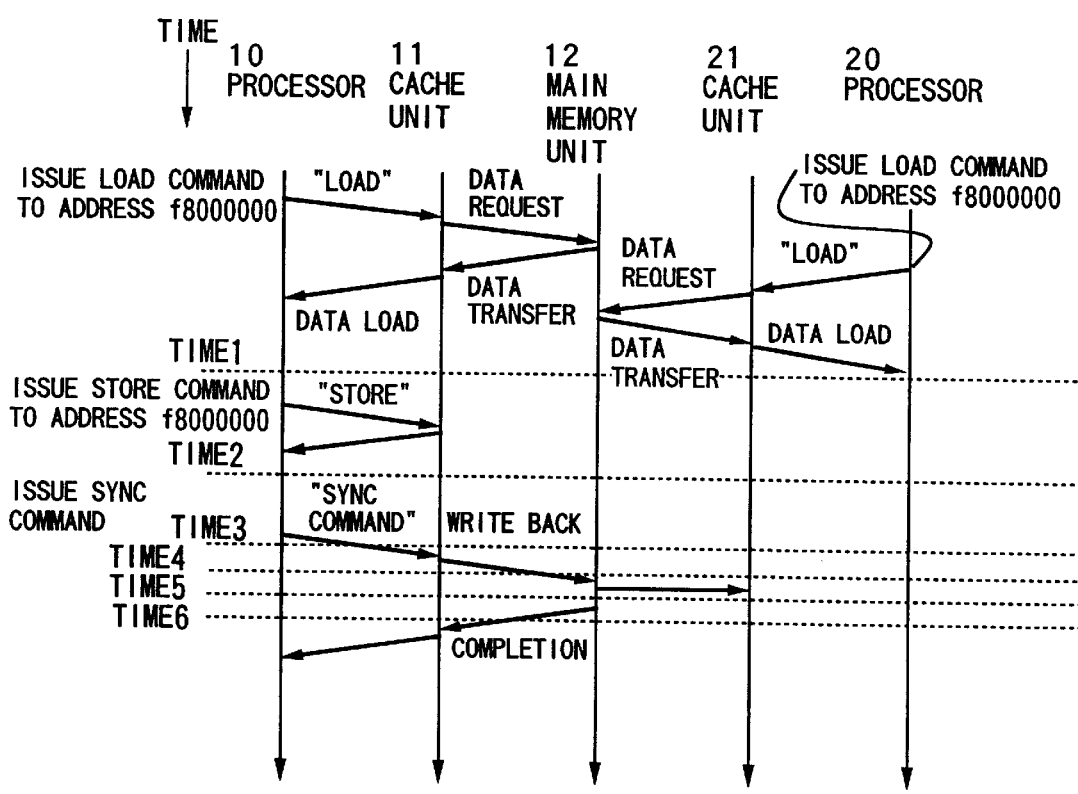
FIG. 31 is a chart showing an example wherein the coherence maintenance operation is postponed until the issuance timing of a synchronization instruction in the fifth embodiment.

FIG. 31 is a timing chart showing an example of the coherence maintenance operation of this embodiment.

Assume that address f8000000 is assigned to the main memory unit 12.

At time 1, the processors 10 and 20 issue LOAD instructions to address f8000000, and have completed loading of data from the main memory unit 12. At this time, the status flags 113 and 213 in the cache units 11 and 21 corresponding to address f8000000 are respectively CLEAN.

At time 2, the processor 10 issues a STORE instruction to address f8000000, and completes processing of the STORE instruction. At this time, neither a local bus access nor a coherence maintenance operation are executed. The status flag 113 in the cache unit 11 is changed to DIRTY as a result of the STORE instruction issued by the processor 10. Also, the value of the status flag counter 117 is incremented. As a result, the number of DIRTY blocks becomes 1.

At time 3, the processor 10 issues a SYNC instruction.

At time 4, write-back processing of the data block of address f8000000 held in the DIRTY state in the cache unit 11 is executed in response to the SYNC instruction issued by the processor 10 at time 3.

At time 5, the data entry in the cache unit 21 is invalidated by the write-back processing of the data block of address f8000000 to the main memory executed at time 4.

At time 6, upon acknowledge of a message indicating completion of the coherence maintenance operation, the cache unit 11 which has completed the write-back processing to the main memory supplies a completion message of the SYNC instruction to the processor 10, thus completing the processing of the SYNC instruction issued at time 3.

In this manner, a SYNC instruction is issued before the number of DIRTY blocks becomes equal to or larger than 2, and write-back processing is executed in response to this instruction.

<Coherence maintenance Using Number of DIRTY Blocks as Trigger>

Figure 32:
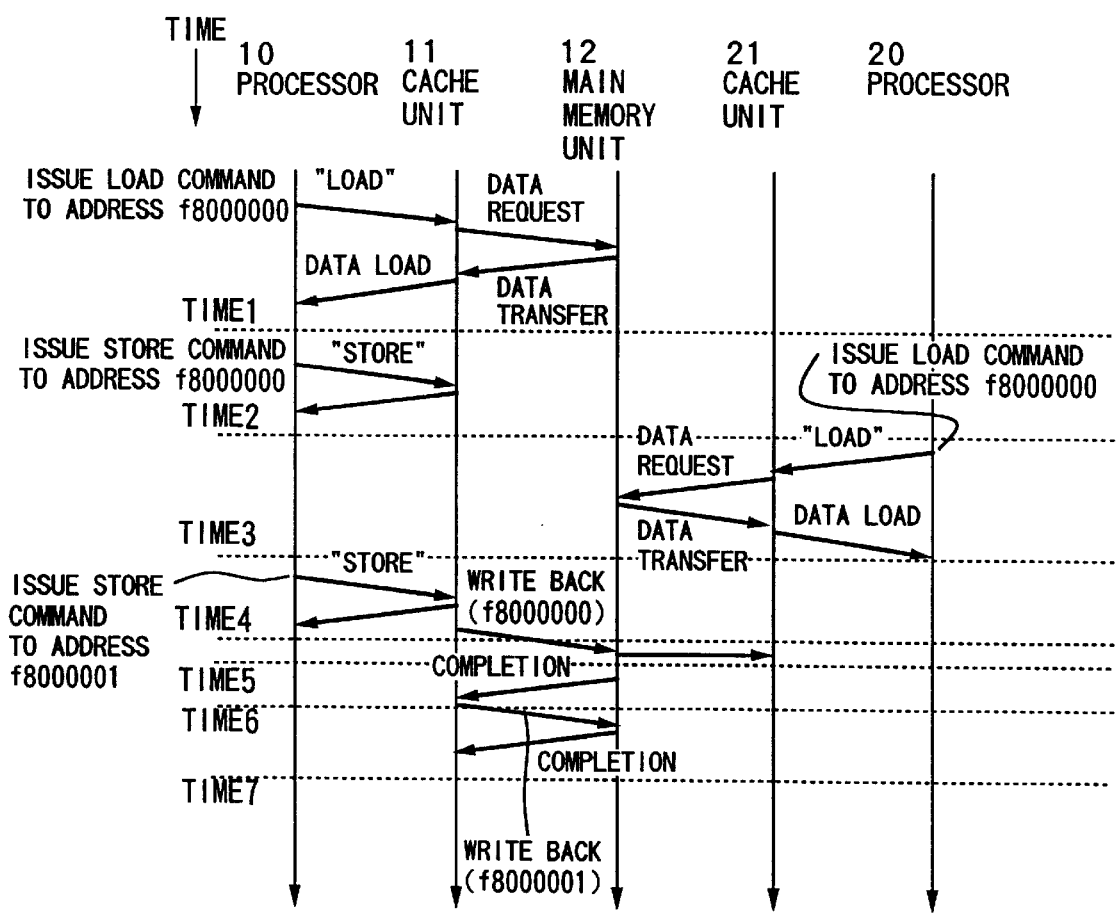
FIG. 32 is a chart showing an example wherein the coherence maintenance operation is postponed until the number of DIRTY blocks becomes equal to or larger than a prescribed value in the fifth embodiment.

FIG. 32 is a timing chart showing another example of the coherence maintenance operation of this embodiment.

Assume that addresses f8000000 and f8000001 are assigned to the main memory unit 12.

At time 1, the processor 10 issues a LOAD instruction with respect to address f8000000, and completes loading of data from the main memory unit 12. The status flag 113 in the cache unit 11 is CLEAN.

At time 2, the processor 10 issues a STORE instruction with respect to address f8000000, and completes processing of the STORE instruction. At this time, no coherence maintenance operation is generated. The status flag 113 in the cache unit 11 is changed to DIRTY as a result of the STORE instruction issued by the processor 10. Also, the value of a status flag counter 117 is incremented. The value of the counter 117 becomes 1.

At time 3, the processor 20 issues a LOAD instruction with respect to address f8000000, and completes processing of the LOAD instruction. At this time as well, the cache unit 21 merely loads a data block from the main memory unit 12, and no coherence maintenance operation is executed. As a result of the LOAD instruction, a status flag 213 in the cache unit 21 is CLEAN.

At time 4, the processor 10 issues a STORE instruction with respect to address f8000001, and completes processing of the STORE instruction. When the value of the status flag counter 117 is incremented, the value of the counter becomes 2. Since the number of DIRTY blocks becomes equal to or larger than the prescribed value (2), write-back processing to the main memory is executed.

At time 5, the data entry of the cache unit 21 is invalidated by the write-back processing of the data block of address f8000000 to the main memory executed at time 4.

At time 6, write-back processing of the data block of address f8000001 to the main memory is executed.

At time 7, the write-back processing of the data block of address f8000001 to the main memory is completed.

As described above, when the number of data blocks in the DIRTY state becomes equal to or larger than the predetermined value (2 in this embodiment), write-back processing is executed. For this reason, even when a coherence maintenance operation is executed in response to a SYNC instruction, the number of data blocks to be written back left in the respective cache units is smaller than the predetermined value, and overhead due to bus saturation or the synchronization operation can be reduced.

The object of the present invention achieved by the function of the apparatus or method can also be achieved by a storage medium that stores a program in the apparatus which realizes the above-mentioned present invention. More specifically, the storage medium is loaded into the apparatus, and the program itself read out from the storage medium achieves the novel function of the present invention. For this reason, the structural feature of the program executed by the cache unit according to the present invention is as shown in FIG. 40.

[Sixth Embodiment]

The sixth embodiment of the present invention will be described in detail below with reference to the accompanying drawings.

Figure 33:
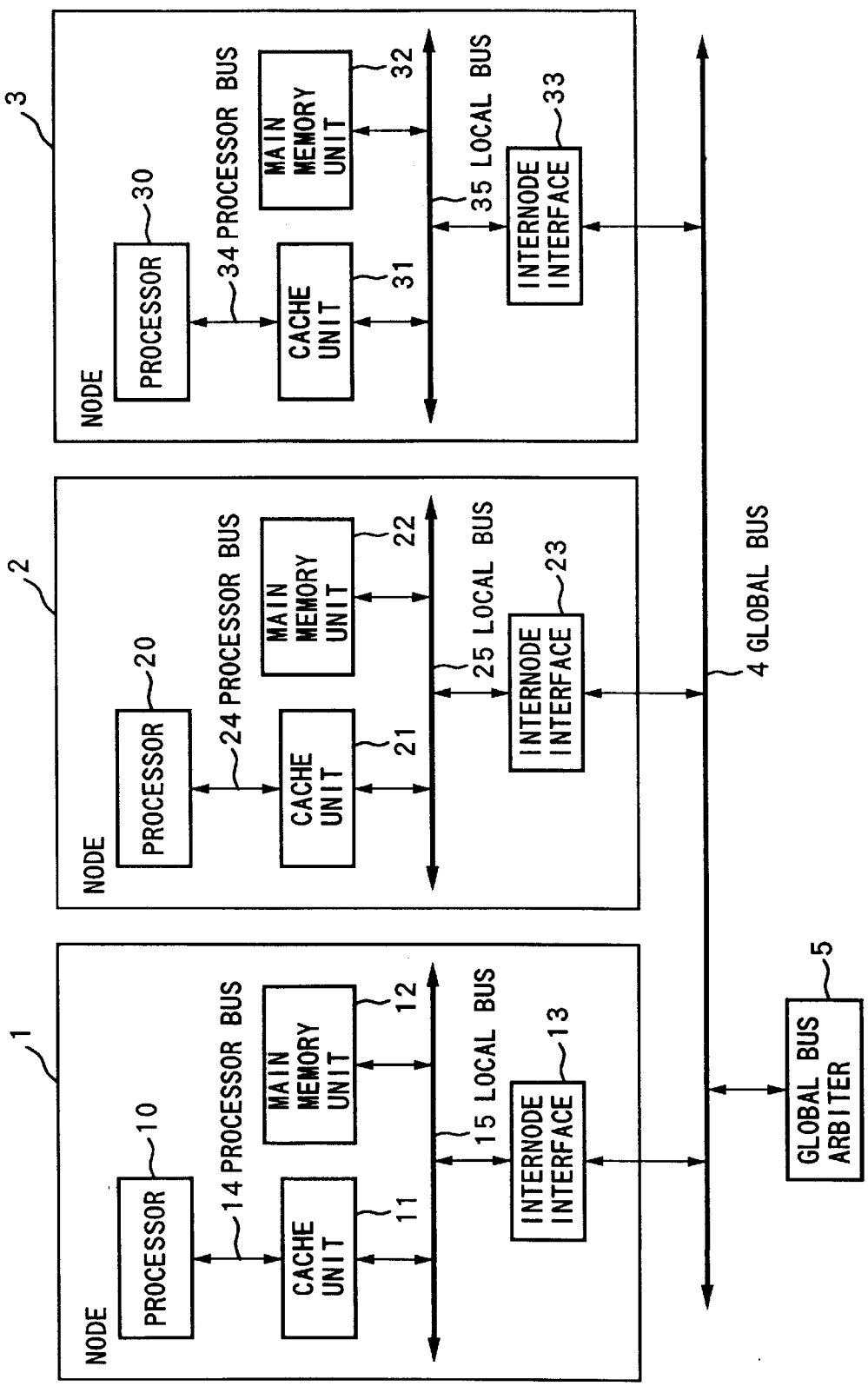
FIG. 33 is a block diagram showing the arrangement of an information processing system according to the sixth embodiment of the present invention.

FIG. 33 is a block diagram showing the arrangement of the sixth embodiment of a system for realizing the present invention.

Referring to FIG. 33, reference numerals 1, 2, and 3 denote computing nodes. Processors 10, 20, and 30 are respectively connected to cache units 11, 21, and 31 via processor buses 14, 24, and 34.

The cache units 11, 21, and 31 are respectively connected to main memory units 12, 22, and 32, and internode interfaces 13, 23, and 33 via local buses 15, 25, and 35. A global bus 4 connects the internode interfaces 13, 23, and 33 and a global bus arbiter 5.

In FIG. 33, the number of computing nodes connected is 3. However, the present invention is not limited to three nodes.

The system of this embodiment performs coherence control adopting a relaxed memory coherence model that guarantees data coherence at the time of issuance of a SYNC instruction which is explicitly supplied from the processor. In this system, a cache control sequencer for controlling the coherence maintenance operation of the cache performs write-back processing of data blocks in the DIRTY state in the cache to the main memory unit when the number of DIRTY blocks becomes equal to or larger than a prescribed value, and executes a coherence maintenance operation if necessary, in addition to the time of issuance of the SYNC instruction. In this manner, the write-back processing traffic to the main memory and the coherence maintenance operation traffic, which concentrate at the time of issuance of the SYNC instruction, can be distributed.

Figure 34:
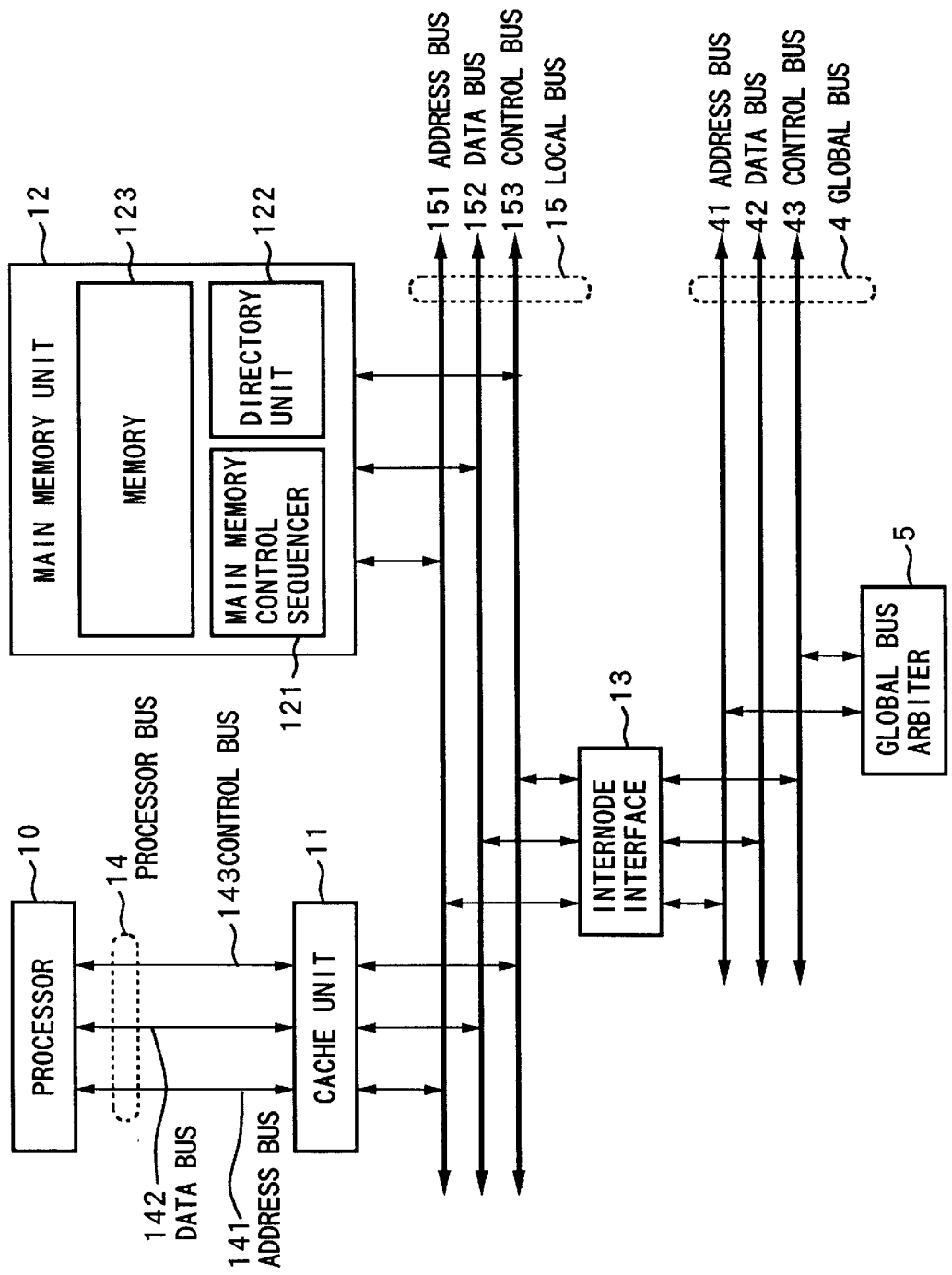
FIG. 34 is a block diagram showing the arrangement of a computer node in the sixth embodiment.

FIG. 34 shows the internal arrangement of the computing node as a portion of this embodiment. FIG. 34 shows the arrangement of the computing node 1 as an example, and the computer nodes 2 and 3 also have the same arrangement as that of the computer node 1.

Referring to FIG. 34, the processor 10 can issue multiple memory accesses, and has a special instruction (SYNC instruction) for completing the multiple-issued memory accesses under the coherence guarantee of the relaxed memory coherence model.

In FIG. 34, reference numeral 11 denotes a cache unit; 12, a main memory unit; 15, a local bus; and 13, an internode interface. The main memory unit 12 includes a main memory control sequencer 121, a memory 123, and a directory unit 122. Reference numeral 141 denotes a processor address bus for connecting the processor 10 and the cache unit 11; 142, a processor data bus for connecting the processor 10 and the cache unit 11; and 143, a processor control bus for connecting the processor 10 and the cache unit 11.

The processor control bus 143 includes a memory access request signal line for transferring a memory access request issued by the processor 10, and a memory access type signal line group indicating the type of memory access request signal line.

Reference numeral 151 denotes a local address bus for connecting the cache unit 11, the internode interface 13, and the main memory unit 12; 152, a local data bus for connecting the cache unit 11, the internode interface 13, and the main memory unit 12; and 153, a local control bus for connecting the cache unit 11, the internode interface 13, and the main memory unit 12.

The local control bus 153 includes a transaction request signal line for transferring a transaction request issued by the cache unit 11, and a transaction type signal line group indicating the type of coherence maintenance operation.

Reference numeral 43 denotes a global control bus for connecting the internode interfaces 13, 23, and 33; 41, a global address bus for connecting the internode interfaces 13, 23, and 33; and 42, a global data bus for connecting the internode interfaces 13, 23, and 33.

The global control bus 43 includes a transaction request signal line for transferring transaction requests issued by the internode interfaces 13, 23, and 33, and a transaction type signal line group indicating the type of transaction request signal line.

The global bus arbiter 5 receives transaction request signals issued by the internode interfaces, and arbitrates the bus grant of the global bus 4.

Since each cache unit has the same arrangement as that in the fifth embodiment, a detailed description thereof will be omitted.

Figure 35:
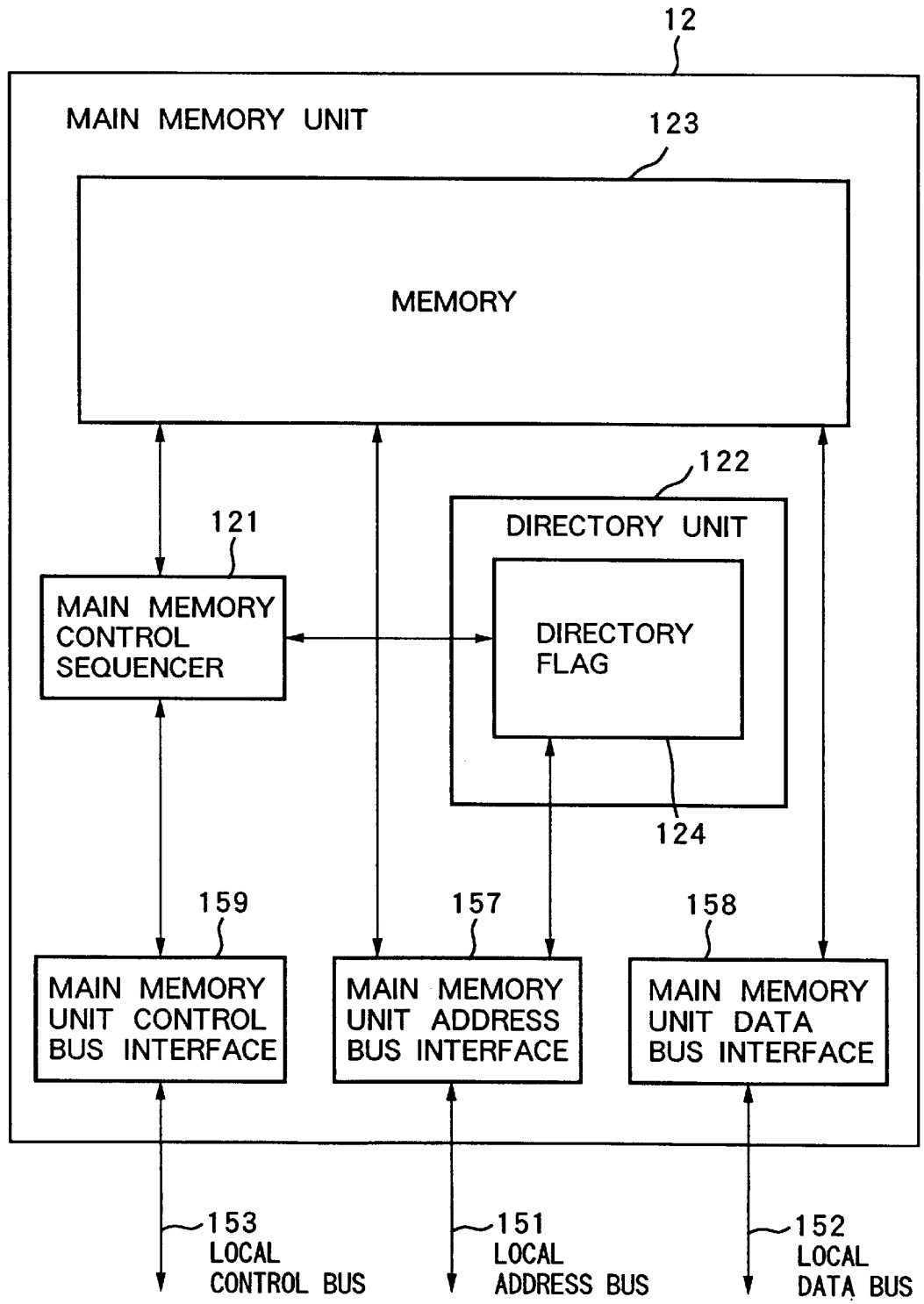
FIG. 35 is a block diagram showing the arrangement of a main memory unit in the sixth embodiment.

FIG. 35 shows the arrangement of the main memory unit 12 as a portion of this embodiment.

Referring to FIG. 35, reference numeral 121 denotes a main memory control sequencer for controlling the respective modules in the main memory unit. Reference numeral 124 denotes a directory flag for holding shared information of data held in the cache units 11, 21, and 31. A directory unit 122 is a module for holding the directory flag therein. Reference numeral 123 denotes a memory for holding a data block.

Reference numeral 157 denotes a local address bus interface for connecting the local address bus 151; 158, a local data bus interface for connecting the local data bus 152; and 159, a local control bus interface for connecting the local control bus 153.

<Processing Sequence of LOAD Instruction>

Figure 36:
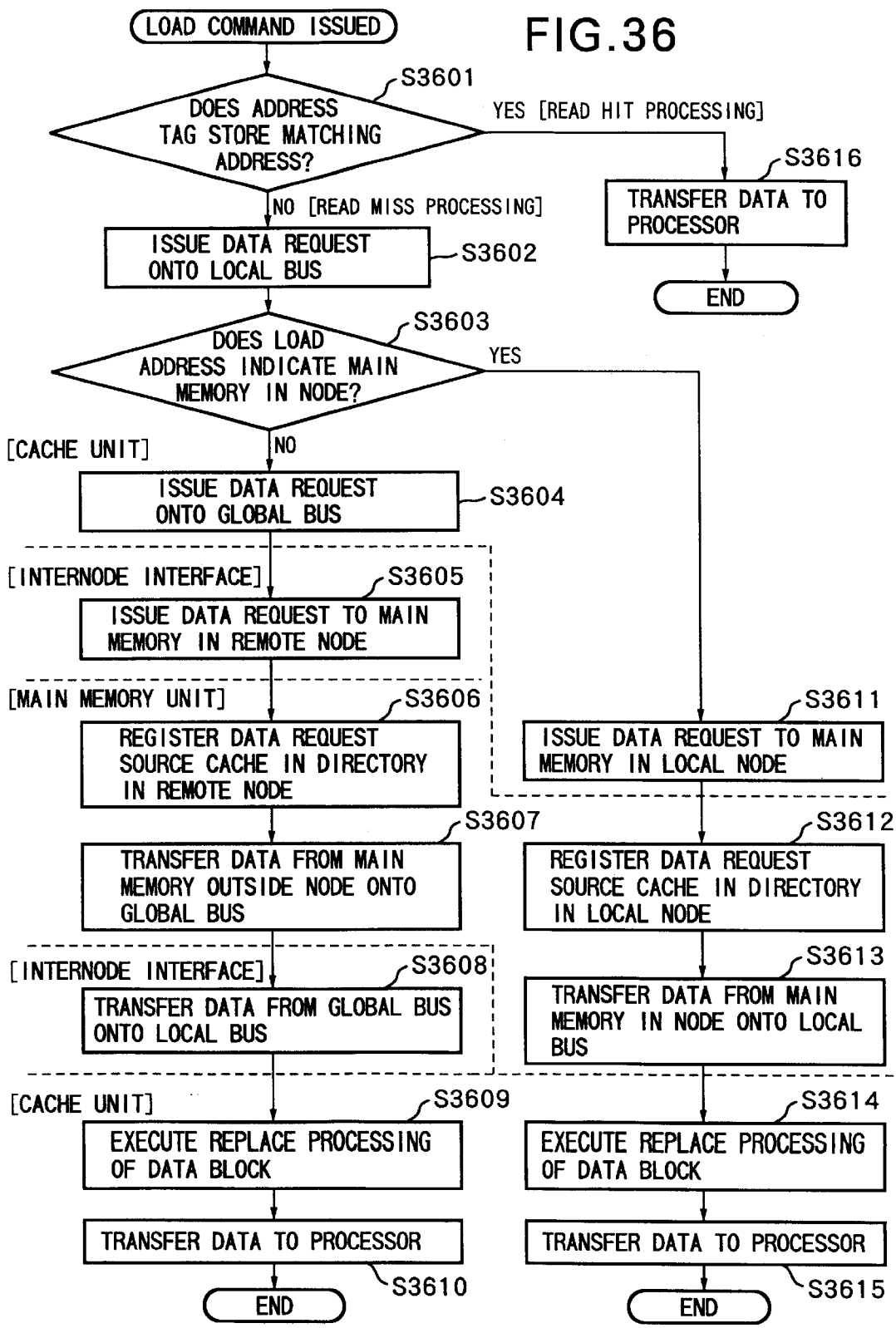
FIG. 36 is a flow chart showing the processing executed by a cache unit upon execution of a LOAD instruction in the sixth embodiment.

FIG. 36 shows the control sequence upon execution of a LOAD instruction in each node in the multiprocessor system with the above arrangement. In the following description, assume that the processor 10 issues a LOAD instruction.

Referring to FIG. 36, if the address tag stores an address to be loaded, i.e., if a cache read hit has occurred with respect to the LOAD instruction issued by the processor 10 (YES in step S3601), the cache unit 11 supplies a data block to the processor 10 (step S3616).

On the other hand, when a cache read miss has occurred with respect to the LOAD instruction issued by the processor 10, the cache unit 11 issues a read request onto the local bus 15 (step S3602). In this case, the cache unit 11 does not supply any data block to the processor 10 until it receives the data block that caused the cache read miss.

The cache unit 11 transfers read request source information onto the local control bus 153 and the address of this read access onto the local address bus 151, and issues a read request onto the local control bus 153. Then, the cache unit 11 waits until the data block is supplied onto the local data bus 152. The flow branches into the following two cases depending on whether or not the address to be loaded is present in the node.

(1) When a cache read miss has occurred, and the address of the read access (the address to be loaded) indicates a read access to the main memory unit 12 in the computing node 1 (YES in step S3603), the cache unit requests data to the main memory unit (S3611). In response to this request, the main memory unit 12 receives the read request and the address of the read access, and supplies a data block onto the local data bus 152. At the same time, the main memory unit 12 registers a directory flag corresponding to the cache unit 11 as the read request source in the directory unit 122 therein (steps S3612 and S3613).

Upon reception of data from the main memory unit 12, the cache unit 11 allocates an entry that can be used in the cache by executing replace processing (step S3614), and thereafter, writes the data block supplied onto the local data bus 152 in the entry of the corresponding data block therein (step S3615).

(2) When a cache read miss has occurred and the address of the read access indicates a read access to the main memory unit (e.g., the main memory unit 22) outside the computer node 1 (NO in step S3603), the cache unit issues a data request onto the global bus (step S3604). Upon reception of this request, the internode interface 13 accepts a read request and the address of the read access, and transfers read request source information onto the global control bus 43. Also, the interface 13 transfers the address of the read access onto the global address bus 41. Furthermore, the interface 13 issues a read request to the internode interface 23 in a remote node, and waits until a data block is supplied onto the global data bus 42.

The internode interface 23 receives the read request and the address of the read access, and outputs read request source information onto a local control bus 253. Also, the interface 23 outputs the address of the read access onto a local address bus 251. Furthermore, the interface 23 issues a read request onto the local control bus 253, and waits until a data block is supplied onto a local data bus 252. In this manner, the data request is supplied to the main memory unit in the remote node (step S3605).

The main memory unit 22 receives the read request and the address of the read access, and supplies a data block onto the local data bus 252. At the same time, the main memory unit 22 registers a directory flag corresponding to the cache unit 11 as the request source in a directory unit 222 therein (step S3606).

The internode interface 23 transfers the data block supplied onto the local data bus 152 to the global data bus 42 (step S3607).

The internode interface 13 transfers the data block supplied onto the global data bus 42 to the local data bus 152 (step S3608).

Steps S3606 to S2608 are not processed by the cache unit but are processed by the request receiving side.

The cache unit 11 assures an area that can be used in the cache by executing replace processing (step S3609), and thereafter, loads the data block supplied onto the local data bus 152 in the entry of the corresponding data block therein.

The cache unit 11 supplies the data block to the processor 10 (step S3610).

In this manner, a desired data block is loaded from the main memory unit of each node.

Since the control sequence upon execution of a STORE instruction is the same as that in the fifth embodiment, a detailed description thereof will be omitted. Also, since the control sequence upon execution of a SYNC instruction is the same as that in the fifth embodiment, a detailed description thereof will be omitted.

<Sequence of Write-back Processing>

Figure 37:
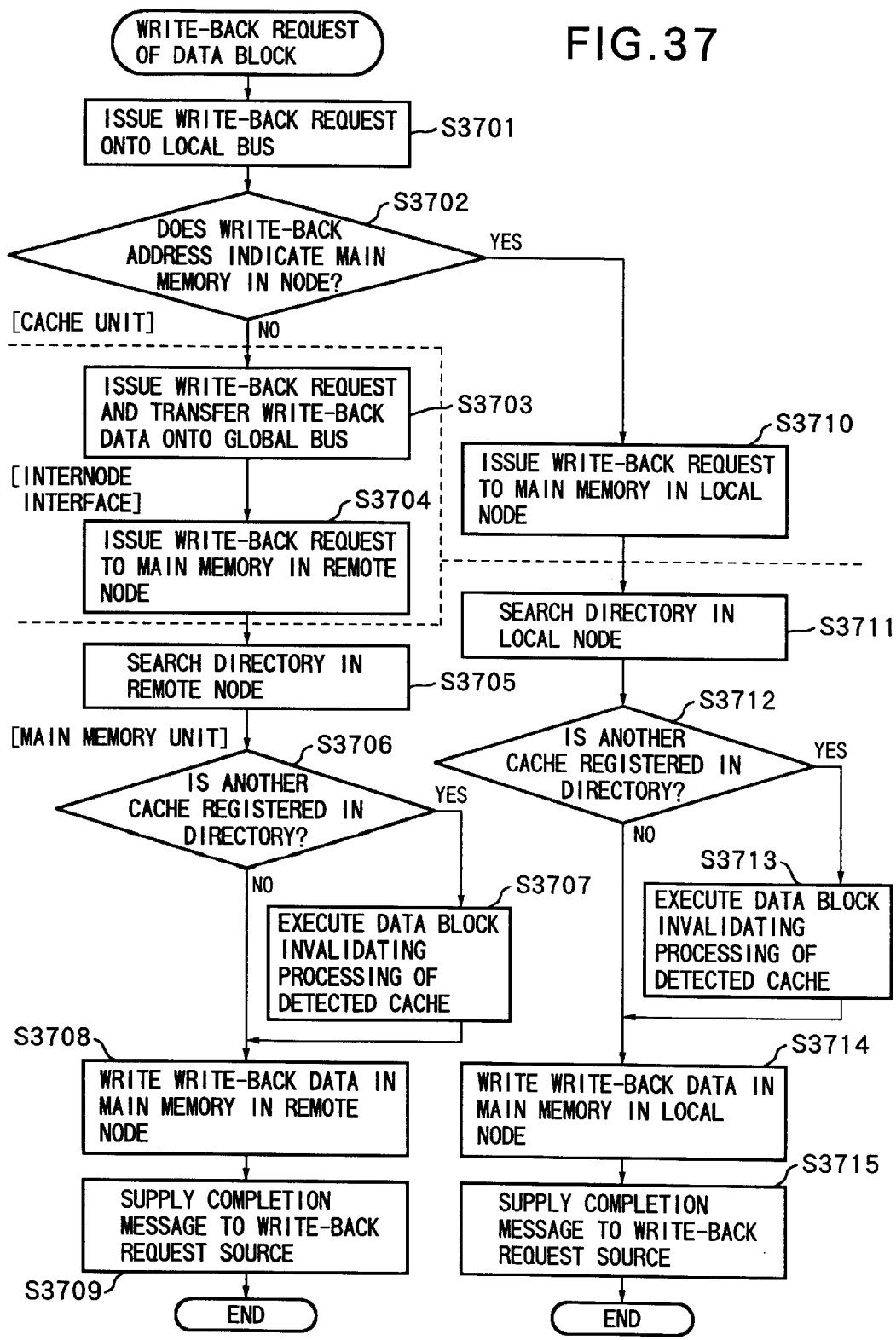
FIG. 37 is a flow chart showing the processing executed upon execution of write-back processing to the main memory in the sixth embodiment.

FIG. 37 shows the control sequence upon execution of the write-back processing to the main memory. In the following description, assume that the cache unit 11 issues a request of write-back processing to the main memory.

Referring to FIG. 37, the cache unit 11 transfers write-back request source information onto the local control bus 153, and transfers the address of the write-back access onto the local address bus 151. Also, the cache unit 11 issues a write-back request onto the local control bus 153 (step S3701), and supplies a data block to be written back onto the local data bus 152. Thereafter, the cache unit 11 waits until the written-back data block is supplied to the entry of the corresponding main memory unit, the required coherence maintenance operation is completed, and the write-back processing to the main memory is completed.

(1) When the address of the write-back processing to the main memory indicates a write-back access to the main memory unit 12 in the computer node 1 (YES in step S3702), the cache unit issues a write-back request to the main memory unit in a local node (step S3710).

The main memory unit 12 receives a read request, the address of the write-back access, and the data block supplied onto the local data bus 152, and searches the directory unit 122 in the main memory unit 12 to check if a directory flag for a cache other than the cache unit 11 as the write-back request source is registered (step S3711). When a cache unit other than the cache unit 11 holds a copy of the data in a valid state, a coherence maintenance operation is executed for the cache unit that holds the copy. In this case, as the coherence maintenance operation, processing for invalidating the copy of the data block held in the cache unit is executed (step S3713).

In this embodiment, the coherence maintenance operation is an invalidating type transaction, but the present invention is not limited to this specific transaction of this embodiment.

Upon completion of the coherence maintenance operation, the main memory unit writes the write-back data in the entry of the corresponding data block (step S3714). Finally, the main memory unit supplies a completion message of the write-back processing to the main memory to the cache unit 11 (step S3715).

(2) When the address of the write-back processing to the main memory indicates a write-back access to the main memory unit (e.g., the main memory unit 22) outside the computer node 1 (NO in step S3702), the cache unit 11 issues a write-back request to the internode interface 13.

The internode interface 13 receives the write-back request, the address of the write-back access, and a data block supplied onto the local data bus 152. Then, the interface 13 transfers write-back request source information onto the global control bus 43, the address of the write-back access onto the global address bus 41, and the data block to be written back onto the global data bus 42, and issues a write-back request to the internode interface 23 (step S3703).

The internode interface 23 receives the write-back request and the address of the write-back access, and transfers the write-back request source information onto the local control bus 253, the address of the write-back access onto the local address bus 251, and the data block to be written back onto the local data bus 252. Furthermore, the interface 23 issues a write-back request onto the local control bus 253. In this manner, the write-back request is issued to the main memory unit in the remote node (step S3704).

The main memory unit 22 searches the directory unit 222 therein to check if a directory flag for a cache other than the cache unit 11 as the write-back request source is registered (step S3705). When a cache unit other than the cache unit 11 holds a copy of the data in a valid state, a coherence maintenance operation is executed for the data block in the cache unit held in the valid state. In this case, the copy in the valid state is invalidated to maintain the coherence.

Upon completion of the coherence maintenance operation, the main memory unit 22 receives the read request, the address of the write-back access, and the data block supplied onto the local data bus 252, and writes the received data block in the entry of the corresponding data block (step S3708).

The internode interface 23 supplies a completion message of the write-back processing to the main memory to the internode interface 13.

The internode interface 13 supplies a completion message of the write-back processing to the main memory to the cache unit 11 (step S3709).

Of the above-mentioned sequence, steps S3701, S3702, and S3710 are processed by the cache unit, steps S3703 and S3704 are processed by the internode interface, and other steps are processed by the main memory unit in the node that received the write-back request. In the above-mentioned sequence, data is invalidated with reference to the directory, and the write-back operation is executed.

Since the control sequence upon execution of the replace processing is the same as that in the fifth embodiment, a detailed description thereof will be omitted.

Also, since the status transition of the status flag upon execution of memory transactions is the same as that in the fifth embodiment, a detailed description thereof will be omitted.

To help understand the coherence maintenance operation according to the present invention, a case wherein the coherence maintenance operation is postponed until the issue timing of a SYNC instruction as the characteristic feature of this system, and a case wherein the coherence maintenance operation is postponed until the number of DIRTY blocks becomes equal to or larger than a prescribed value, will be explained in turn below.

More specifically, for example, the processors 10, 20, and 30 issue LOAD instructions with respect to address f8000000, and upon completion of the processing of these LOAD instructions, the processor 10 issues a STORE instruction with respect to address f8000000. In this case, at the time of issuance of the STORE instruction, no request of the coherence maintenance operation is issued with respect to the cache units 21 and 31. When the processor 10 issues a SYNC instruction, a request of the coherence maintenance operation is issued. How to realize this operation will be described below with reference to FIG. 38. Similarly, when the processors 10, 20, and 30 issue LOAD instructions with respect to address f8000000, and the processor 10 issues a STORE instruction with respect to address f8000000, the internode interface 13 does not issue a request of the coherence maintenance operation to the cache units 21 and 31 at the time of issuance of the STORE instruction. When the number of DIRTY blocks becomes equal to or larger than a prescribed value (2 in this embodiment), a request of the coherence maintenance operation is issued. How to realize this operation by the mechanisms of the internode interfaces 13, 23, and 33 will be explained below with reference to FIG. 38.

Figure 38:
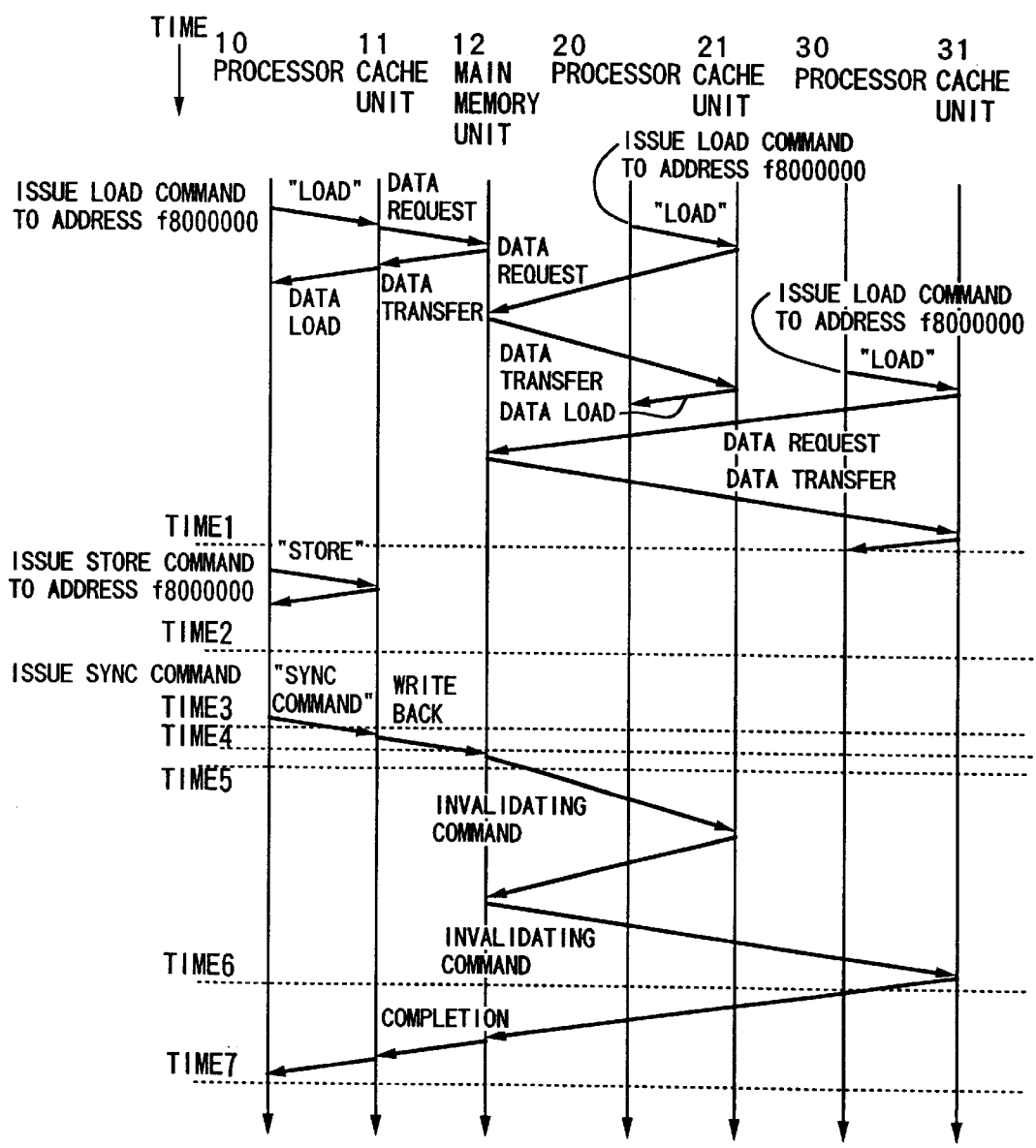
FIG. 38 is a chart showing an example wherein the coherence maintenance operation is postponed until the issuance timing of a synchronization instruction in the sixth embodiment.

FIG. 38 is a timing chart showing an example of the coherence maintenance operation of this embodiment. Assume that address f8000000 is assigned to the main memory unit 12.

At time 1, the processors 10, 20, and 30 issue LOAD instructions to address f8000000, and complete loading of data from the main memory unit 12. At this time, the directory flag corresponding to address f8000000 registers the cache units 11, 21, and 31 as the nodes that hold copies of the data.

At time 2, the processor 10 issues a STORE instruction to address f8000000, and completes processing of the STORE instruction. At this time, no coherence maintenance operation is generated. The status flag 113 in the cache unit 11 is changed to DIRTY as a result of the STORE instruction issued by the processor 10. Also, the value of the status flag counter 117 is incremented.

At time 3, the processor 10 issues a SYNC instruction.

At time 4, write-back processing of the data block of address f8000000 held in the DIRTY state in the cache unit 11 is executed in response to the SYNC instruction issued by the processor 10 at time 3.

At time 5, a coherence maintenance operation is executed due to the write-back processing of the data block of address f8000000 to the main memory executed at time 4.

At time 6, the copies in the cache units 21 and 31 are invalidated by the coherence maintenance operation executed at time 5.

At time 7, the cache unit 11 which has received the completion message of the coherence maintenance operation, and has completed the write-back processing to the main memory supplies a completion message of the SYNC instruction to the processor 10, thus completing the processing of the SYNC instruction issued at time 3.

As described above, since the number of data blocks in the DIRTY state in each cache unit does not exceed the predetermined threshold value (2 in this case) before the predetermined synchronization timing (the timing of issuance of the SYNC instruction), the write-back processing and the coherence maintenance operation (invalidating processing) are initially performed in response to the SYNC instruction.

Figure 39:
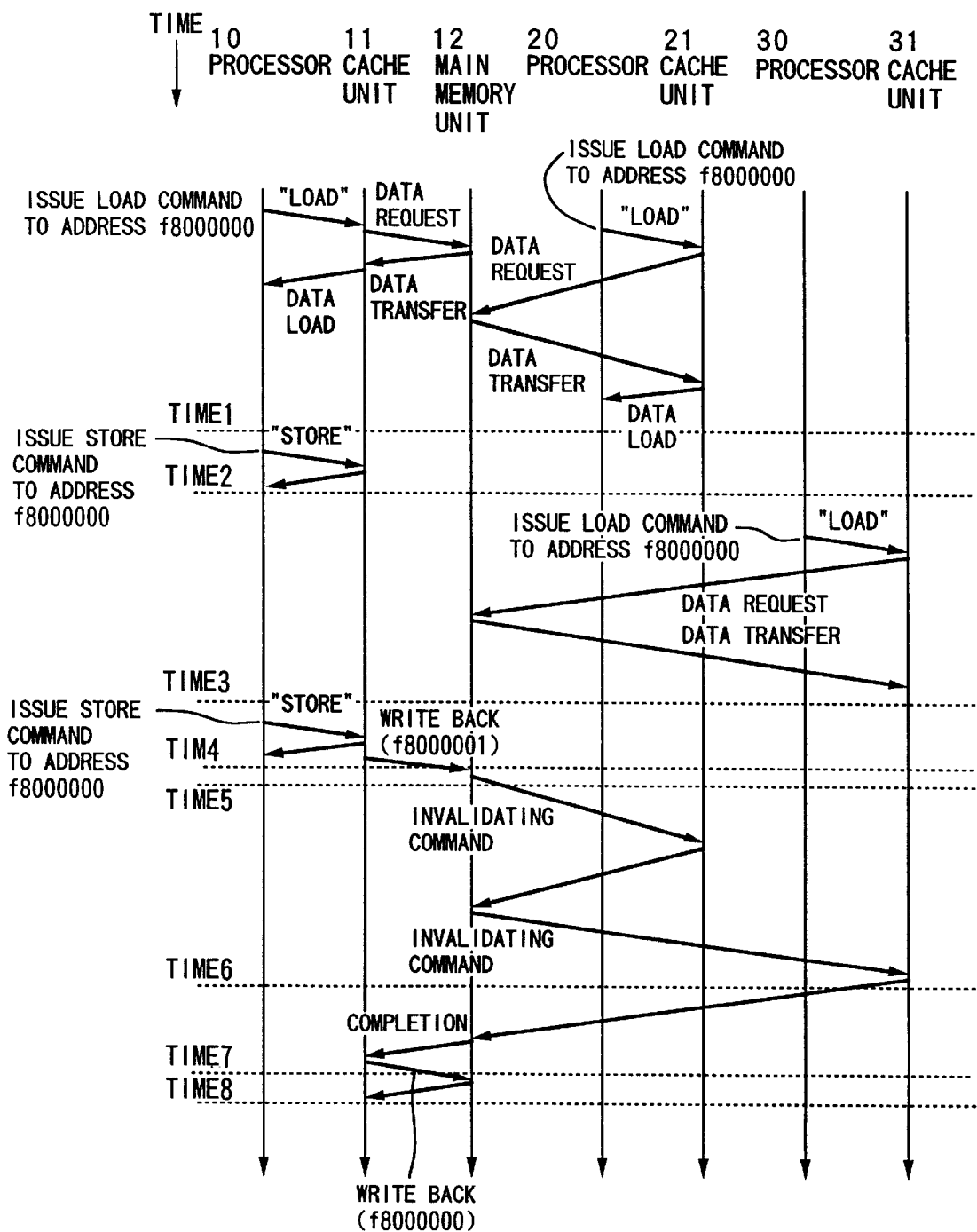
FIG. 39 is a chart showing an example wherein the coherence maintenance operation is postponed until the number of DIRTY blocks becomes equal to or larger than a prescribed value in the sixth embodiment.

FIG. 39 is a timing chart showing an example of starting the coherence maintenance operation using the number of data blocks in the DIRTY state as a trigger.

Assume that addresses f8000000 and f8000001 are assigned to the main memory unit 12 in the computer node 1.

At time 1, the processors 10 and 20 issue a LOAD instruction with respect to address f8000000, and complete loading of data from the main memory unit 12. At this time, the directory flag corresponding to address f8000000 registers the cache units 11 and 21.

At time 2, the processor 10 issues a STORE instruction with respect to address f8000000, and completes processing of the STORE instruction. At this time, no coherence maintenance operation is executed. The status flag 113 in the cache unit 11 is changed to DIRTY as a result of the STORE instruction issued by the processor 10. Also, the value of the status flag counter 117 is incremented. As a result, the value of the counter 117 becomes 1.

At time 3, the processor 30 issues a LOAD instruction with respect to address f8000000, and completes processing of the LOAD instruction. At this time as well, the cache unit 31 merely loads a data block from the main memory unit 12, and no coherence maintenance operation is generated. As a result of the LOAD instruction, the directory flag corresponding to address f8000000 registers the cache units 11, 21, and 31.

At time 4, the processor 10 issues a STORE instruction with respect to address f8000001, and completes processing of the STORE instruction. When the value of the status flag counter 117 is incremented, the value of the counter becomes 2. Since the number of DIRTY blocks becomes equal to or larger than the prescribed value (2), write-back processing to the main memory is executed.

At time 5, the coherence maintenance operation is started due to the write-back processing of the data block of address f8000000 to the main memory executed at time 4.

At time 6, the copies in the cache units 21 and 31 are invalidated by the coherence maintenance operation executed at time 5.

At time 7, the write-back processing of the data block of address f8000001 to the main memory is executed.

At time 8, the write-back processing of the data block of address f8000001 to the main memory is completed.

As described above, when the number of data blocks in the DIRTY state becomes equal to or larger than the predetermined value, write-back processing (and the coherence maintenance operation) of DIRTY blocks in the cache is performed. In this manner, the number of blocks to be subjected to the write-back processing and the coherence maintenance processing at the next synchronization timing can be suppressed to be smaller than a predetermined upper limit value. For example, in this embodiment, if the write-back processing is performed when b or more DIRTY blocks are generated per node in a system including N nodes, the number of data blocks to be simultaneously subjected to the write-back processing and the coherence maintenance processing in response to a SYNC instruction does not exceed N×b.

In this manner, since the cache memory and the coherence maintenance mechanism for the cache memory are provided, and the traffic on the interconnection network concentrated at the synchronization point can be distributed, the use efficiency of the interconnection network can be prevented from being decreased, and the processing overhead upon execution of the synchronization operation can be reduced.

The present invention can be applied to a case wherein the invention is achieved by supplying a program to a system or apparatus. In this case, when a program expressed by software for achieving the present invention is read out from a storage medium that stores the program to a system or apparatus, the system or apparatus can enjoy the effect of the present invention.

As many apparently widely different embodiments of the present invention can be made without departing from the spirit and scope thereof, it is to be understood that the invention is not limited to the specific embodiments thereof except as defined in the appended claims.

What is claimed is:

1. An information processing system adopting a relaxed memory coherence model, the system includes a plurality of connection network use subjects each including a plurality of processor units, cache memory units connected to said plurality of processor units, and a main memory unit, and a connection network for interconnecting said plurality of connection network use subjects, and executes coherence maintenance processing for maintaining coherence of contents of a data block stored in each cache memory unit connected to each processor unit when processing of each of said plurality of processor units has reached a predetermined synchronization point, wherein even before the processing of the processor unit reaches the synchronization point, when a state of said information processing system satisfies a predetermined condition, and a copy of data stored in at least one of said cache memory units is updated, the cache memory unit that stores the updated copy executes the coherence maintenance processing for maintaining the coherence of the contents of the data block stored in said cache memory unit.

2. The system according to claim 1, wherein the predetermined condition satisfied by said information processing system is that a coherence maintenance operation of the cache memory unit, which is to be executed when the condition is satisfied does not disturb operations of other connection network use subjects on said connection network.

3. The system according to claim 2, wherein the condition that the operations of said other connection network use subjects are not disturbed means that said other connection network use subjects do not use said connection network.

4. The system according to claim 2, wherein an arbitration unit for arbitrating a right of use of the connection network by said connection network use subjects is further connected to said connection network, each of said connection network use subjects issues a use request of said connection network with first priority lower than priorities in other cases so as to perform the coherence maintenance operation of the cache memory unit before the processing of the processor unit reaches the synchronization point, and said arbitration unit which received the use request determines that the condition that the operations of said other connection network use subjects are not disturbed is satisfied when said arbitration unit does not receive any use requests other than the received use request, and gives a grant for use of said connection network to one of said connection network use subjects, which issued the use request of said connection network with the first priority.

5. The system according to claim 3, wherein the coherence maintenance processing is processing for writing back the updated data block stored in the cache memory unit to said main memory unit.

6. The system according to claim 3, wherein the coherence maintenance processing is processing for invalidating copies of a data block, which is reflected from one cache memory unit in said main memory, held in the cache memory units other than said one cache memory.

7. The system according to claim 1, wherein the predetermined condition satisfied by said information processing system is discriminated by comparing the number of data blocks, contents of which are not reflected in said main memory, in the cache memory unit with a value designated in advance.

8. The system according to claim 1, wherein the predetermined condition satisfied by said information processing system is discriminated by comparing the number of write accesses made by the processor unit connected to the cache memory unit with a value designated in advance.

9. The system according to claim 1, wherein said connection network comprises a bus type connection network.

10. The system according to claim 1, wherein information indicating a presence of other cache units that store copies of data stored in said main memory unit, which copies are to be subjected to the coherence maintenance processing, is stored in said main memory unit.

11. The system according to claim 1, wherein the cache memory units that store copies of data stored in said main memory unit, which copies are to be subjected to the coherence maintenance processing, detect necessity of the coherence maintenance processing independently by snooping bus traffic, and execute the coherence maintenance processing.

* * * * *

UNITED STATES PATENT AND TRADEMARK OFFICE
CERTIFICATE OF CORRECTION

PATENT NO. : 5,860,110

DATED : January 12, 1999

INVENTOR(S) : TOSHIYUKI FUKUI ET AL.

Page 1 of 2

It is certified that error appears in the above-identified patent and that said Letters Patent is hereby corrected as shown below:

[54] TITLE

"CONFERENCE" should read --COHERENCE--.

COLUMN 1

Line 1, "CONFERENCE" should read --COHERENCE--.

Line 66, "applicant" should read --invention--.

COLUMN 14

Line 61, "the" (second occurrence) should be deleted.

UNITED STATES PATENT AND TRADEMARK OFFICE
CERTIFICATE OF CORRECTION

PATENT NO. : 5,860,110

DATED : January 12, 1999

INVENTOR(S) : TOSHIYUKI FUKUI ET AL.

It is certified that error appears in the above-identified patent and that said Letters Patent is hereby corrected as shown below:

COLUMN 38

Line 14, "memory." should read --memory unit.--.

Signed and Sealed this

Thirtieth Day of November, 1999

Attest:

Attesting Officer

Q. TODD DICKINSON

Acting Commissioner of Patents and Trademarks